US012748605B2

(12) United States Patent
Sabiun et al.

(10) Patent No.: US 12,748,605 B2
(45) Date of Patent: Sep. 29, 2026

(54) DISCOVERY AND INVENTORY CONTROL FOR REMOTE RESOURCE INTEGRATION WITH CLOUD SERVICES

(71) Applicant: Oracle International Corporation, Redwood Shores, CA (US)

(72) Inventors: Erik Sabiun, Vilnius (LT); Zheyu Ding, Kirkland, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 458 days.

(21) Appl. No.: 18/336,544

(22) Filed: Jun. 16, 2023

(65) Prior Publication Data

US 2024/0211319 A1 Jun. 27, 2024

Related U.S. Application Data

(60) Provisional application No. 63/434,846, filed on Dec. 22, 2022, provisional application No. 63/434,879, filed on Dec. 22, 2022.

(51) Int. Cl.
*G06F 9/455* (2018.01)
*G06F 9/445* (2018.01)
(Continued)

(52) U.S. Cl.
CPC ...... *G06F 9/44526* (2013.01); *G06F 9/45558* (2013.01); *G06F 9/4875* (2013.01);
(Continued)

(58) Field of Classification Search
CPC ........ G06F 9/45558–5088; G06F 2009/45583; H04L 41/084
See application file for complete search history.

(56) References Cited

U.S. PATENT DOCUMENTS 7,493,388 B2 * 2/2009 Wen .......................... G06F 9/50 705/28
9,778,952 B1 10/2017 Sutton et al.
(Continued)

FOREIGN PATENT DOCUMENTS

CN 113485787 A 10/2021
CN 114296649 A 4/2022

OTHER PUBLICATIONS

AWS Application Discovery Service: User Guide Amazon Web Services, Inc. web.archive.org/web/20221005192021/http://docs.aws.amazon.com:80/application-discovery/latest/userguide/appdiscovery-ug.pdf (Year: 2022).*
(Continued)

*Primary Examiner* — April Y Blair
*Assistant Examiner* — Paul V Mills
(74) *Attorney, Agent, or Firm* — Kilpatrick Townsend & Stockton LLP

(57) ABSTRACT

Techniques are disclosed herein for extending a cloud service's reach into on- or off-premises environments and other cloud platforms to enable migration and multi-cloud use cases. In one aspect, a computer-implemented method is provided that includes deploying a remote agent appliance with a discovery plugin in an external environment of a user, creating an asset source specifying a location of the external environment from which external assets and associated asset metadata should be discovered, generating a discovery job for the purpose of retrieving the asset metadata for the external assets discovered within the asset source, executing, using the discovery plugin, the discovery job to discover and retrieve the external assets and the associated asset metadata within the asset source, and providing a collection of assets that includes the asset metadata for the external assets as at least part of an inventory to the user.

20 Claims, 17 Drawing Sheets

(51) Int. Cl.
*G06F 9/48* (2006.01)
*G06F 9/50* (2006.01)
*H04L 41/084* (2022.01)

(52) U.S. Cl.
CPC .......... *G06F 9/5072* (2013.01); *G06F 9/5077* (2013.01); *H04L 41/084* (2013.01); *G06F 2009/45583* (2013.01)

(56) References Cited

U.S. PATENT DOCUMENTS

| | | | |
|---|---|---|---|
| 10,079,730 | B2 | 9/2018 | Subramanian et al. |
| 10,469,314 | B2 | 11/2019 | Ennis, Jr. et al. |
| 10,673,716 | B1 | 6/2020 | Sethuramalingam et al. |
| 11,301,487 | B1 * | 4/2022 | Kumar ................ G06F 16/2237 |
| 11,412,044 | B1 | 8/2022 | Song et al. |
| 11,422,838 | B2 | 8/2022 | Wang et al. |
| 2009/0094673 | A1 * | 4/2009 | Seguin .................... G06F 21/51 726/1 |
| 2011/0055299 | A1 | 3/2011 | Phillips et al. |
| 2011/0107406 | A1 * | 5/2011 | Frost ..................... H04L 63/029 726/6 |
| 2012/0304179 | A1 | 11/2012 | Devarakonda et al. |
| 2013/0091285 | A1 | 4/2013 | Devarakonda et al. |
| 2015/0096011 | A1 | 4/2015 | Watt |
| 2016/0048408 | A1 * | 2/2016 | Madhu .................. H04L 47/783 718/1 |
| 2017/0093640 | A1 * | 3/2017 | Subramanian ...... H04L 41/5058 |
| 2017/0097845 | A1 | 4/2017 | Kouznetsov et al. |
| 2017/0109190 | A1 * | 4/2017 | Sha ..................... G06F 9/45558 |
| 2017/0373933 | A1 * | 12/2017 | Subramanian .... G06F 16/24578 |
| 2019/0087232 | A1 | 3/2019 | Bergsma et al. |
| 2019/0266268 | A1 * | 8/2019 | Polinati ................. G06F 9/5061 |
| 2019/0288915 | A1 * | 9/2019 | Denyer ................. G06F 16/252 |
| 2019/0340003 | A1 | 11/2019 | Ramanathan et al. |
| 2019/0340100 | A1 | 11/2019 | Patil et al. |
| 2020/0004582 | A1 | 1/2020 | Fornash et al. |
| 2020/0019424 | A1 | 1/2020 | Wang et al. |
| 2020/0351347 | A1 * | 11/2020 | Chang ................. G06F 9/45558 |
| 2021/0011816 | A1 * | 1/2021 | Mitkar ................ G06F 11/1458 |
| 2021/0365339 | A1 | 11/2021 | Liu et al. |
| 2022/0021652 | A1 | 1/2022 | Moghe et al. |
| 2022/0027241 | A1 | 1/2022 | Shrivastava et al. |
| 2022/0030064 | A1 * | 1/2022 | Dreyband ............... H04L 67/51 |
| 2022/0214997 | A1 | 7/2022 | Kavaipatti Anantharamakrishnan et al. |
| 2022/0327007 | A1 | 10/2022 | Adogla et al. |
| 2023/0094990 | A1 | 3/2023 | Tammana et al. |
| 2024/0012720 | A1 | 1/2024 | Wang et al. |
| 2024/0070435 | A1 | 2/2024 | Shinde et al. |

OTHER PUBLICATIONS

Unikernels: Library Operating Systems for the Cloud Anil Madhavapeddy, Richard Mortier, Charalampos Rotsos, David Scott, Balraj Singh, Thomas Gazagnaire, Steven Smith, Steven Hand and Jon Crowcroft (Year: 2013).*

IT Autopilot: A flexible IT service management and delivery medium business S. Mastrianni, D. F. Bantz, K. A. Beaty, T. Chefalas, S. Jalan, G. Kar, A. Kochut, D. J. Lan, L. O'Connell, A. Sailer, G. Wang, Q. B. Wang, D. G. Shea (Year: 2007).*

International Application No. PCT/US2023/082312, International Search Report and Written Opinion mailed Mar. 13, 2024, 15 pages.

"AWS Application Discovery Service Resources—Amazon Web Services:" retrieved from https://aws.amazon.com/application-discovery/resources/ printed on Jul. 21, 2023, 5 pages.

International Application No. PCT/US2023/082312, International Preliminary Report on Patentability mailed Jul. 3, 2025, 12 pages.

Agentless Migration Architecture, Available online at: https://learn.microsoft.com/en-us/azure/migrate/concepts-vmware-agentless-migration?view=migrate, Accessed from Internet on Mar. 16, 2026, 11 pages.

Uploading Terraform States to Yandex Object Storage, Available online at: https://yandex.cloud/en/docs/tutorials/infrastructure-management/terraform-state-storage?utm_referrer=about%3Ablank, Mar. 5, 2026, 8 pages.

VM Migration Process, Available online at: https://docs.cloud.google.com/migrate/virtual-machines/docs/5.0/discover/lifecycle, Accessed from Internet on Mar. 16, 2026, 7 pages.

VMware VM Migration to AWS Application Migration Services with Pure Storage Cloud Dedicated, Available online at: https://support.purestorage.com/csh?topicname=c_vmware_vm_migration_to_aws_application_migration_services_pu.html, Sep. 10, 2024, 2 pages.

U.S. Appl. No. 18/377,160, Non-Final Office Action mailed on Jan. 30, 2026, 12 pages.

U.S. Appl. No. 18/533,704, Non-Final Office Action mailed on Mar. 17, 2026, 20 pages.

Armour, Azure Stack IaaS—Part One, Microsoft 365 Community Conference, Feb. 11, 2019, 6 pages.

Babarinde, How to Migrate on-Premises Workloads with AWS Application Migration Service, Available online at: https://aws.amazon.com/blogs/publicsector/how-migrate-on-premises-workloads-aws-application-migration-service/, Jul. 12, 2021, 22 pages.

International Application No. PCT/US2023/085338, International Preliminary Report on Patentability mailed on Jul. 3, 2025, 11 pages.

International Application No. PCT/US2023/085338, International Search Report and Written Opinion mailed on May 27, 2024, 14 pages.

International Application No. PCT/US2023/085769, International Preliminary Report on Patentability mailed on Jul. 3, 2025, 11 pages.

International Application No. PCT/US2023/085769, International Search Report and Written Opinion mailed on May 10, 2024, 14 pages.

Radu, Azure Stack Hub Infrastructure as Code Using Terraform, Microsoft 365 Community Conference, May 8, 2020, 10 pages.

U.S. Appl. No. 18/377,160 , Notice of Allowance, Mailed On May 11, 2026, 8 pages.

* cited by examiner

DISCOVERY AND INVENTORY CONTROL FOR REMOTE RESOURCE INTEGRATION WITH CLOUD SERVICES

CROSS-REFERENCE TO RELATED APPLICATIONS

The present application is a non-provisional application of and claims benefit and priority under 35 U.S.C. 119(e) of U.S. Provisional Application No. 63/434,879, filed Dec. 22, 2022 and U.S. Provisional Application No. 63/434,846, filed Dec. 22, 2022, the entire contents of which are incorporated herein by reference for all purposes.

FIELD

The present disclosure relates generally to resource integration with cloud services, and more particularly, to techniques for extending the cloud service's reach into on- or off-premises environments and other cloud platforms to enable migration and multi-cloud use cases.

BACKGROUND

Cloud computing has been a principal of many organizations for years, offering an array of online services such as collaboration, communication, data storage and backup, user relationship management tools, and more; basically, every technological element needed to run a business. There are presently four main types of cloud computing: private cloud, public cloud, hybrid cloud, and multicloud. A private cloud architecture is a cloud environment dedicated to a single user, group or organization which can be on- or off-premises. A public cloud architecture is a cloud environment dedicated to multiple users, group or organizations which can be on- or off-premises. The hybrid cloud architecture uses both a public cloud architecture and a private cloud architecture or on-premises infrastructure. The multicloud architecture is a combination of clouds (private and/or public) spanning multiple vendors. Each of these types of clouds can be configured to provide various cloud computing services including: Infrastructure as a service (IaaS), Platforms as a service (PaaS), Software as a service (SaaS), and Integration platform as a service (iPaaS). IaaS offers standard compute, storage and network resources on a demand-based scale. PaaS offers software development and deployment resources. SaaS offers software distribution to end users. iPaaS is a suite of cloud services enabling users to develop, execute and govern integration flows between disparate applications.

The growth of cloud computing has enabled organizations to use a wide assortment of highly scalable resources and services on demand rather than constructing and maintaining them on- or off-premises. However, in some organizations, the arrival of these diverse resources and services has created information technology (IT) silos as administrators strive to manage and maintain each different cloud resource and/or on- or off-premises resource (non-cloud resources). For example, IT silos can occur when only one group of people (e.g., one department within an organization) can access certain resources. Cloud-based integration (also known as cloud integration) unifies all the different cloud resources and/or on- or off-premises resources to avoid such IT silo instances. Cloud integration is a form of systems integration business delivered as a cloud computing service that addresses data, process, service-oriented architecture (SOA) and application integration. At its most basic level, cloud integration means connecting a wide range of processes, applications, systems, data repositories, and other IT environments (e.g., public clouds, private clouds, on-premises infrastructure, etc.)—either in a hybrid or multicloud deployment—so that they can operate as a single, cohesive IT infrastructure for an organization. Without a cloud integration solution, administrators need to perform each integration task separately and manually—a process that is time-consuming and increases the opportunity for error.

BRIEF SUMMARY

Techniques are provided (e.g., a method, a system, non-transitory computer-readable medium storing code or instructions executable by one or more processors) herein for extending a cloud service's reach into on- or off-premises environments including other cloud platforms to enable migration and multi-cloud use cases. More specifically, a cloud bridge (part of cloud-based integration services) is disclosed herein as framework and platform for other cloud services that require integration with external environments. Such integration is based on specialized software components (agents) deployed by a user (e.g., a cloud service customer) in such environments (user's on-premises network).

In various embodiments, a computer-implemented method is provided that includes: deploying, by a computing system, a remote agent appliance in an external environment of a user, wherein the remote agent appliance comprises a discovery plugin; creating, by the computing system, an asset source specifying a location of the external environment from which external assets and associated asset metadata should be discovered along with a reference to credentials stored in a data store; creating, by the computing system, a discovery policy for discovering the external assets within the asset source; generating, by the computing system, a discovery job for the purpose of retrieving the asset metadata for the external assets discovered within the asset source; executing, by the computing system using the discovery plugin, the discovery job to discover the external assets within the asset source based on the discovery policy, where the executing the discovery job comprises retrieving the asset metadata for the external assets discovered within the asset source and populating an inventory with the asset metadata, and where the inventory contains a collection of assets that includes the asset metadata for the external assets; and providing, by the computing system, the collection of assets and the associated asset metadata within the inventory to the user.

In some embodiments, the computer-implemented method further comprises generating, by the computing system, the inventory on a cloud infrastructure, wherein the cloud infrastructure is in communication with the remote agent appliance.

In some embodiments, the discovery policy is a schedule that identifies a time for when the computing system is to execute the discovery job.

In some embodiments, the computer-implemented method further comprises: receiving, by the computing system, a query from the user regarding the asset metadata; executing, by the computing system, the query on the inventory; providing, by the computing system, results of the query to the user based on the executing.

In some embodiments, the computer-implemented method further comprises: in response to generating the asset source, generating, by the computing system, connectors between the discovery plugin and the location of the external environment, where the asset metadata is retrieved for the external assets using the connectors.

In some embodiments, the computer-implemented method further comprises: generating, by the computing system, a migration project based on one or more assets within the collection of assets and the associated asset metadata within the inventory; and executing, by the computing system, a migration of the one or more assets to the cloud infrastructure based on the migration project.

In some embodiments, the providing the collection of assets and the associated asset metadata within the inventory to the user comprises displaying the collection of assets and the associated asset metadata to the user in a graphical user interface.

In various embodiments, a system is provided that includes one or more data processors and one or more non-transitory computer readable media storing instructions which, when executed on the one or more data processors, cause the one or more data processors to perform part or all of one or more methods disclosed herein.

In various embodiments, a computer-program product is provided that is tangibly embodied in one or more non-transitory machine-readable media and that includes instructions configured to cause one or more data processors to perform part or all of one or more methods disclosed herein.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
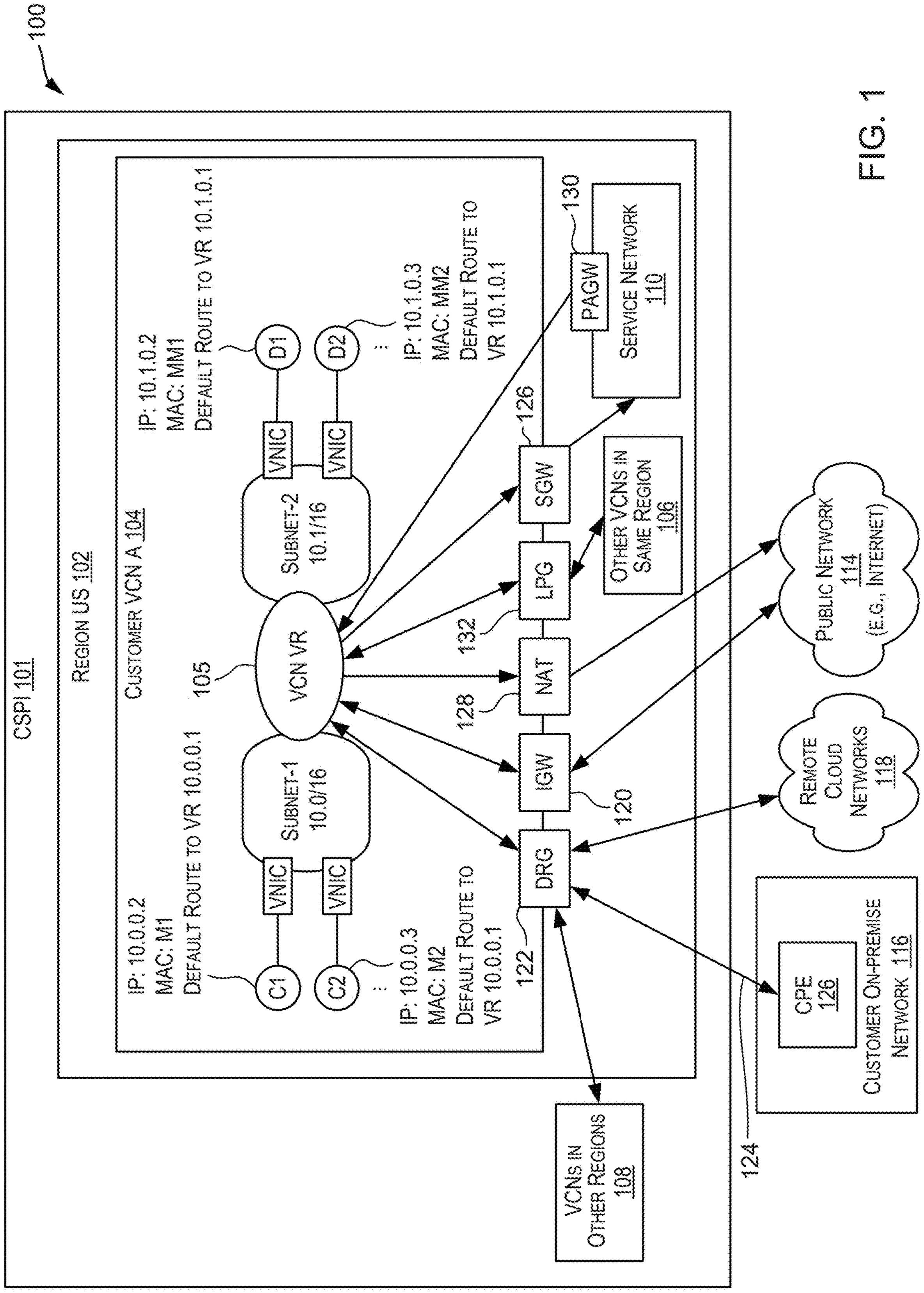
FIG. 1 is a high-level diagram of a distributed environment showing an overlay or user virtual cloud network hosted by cloud service provider infrastructure according to various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

INTRODUCTION

Cloud computing is on-demand access, via a network such as the Internet, to computing resources—applications, servers (physical servers and virtual servers), data storage, development tools, networking capabilities, and more—hosted at a remote data center managed by a cloud services provider. A cloud infrastructure such as Oracle Cloud Infrastructure (OCI) is a set of cloud computing services (cloud services) that enable a user to build and run a range of applications and services in a hosted environment. The cloud infrastructure is physically hosted in one or more global regions (i.e., data centers managed by a cloud services provider such as Oracle) and provides high-performance compute capabilities (as physical or virtual hardware instances) and storage capacity in a flexible overlay virtual network that is securely accessible from a user's on-premises network. Cloud services provided by the cloud infrastructure natively integrate with resources maintained in the hosted environment, like databases and compute instances (e.g., physical and/or virtual servers). There is a strong desire to use these cloud services with resources in remote environments either on- or off-premises resources including other cloud resources.

Conventionally, the user experience for remote resource integration with cloud services is complicated. Many services require deployment of service-specific agents and connecting on- or off-premises resources to the cloud either requires one-off, service-specific solutions or the establishment of private site-to-site network connectivity to the cloud infrastructure. For example, Database Management Cloud Service, Oracle Data Safe Service, and the Database Migration Service have conventionally implemented three separate frameworks to integrate with remote databases. Service-specific solutions create barriers to adoption—they fracture a cloud service provider's service portfolio with inconsistent on-premises support and force users to onboard each service independently. Further, every cloud service is burdened with building and maintaining remote-site support. Site-to-site network connectivity provides a more unified experience but has a high barrier to adoption as it requires major changes to remote network infrastructure and forces broad exposure of the user's network to the cloud infrastructure.

The approaches described in the present disclosure provide a simple and secure mechanism to extend the cloud services reach into on- or off-premises environments and other cloud platforms to enable migration and multicloud use cases. This mechanism is executed by a cloud bridge that provides a framework and platform for integrating cloud services' functionalities with external environments or assets (i.e., bridges the gap and connects cloud services with external environments or assets). An exemplary use case is facilitating the native migration of Virtual Machines from a on-premises VMware virtualized environment into a cloud infrastructure (i.e., cloud migration). Another exemplary use case is facilitating the use of Virtual Machines deployed in a cloud infrastructure provided by a first cloud provider with assets stored in a different cloud infrastructure provided by a second cloud provider (i.e., multicloud). The integration is based on a specialized software component (i.e., agent) deployed by a user in an external environment. Each agent is comprised of the agent software residing in the external environment and a corresponding agent control plane residing in the cloud infrastructure.

Nonetheless, users often struggle to understand their legacy environments, including what assets they have, and how the assets interact. For example, for migrating on-premise VMware virtual appliances to OCI native virtual machines, the customer needs to understand what virtual appliances they have and how they interact. Discovery involves learning about a customer environment. For migration use-cases it is needed to discover customer resources that are part of various customers on-premise VMware environments. After discovery, customers need to explore the properties of their on-premise resources to determine what they want to migrate to OCI. As an example, a customer may want to identify their virtual appliances that run Oracle E-Business Suite by filtering the list of all VMware appliances to those that have "ebs" in their names. They may want to then restrict further to those running production workloads by filtering only appliances that have more than four cores.

In order to address these challenges and others, the present disclosure describes a system and workflow for discovery and inventory of components for remote resource integration with cloud services. The discovery and inventory are designed to support thousands of customers each with 10,000 s of assets. Migrations are often very complicated, so the goal is to build a flexible framework with various capabilities such as support for different types of external user environments, different types of assets, and different type of asset discovery mechanisms. In summary, the system and workflow involve discovery and inventory to provide a representation of user external environments that support various services such as migration use-cases. Discovery involves discovering resources in a customer environment and creating/updating assets that represent them in the inventory. The discovery is implemented using a discovery control plane on the cloud infrastructure side and a discovery plugin on the side of the external environment. The discovery control plane comprises customer facing application programming interfaces (API), deployed in an overlay, backed by one or more databases, responsible for configuring discovery and coordinating discovery plugins. The discovery plugin is deployed to the customer external environment, responsible for collecting asset metadata and reporting it to the inventory control plane. Inventory involves storing metadata on assets and relationships discovered by the discovery components or imported by customer. The inventory is implemented using an inventory control plane on the cloud infrastructure side. The inventory control plane comprises customer facing API, deployed in the overlay, backed by one or more database based datastores.

In various embodiments, a computer-implemented process is provided that includes deploying a remote agent appliance in an external environment of a user, where the remote agent appliance comprises a discovery plugin; creating an asset source specifying a location of the external environment from which external assets and associated asset metadata should be discovered along with a reference to credentials stored in a data store; creating a discovery policy for discovering the external assets within the asset source; generating a discovery job for the purpose of retrieving the asset metadata for the external assets discovered within the asset source; executing, using the discovery plugin, the discovery job to discover the external assets within the asset source based on the discovery policy, where the executing the discovery job comprises retrieving the asset metadata for the external assets discovered within the asset source and populating an inventory with the asset metadata, and where the inventory contains a collection of assets that includes the asset metadata for the external assets; and providing the collection of assets and the associated asset metadata within the inventory to the user. In some instances, an asset analytic API is also provided to the user to help the user aggregate the asset metadata to gain insight into user's external environment (e.g., on-premises environment).

As used herein, when an action is "based on" something, this means the action is based at least in part on at least a part of the something. As used herein, the terms "similarly", "substantially," "approximately" and "about" are defined as being largely but not necessarily wholly what is specified (and include wholly what is specified) as understood by one of ordinary skill in the art. In any disclosed embodiment, the term "similarly", "substantially," "approximately," or "about" may be substituted with "within [a percentage] of" what is specified, where the percentage includes 0.1, 1, 5, and 10 percent.

Examples of Cloud Networks

The term cloud service is generally used to refer to a service that is made available by a cloud services provider (CSP) to users (e.g., cloud service customers) on demand (e.g., via a subscription model) using systems and infrastructure (cloud infrastructure) provided by the CSP. Typically, the servers and systems that make up the CSP's infrastructure are separate from the user's own on-premise servers and systems. Users can thus avail themselves of cloud services provided by the CSP without having to purchase separate hardware and software resources for the services. Cloud services are designed to provide a subscribing user easy, scalable access to applications and computing resources without the user having to invest in procuring the infrastructure that is used for providing the services.

There are several cloud service providers that offer various types of cloud services. As discussed herein, there are various types or models of cloud services including SaaS, PaaS, IaaS, and others. A user can subscribe to one or more cloud services provided by a CSP. The user can be any entity such as an individual, an organization, an enterprise, and the like. When a user subscribes to or registers for a service provided by a CSP, a tenancy or an account is created for that user. The user can then, via this account, access the subscribed-to one or more cloud resources associated with the account.

As noted above, IaaS is one particular type of cloud computing service. In an IaaS model, the CSP provides infrastructure (referred to as cloud services provider infrastructure or CSPI) that can be used by users to build their own customizable networks and deploy user resources. The user's resources and networks are thus hosted in a distributed environment by infrastructure provided by a CSP. This is different from traditional computing, where the user's resources and networks are hosted by infrastructure provided by the user.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The physical network (or substrate network or underlay network) comprises physical network devices such as physical switches, routers, computers and host machines, and the like. An overlay network is a logical (or virtual) network that runs on top of a physical substrate network. A given physical network can support one or multiple overlay networks. Overlay networks typically use encapsulation techniques to differentiate between traffic belonging to different overlay networks. A virtual or overlay network is also referred to as a virtual cloud network (VCN). The virtual networks are implemented using software virtualization technologies (e.g., hypervisors, virtualization functions implemented by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)), Virtual Extensible LAN (VXLAN—IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable users to build and run a wide range of applications and services in a highly available hosted distributed environment. CSPI offers high-performance compute resources and capabilities and storage capacity in a flexible virtual network that is securely accessible from various networked locations such as from a user's on-premises network. When a user subscribes to or registers for an IaaS service provided by a CSP, the tenancy created for that user is a secure and isolated partition within the CSPI where the user can create, organize, and administer their cloud resources.

Users can build their own virtual networks using compute, memory, and networking resources provided by CSPI. One or more user resources or workloads, such as compute instances, can be deployed on these virtual networks. For example, a user can use resources provided by CSPI to build one or multiple customizable and private virtual network(s) referred to as virtual cloud networks (VCNs). A user can deploy one or more user resources, such as compute instances, on a user VCN. Compute instances can take the form of virtual machines, bare metal instances, and the like. The CSPI thus provides infrastructure and a set of complementary cloud services that enable users to build and run a wide range of applications and services in a highly available virtual hosted environment. The user does not manage or control the underlying physical resources provided by CSPI but has control over operating systems, storage, and deployed applications; and possibly limited control of select networking components (e.g., firewalls).

The CSP may provide a console that enables users and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single user or tenant. In a multi-tenancy architecture, a software or a hardware component serves multiple users or tenants. Thus, in a multi-tenancy architecture, CSPI resources are shared between multiple users or tenants. In a multi-tenancy situation, precautions are taken and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. User traffic is encapsulated to facilitate routing in the virtual network.

Accordingly, physical addresses (e.g., physical IP addresses) are associated with components in physical networks and overlay addresses (e.g., overlay IP addresses) are associated with entities in virtual or overlay networks. A physical IP address is an IP address associated with a physical device (e.g., a network device) in the substrate or physical network. For example, each NVD has an associated physical IP address. An overlay IP address is an overlay address associated with an entity in an overlay network, such as with a compute instance in a user's VCN. Two different users or tenants, each with their own private VCNs can potentially use the same overlay IP address in their VCNs without any knowledge of each other. Both the physical IP addresses and overlay IP addresses are types of real IP addresses. These are separate from virtual IP addresses. A virtual IP address is typically a single IP address that is represents or maps to multiple real IP addresses. A virtual IP address provides a 1-to-many mapping between the virtual IP address and multiple real IP addresses. For example, a load balancer may use a VIP to map to or represent multiple servers, each server having its own real IP address.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in a virtual network built on top of the physical network components. In certain embodiments, the CSPI is organized and hosted in realms, regions and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., VCNs), load balancing resources, connections to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a VCN, or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, users' on-premise networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A user's tenancy or account with the CSP exists in a single realm and can be spread across one or more regions that belong to that realm. Typically, when a user subscribes to an IaaS service, a tenancy or account is created for that user in the user-specified region (referred to as the "home" region) within a realm. A user can extend the user's tenancy across one or more other regions within the realm. A user cannot access regions that are not in the realm where the user's tenancy exists.

An IaaS provider can provide multiple realms, each realm catered to a particular set of users or users. For example, a commercial realm may be provided for commercial users. As another example, a realm may be provided for a specific country for users within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a user subscribes to an IaaS service, resources from CSPI are provisioned for the user and associated with the user's tenancy. The user can use these provisioned resources to build private networks and deploy resources on these networks. The user networks that are hosted in the cloud by the CSPI are referred to as VCNs. A user can set up one or more virtual cloud networks (VCNs) using CSPI resources allocated for the user. A VCN is a virtual or software defined private network. The user resources that are deployed in the user's VCN can include compute instances (e.g., virtual machines, bare-metal instances) and other resources. These compute instances may represent various user workloads such as applications, load balancers, databases, and the like. A compute instance deployed on a VCN can communicate with public accessible endpoints ("public endpoints") over a public network such as the Internet, with other instances in the same VCN or other VCNs (e.g., the user's other VCNs, or VCNs not belonging to the user), with the user's on-premise data centers or networks, and with service endpoints, and other types of endpoints.

The CSP may provide various services using the CSPI. In some instances, users of CSPI may themselves act like service providers and provide services using CSPI resources. A service provider may expose a service endpoint, which is characterized by identification information (e.g., an IP Address, a DNS name and port). A user's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Users of the service can then use this service endpoint to access the service. In certain implementations, a service endpoint provided for a service can be accessed by multiple users that intend to consume that service. In other implementations, a dedicated service endpoint may be provided for a user such that only that user can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN.

Each compute instance is associated with a virtual network interface card (VNIC), that enables the compute instance to participate in a subnet of a VCN. A VNIC is a logical representation of physical Network Interface Card (NIC). In general. a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and Dynamic Host Configuration Protocol (DHCP) options. As described above, each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A user can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG. 1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The user can choose whether a given rule is stateful or stateless. For instance, the user can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control plane. The configuration information for a VCN may include, for example, information about: the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control plane (CP) and the launching of compute instances is handled by a Compute Control plane. The Compute Control plane is responsible for allocating the physical resources for the compute instance and then calls the VCN Control plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane.

A user may create one or more VCNs using resources hosted by CSPI. A compute instance deployed on a user VCN may communicate with different endpoints. These endpoints can include endpoints that are hosted by CSPI and endpoints outside CSPI.

Various different architectures for implementing cloud-based service using CSPI are depicted in FIGS. 1-4C, and are described below. FIG. 1 is a high level diagram of a distributed environment 100 showing an overlay or user VCN hosted by CSPI according to certain embodiments. The distributed environment depicted in FIG. 1 includes multiple components in the overlay network. Distributed environment 100 depicted in FIG. 1 is merely an example and is not intended to unduly limit the scope of claimed embodiments. Many variations, alternatives, and modifications are possible. For example, in some implementations, the distributed environment depicted in FIG. 1 may have more or fewer systems or components than those shown in FIG. 1, may combine two or more systems, or may have a different configuration or arrangement of systems.

As shown in the example depicted in FIG. 1, distributed environment 100 comprises CSPI 101 that provides services and resources that users can subscribe to and use to build their VCNs. In certain embodiments, CSPI 101 offers IaaS services to subscribing users. The data centers within CSPI 101 may be organized into one or more regions. One example region "Region US" 102 is shown in FIG. 1. A user has configured a user VCN c/o Oracle International Corporation for region 102. The user may deploy various compute instances on VCN 104, where the compute instances may include virtual machines or bare metal instances. Examples of instances include applications, database, load balancers, and the like.

In the embodiment depicted in FIG. 1, user VCN 104 comprises two subnets, namely, "Subnet-1" and "Subnet-2", each subnet with its own CIDR IP address range. In FIG. 1, the overlay IP address range for Subnet-1 is 10.0/16 and the address range for Subnet-2 is 10.1/16. A VCN Virtual Router 105 represents a logical gateway for the VCN that enables communications between subnets of the VCN 104, and with other endpoints outside the VCN. VCN VR 105 is configured to route traffic between VNICs in VCN 104 and gateways associated with VCN 104. VCN VR 105 provides a port for each subnet of VCN 104. For example, VR 105 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 101. A compute instance participates in a subnet via a VNIC associated with the compute instance. For example, as shown in FIG. 1, a compute instance C1 is part of Subnet-1 via a VNIC associated with C1. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a MAC address. For example, in FIG. 1, compute instance C1 has an overlay IP address of 10.0.0.2 and a MAC address of M1, while compute instance C2 has an private overlay IP address of 10.0.0.3 and a MAC address of M2. Each compute instance in Subnet-1, including compute instances C1 and C2, has a default route to VCN VR 105 using IP address 10.0.0.1, which is the IP address for a port of VCN VR 105 for Subnet-1.

Subnet-2 can have multiple compute instances deployed on it, including virtual machine instances and/or bare metal instances. For example, as shown in FIG. 1, compute instances D1 and D2 are part of Subnet-2 via VNICs associated with the respective compute instances. In the embodiment depicted in FIG. 1, compute instance D1 has an overlay IP address of 10.1.0.2 and a MAC address of MM1, while compute instance D2 has an private overlay IP address of 10.1.0.3 and a MAC address of MM2. Each compute instance in Subnet-2, including compute instances D1 and D2, has a default route to VCN VR 105 using IP address 10.1.0.1, which is the IP address for a port of VCN VR 105 for Subnet-2.

VCN A 104 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 104 can communicate with various different endpoints. These endpoints may include endpoints that are hosted by CSPI 101 and endpoints outside CSPI 101. Endpoints that are hosted by CSPI 101 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region 106 or 110, communications between a compute instance in Subnet-1 and an endpoint in service network 110 in the same region); or an endpoint in a VCN in a different region (e.g., communications between a compute instance in Subnet-1 and an endpoint in a VCN in a different region 108). A compute instance in a subnet hosted by CSPI 101 may also communicate with endpoints that are not hosted by CSPI 101 (i.e., are outside CSPI 101). These outside endpoints include endpoints in the user's on-premise network 116, endpoints within other remote cloud hosted networks 118, public endpoints 114 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 1 wants to send a packet to compute instance D1 in Subnet-2, the packet is first processed by the VNIC associated with compute instance C1. The VNIC associated with compute instance C1 is configured to route the packet to the VCN VR 105 using default route or port 10.0.0.1 of the VCN VR. VCN VR 105 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 104 to an endpoint that is outside VCN 104, the communication is facilitated by the VNIC associated with the source compute instance, VCN VR 105, and gateways associated with VCN 104. One or more types of gateways may be associated with VCN 104. A gateway is an interface between a VCN and another endpoint, where the another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet) or over private networks. Various communication protocols may be used for these communications.

For example, compute instance C1 may want to communicate with an endpoint outside VCN 104. The packet may be first processed by the VNIC associated with source compute instance C1. The VNIC processing determines that the destination for the packet is outside the Subnet-1 of C1. The VNIC associated with C1 may forward the packet to VCN VR 105 for VCN 104. VCN VR 105 then processes the packet and as part of the processing, based upon the destination for the packet, determines a particular gateway associated with VCN 104 as the next hop for the packet. VCN VR 105 may then forward the packet to the particular identified gateway. For example, if the destination is an endpoint within the user's on-premise network, then the packet may be forwarded by VCN VR 105 to Dynamic Routing Gateway (DRG) gateway 122 configured for VCN 104. The packet may then be forwarded from the gateway to a next hop to facilitate communication of the packet to it final intended destination.

Various different types of gateways may be configured for a VCN. Examples of gateways that may be configured for a VCN are depicted in FIG. 1 and described below. As shown in the embodiment depicted in FIG. 1, a Dynamic Routing Gateway (DRG) 122 may be added to or be associated with user VCN 104 and provides a path for private network traffic communication between user VCN 104 and another endpoint, where the another endpoint can be the user's on-premise network 116, a VCN 108 in a different region of CSPI 101, or other remote cloud networks 118 not hosted by CSPI 101. User on-premise network 116 may be a user network or a user data center built using the user's resources. Access to user on-premise network 116 is generally very restricted. For a user that has both a user on-premise network 116 and one or more VCNs 104 deployed or hosted in the cloud by CSPI 101, the user may want their on-premise network 116 and their cloud-based VCN 104 to be able to communicate with each other. This enables a user to build an extended hybrid environment encompassing the user's VCN 104 hosted by CSPI 101 and their on-premises network 116. DRG 122 enables this communication. To enable such communications, a communication channel 124 is set up where one endpoint of the channel is in user on-premise network 116 and the other endpoint is in CSPI 101 and connected to user VCN 104. Communication channel 124 can be over public communication networks such as the Internet or private communication networks. Various different communication protocols may be used such as IPsec VPN technology over a public communication network such as the Internet, Oracle's FastConnect technology that uses a private network instead of a public network, and others. The device or equipment in user on-premise network 116 that forms one endpoint for communication channel 124 is referred to as the user premise equipment (CPE), such as CPE 126 depicted in FIG. 1. On the CSPI 101 side, the endpoint may be a host machine executing DRG 122.

In certain embodiments, a Remote Peering Connection (RPC) can be added to a DRG, which allows a user to peer one VCN with another VCN in a different region. Using such an RPC, user VCN 104 can use DRG 122 to connect with a VCN 108 in another region. DRG 122 may also be used to communicate with other remote cloud networks 118, not hosted by CSPI 101 such as a Microsoft Azure cloud, Amazon AWS cloud, and others.

As shown in FIG. 1, an Internet Gateway (IGW) 120 may be configured for user VCN 104 the enables a compute instance on VCN 104 to communicate with public endpoints 114 accessible over a public network such as the Internet. IGW 120 is a gateway that connects a VCN to a public network such as the Internet. IGW 120 enables a public subnet (where the resources in the public subnet have public overlay IP addresses) within a VCN, such as VCN 104, direct access to public endpoints 112 on a public network 114 such as the Internet. Using IGW 120, connections can be initiated from a subnet within VCN 104 or from the Internet.

A Network Address Translation (NAT) gateway 128 can be configured for user's VCN 104 and enables cloud resources in the user's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 104, with private access to public endpoints on the Internet. In NAT gateways, connections can be initiated only from the private subnet to the public Internet and not from the Internet to the private subnet.

In certain embodiments, a Service Gateway (SGW) 126 can be configured for user VCN 104 and provides a path for private network traffic between VCN 104 and supported services endpoints in a service network 110. In certain embodiments, service network 110 may be provided by the CSP and may provide various services. An example of such a service network is Oracle's Services Network, which provides various services that can be used by users. For example, a compute instance (e.g., a database system) in a private subnet of user VCN 104 can back up data to a service endpoint (e.g., Object Storage) without needing public IP addresses or access to the Internet. In certain embodiments, a VCN can have only one SGW, and connections can only be initiated from a subnet within the VCN and not from service network 110. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 126 uses the concept of a service Classless Inter-Domain Routing (CIDR) label, which is a string that represents all the regional public IP address ranges for the service or group of services of interest. The user uses the service CIDR label when they configure the SGW and related route rules to control traffic to the service. The user can optionally utilize it when configuring security rules without needing to adjust them if the service's public IP addresses change in the future.

A Local Peering Gateway (LPG) 132 is a gateway that can be added to user VCN 104 and enables VCN 104 to peer with another VCN in the same region. Peering means that the VCNs communicate using private IP addresses, without the traffic traversing a public network such as the Internet or without routing the traffic through the user's on-premises network 116. In preferred embodiments, a VCN has a separate LPG for each peering it establishes. Local Peering or VCN Peering is a common practice used to establish network connectivity between different applications or infrastructure management functions.

Service providers, such as providers of services in service network 110, may provide access to services using different access models. According to a public access model, services may be exposed as public endpoints that are publicly accessible by compute instance in a user VCN via a public network such as the Internet and or may be privately accessible via SGW 126. According to a specific private access model, services are made accessible as private IP endpoints in a private subnet in the user's VCN. This is referred to as a Private Endpoint (PE) access and enables a service provider to expose their service as an instance in the user's private network. A Private Endpoint resource represents a service within the user's VCN. Each PE manifests as a VNIC (referred to as a PE-VNIC, with one or more private IPs) in a subnet chosen by the user in the user's VCN. A PE thus provides a way to present a service within a private user VCN subnet using a VNIC. Since the endpoint is exposed as a VNIC, all the features associates with a VNIC such as routing rules, security lists, etc., are now available for the PE VNIC.

A service provider can register their service to enable access through a PE. The provider can associate policies with the service that restricts the service's visibility to the user tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the user VCN can access the service by sending traffic to the private IP address of the PE in the user VCN. A Private Access Gateway (PAGW) 130 is a gateway resource that can be attached to a service provider VCN (e.g., a VCN in service network 110) that acts as an ingress/egress point for all traffic from/to user subnet private endpoints. PAGW 130 enables a provider to scale the number of PE connections without utilizing its internal IP address resources. A provider needs only configure one PAGW for any number of services registered in a single VCN. Providers can represent a service as a private endpoint in multiple VCNs of one or more users. From the user's perspective, the PE VNIC, which, instead of being attached to a user's instance, appears attached to the service with which the user wishes to interact. The traffic destined to the private endpoint is routed via PAGW 130 to the service. These are referred to as user-to-service private connections (C2S connections).

The PE concept can also be used to extend the private access for the service to user's on-premises networks and data centers, by allowing the traffic to flow through FastConnect/IPsec links and the private endpoint in the user VCN. Private access for the service can also be extended to the user's peered VCNs, by allowing the traffic to flow between LPG 132 and the PE in the user's VCN.

A user can control routing in a VCN at the subnet level, so the user can specify which subnets in the user's VCN, such as VCN 104, use each gateway. A VCN's route tables are used to decide if traffic is allowed out of a VCN through a particular gateway. For example, in a particular instance, a route table for a public subnet within user VCN 104 may send non-local traffic through IGW 120. The route table for a private subnet within the same user VCN 104 may send traffic destined for CSP services through SGW 126. All remaining traffic may be sent via the NAT gateway 128. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked and the response is automatically allowed without an explicit security list rule for the response traffic) or stateless.

Access from a user VCN (i.e., by a resource or compute instance deployed on VCN 104) can be categorized as public access, private access, or dedicated access. Public access refers to an access model where a public IP address or a NAT is used to access a public endpoint. Private access enables user workloads in VCN 104 with private IP addresses (e.g., resources in a private subnet) to access services without traversing a public network such as the Internet. In certain embodiments, CSPI 101 enables user VCN workloads with private IP addresses to access the (public service endpoints of) services using a service gateway. A service gateway thus offers a private access model by establishing a virtual link between the user's VCN and the service's public endpoint residing outside the user's private network.

Additionally, CSPI may offer dedicated public access using technologies such as FastConnect public peering where user on-premises instances can access one or more services in a user VCN using a FastConnect connection and without traversing a public network such as the Internet. CSPI also may also offer dedicated private access using FastConnect private peering where user on-premises instances with private IP addresses can access the user's VCN workloads using a FastConnect connection. FastConnect is a network connectivity alternative to using the public Internet to connect a user's on-premise network to CSPI and its services. FastConnect provides an easy, elastic, and economical way to create a dedicated and private connection with higher bandwidth options and a more reliable and consistent networking experience when compared to Internet-based connections.

Figure 2:
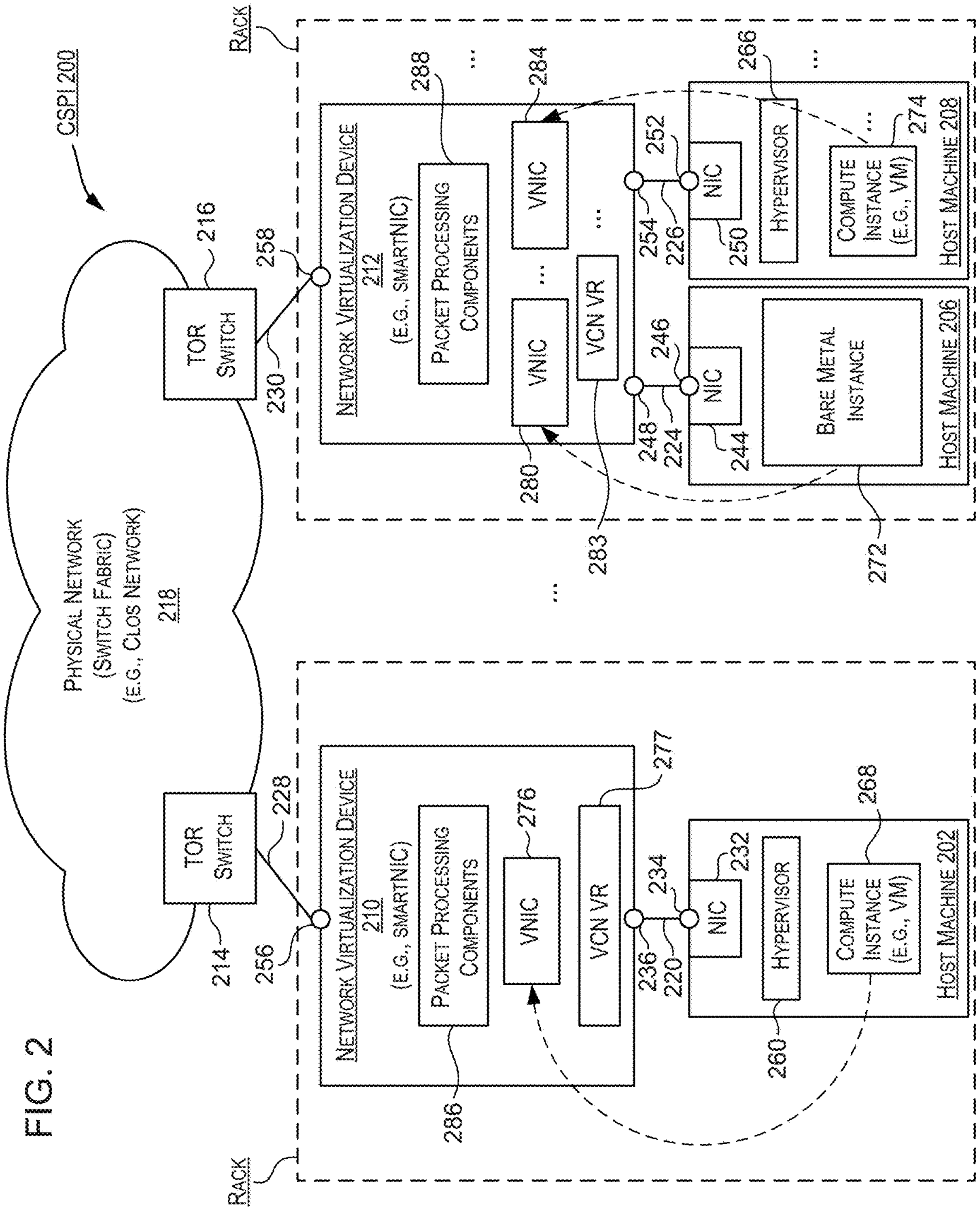
FIG. 2 is a simplified architectural diagram of the physical components in the physical network within a cloud service provider infrastructure that provide the underlay for a virtual network according to various embodiments.

FIG. 1 and the accompanying description above describes various virtualized components in an example virtual network. As described above, the virtual network is built on the underlying physical or substrate network. FIG. 2 depicts a simplified architectural diagram of the physical components in the physical network within CSPI 200 that provide the underlay for the virtual network according to certain embodiments. As shown, CSPI 200 provides a distributed environment comprising components and resources (e.g., compute, memory, and networking resources) provided by a CSP. These components and resources are used to provide cloud services (e.g., IaaS services) to subscribing users, i.e., users that have subscribed to one or more services provided by the CSP. Based upon the services subscribed to by a user, a subset of resources (e.g., compute, memory, and networking resources) of CSPI 200 are provisioned for the user. Users can then build their own cloud-based (i.e., CSPI-hosted) customizable and private virtual networks using physical compute, memory, and networking resources provided by CSPI 200. As previously indicated, these user networks are referred to as VCNs. A user can deploy one or more user resources, such as compute instances, on these user VCNs. Compute instances can be in the form of virtual machines, bare metal instances, and the like. CSPI 200 provides infrastructure and a set of complementary cloud services that enable users to build and run a wide range of applications and services in a highly available hosted environment.

In the example embodiment depicted in FIG. 2, the physical components of CSPI 200 include one or more physical host machines or physical servers (e.g., 202, 206, 208), network virtualization devices (NVDs) (e.g., 210, 212), top-of-rack (TOR) switches (e.g., 214, 216), and a physical network (e.g., 218), and switches in physical network 218. The physical host machines or servers may host and execute various compute instances that participate in one or more subnets of a VCN. The compute instances may include virtual machine instances, and bare metal instances. For example, the various compute instances depicted in FIG. 1 may be hosted by the physical host machines depicted in FIG. 2. The virtual machine compute instances in a VCN may be executed by one host machine or by multiple different host machines. The physical host machines may also host virtual host machines, container-based hosts or functions, and the like. The VNICs and VCN VR depicted in FIG. 1 may be executed by the NVDs depicted in FIG. 2. The gateways depicted in FIG. 1 may be executed by the host machines and/or by the NVDs depicted in FIG. 2.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 2, host machines 202 and 208 execute hypervisors 260 and 266, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 2, hypervisor 260 may sit on top of the OS of host machine 202 and enables the computing resources (e.g., processing, memory, and networking resources) of host machine 202 to be shared between compute instances (e.g., virtual machines) executed by host machine 202. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 2 may have the same or different types of hypervisors.

A compute instance can be a virtual machine instance or a bare metal instance. In FIG. 2, compute instance 268 on host machine 202 and compute instance 274 on host machine 208 are examples of virtual machine instances. Host machine 206 is an example of a bare metal instance 272 that is provided to a user.

In certain instances, an entire host machine may be provisioned to a single user, and all of the one or more compute instances (either virtual machines or bare metal instance) hosted by that host machine belong to that same user. In other instances, a host machine may be shared between multiple users (i.e., multiple tenants). In such a multi-tenancy scenario, a host machine may host virtual machine compute instances belonging to different users. These compute instances may be members of different VCNs of different users. In certain embodiments, a bare metal compute instance is hosted by a bare metal server without a hypervisor. When a bare metal compute instance is provisioned, a single user or tenant maintains control of the physical CPU, memory, and network interfaces of the host machine hosting the bare metal instance and the host machine is not shared with other users or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 2, host machine 202 executes a virtual machine compute instance 268 that is associated with VNIC 276, and VNIC 276 is executed by NVD 210 connected to host machine 202. As another example, bare metal instance 272 hosted by host machine 206 is associated with VNIC 280 that is executed by NVD 212 connected to host machine 206. As yet another example, VNIC 284 is associated with compute instance 274 executed by host machine 208, and VNIC 284 is executed by NVD 212 connected to host machine 208.

For compute instances hosted by a host machine, an NVD connected to that host machine also executes VCN VRs corresponding to VCNs of which the compute instances are members. For example, in the embodiment depicted in FIG. 2, NVD 210 executes VCN VR 277 corresponding to the VCN of which compute instance 268 is a member. NVD 212 may also execute one or more VCN VRs 283 corresponding to VCNs corresponding to the compute instances hosted by host machines 206 and 208.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 2, host machine 202 is connected to NVD 210 using link 220 that extends between a port 234 provided by a NIC 232 of host machine 202 and between a port 236 of NVD 210. Host machine 206 is connected to NVD 212 using link 224 that extends between a port 246 provided by a NIC 244 of host machine 206 and between a port 248 of NVD 212. Host machine 208 is connected to NVD 212 using link 226 that extends between a port 252 provided by a NIC 250 of host machine 208 and between a port 254 of NVD 212.

The NVDs are in turn connected via communication links to top-of-the-rack (TOR) switches, which are connected to physical network 218 (also referred to as the switch fabric). In certain embodiments, the links between a host machine and an NVD, and between an NVD and a TOR switch are Ethernet links. For example, in FIG. 2, NVDs 210 and 212 are connected to TOR switches 214 and 216, respectively, using links 228 and 230. In certain embodiments, the links 220, 224, 226, 228, and 230 are Ethernet links. The collection of host machines and NVDs that are connected to a TOR is sometimes referred to as a rack.

Figure 5:
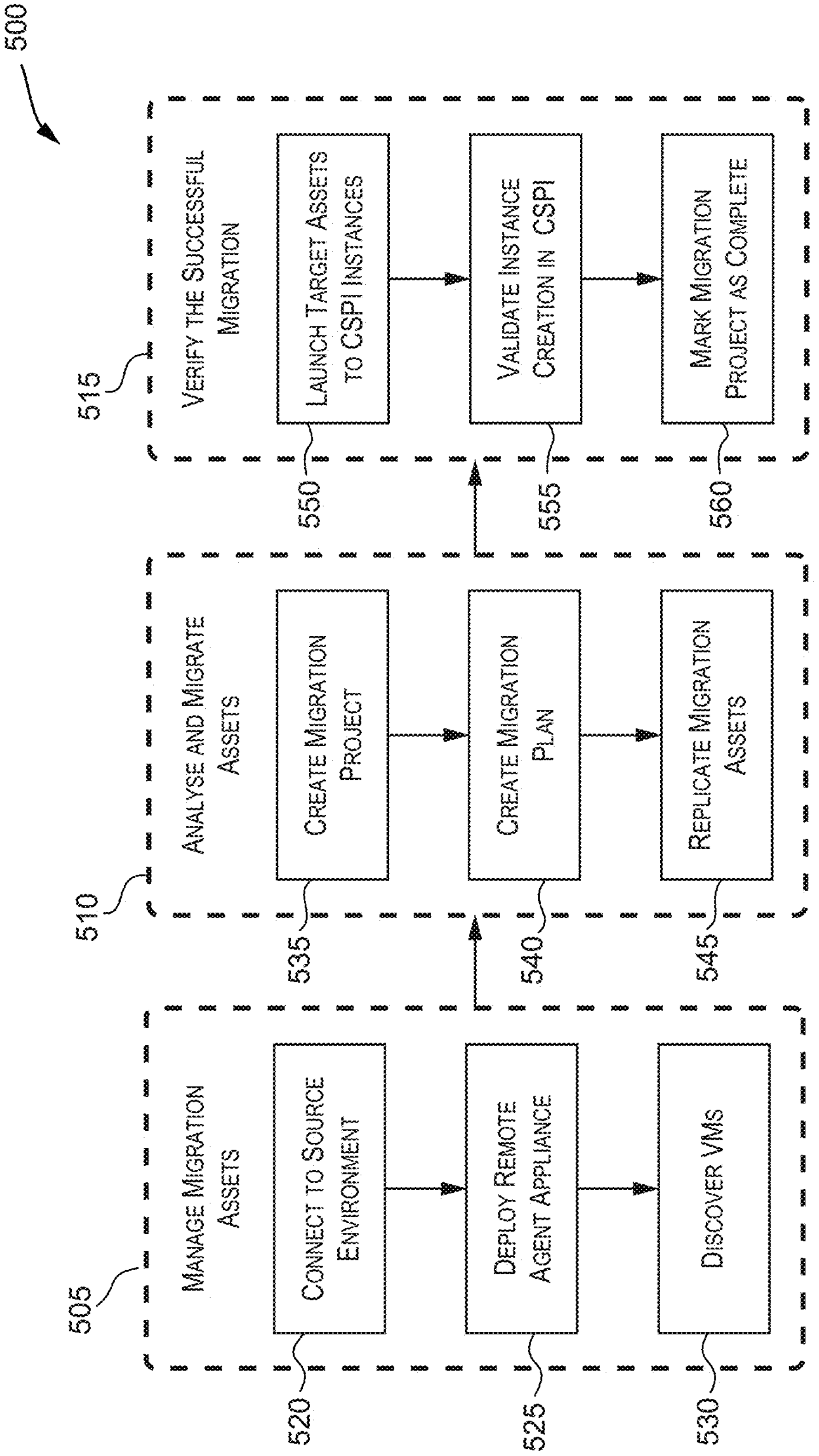
FIG. 5 is a schematic depiction of a cloud migration workflow in accordance with various embodiments.

Physical network 218 provides a communication fabric that enables TOR switches to communicate with each other. Physical network 218 can be a multi-tiered network. In certain implementations, physical network 218 is a multi-tiered Clos network of switches, with TOR switches 214 and 216 representing the leaf level nodes of the multi-tiered and multi-node physical switching network 218. Different Clos network configurations are possible including but not limited to a 2-tier network, a 3-tier network, a 4-tier network, a 5-tier network, and in general a "n"-tiered network. An example of a Clos network is depicted in FIG. 5 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 2, host machine 202 is connected to NVD 210 via NIC 232 of host machine 202. In a many-to-one configuration, multiple host machines are connected to one NVD. For example, in FIG. 2, host machines 206 and 208 are connected to the same NVD 212 via NICs 244 and 250, respectively.

Figure 3:
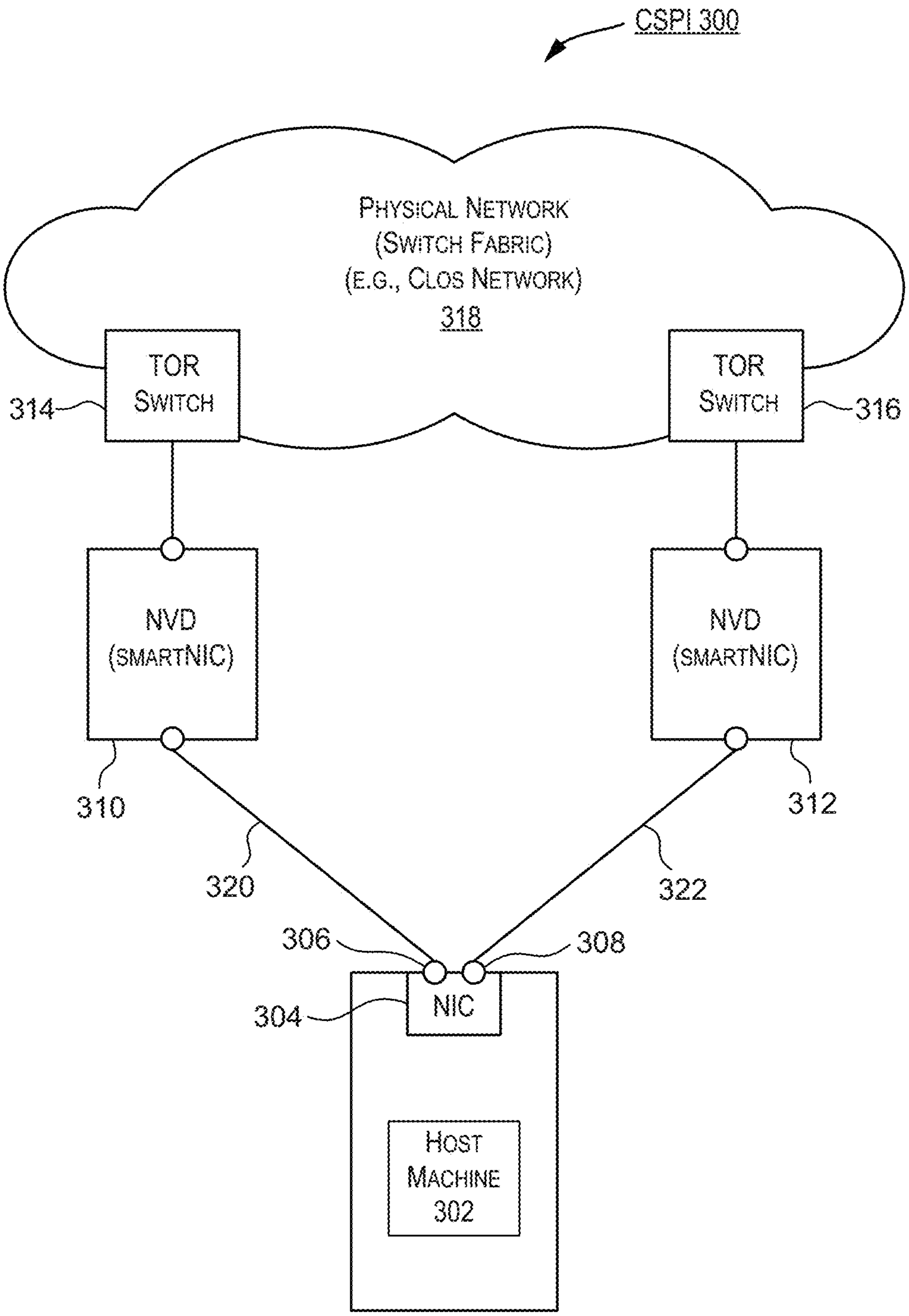
FIG. 3 shows an example within a cloud service provider infrastructure where a host machine is connected to multiple network virtualization devices according to various embodiments.

In a one-to-many configuration, one host machine is connected to multiple NVDs. FIG. 3 shows an example within CSPI 300 where a host machine is connected to multiple NVDs. As shown in FIG. 3, host machine 302 comprises a network interface card (NIC) 304 that includes multiple ports 306 and 308. Host machine 300 is connected to a first NVD 310 via port 306 and link 320, and connected to a second NVD 312 via port 308 and link 322. Ports 306 and 308 may be Ethernet ports and the links 320 and 322 between host machine 302 and NVDs 310 and 312 may be Ethernet links. NVD 310 is in turn connected to a first TOR switch 314 and NVD 312 is connected to a second TOR switch 316. The links between NVDs 310 and 312, and TOR switches 314 and 316 may be Ethernet links. TOR switches 314 and 316 represent the Tier-0 switching devices in multi-tiered physical network 318.

The arrangement depicted in FIG. 3 provides two separate physical network paths to and from physical switch network 318 to host machine 302: a first path traversing TOR switch 314 to NVD 310 to host machine 302, and a second path traversing TOR switch 316 to NVD 312 to host machine 302. The separate paths provide for enhanced availability (referred to as high availability) of host machine 302. If there are problems in one of the paths (e.g., a link in one of the paths goes down) or devices (e.g., a particular NVD is not functioning), then the other path may be used for communications to/from host machine 302.

In the configuration depicted in FIG. 3, the host machine is connected to two different NVDs using two different ports provided by a NIC of the host machine. In other embodiments, a host machine may include multiple NICs that enable connectivity of the host machine to multiple NVDs.

Referring back to FIG. 2, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent NIC with an embedded processor onboard. A smartNIC is a separate device from the NICs on the host machines. In FIG. 2, the NVDs 210 and 212 may be implemented as smartNICs that are connected to host machines 202, and host machines 206 and 208, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 200. For example, an NVD may be embodied in a host machine where the functions performed by an NVD are performed by the host machine. As another example, an NVD may be part of a TOR switch or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM) instances, are offered to users, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 2, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 2 include port 236 on NVD 210, and ports 248 and 254 on NVD 212. A network-facing port of an NVD is a port that is used to connect the NVD to a TOR switch. Examples of network-facing ports in FIG. 2 include port 256 on NVD 210, and port 258 on NVD 212. As shown in FIG. 2, NVD 210 is connected to TOR switch 214 using link 228 that extends from port 256 of NVD 210 to the TOR switch 214. Likewise, NVD 212 is connected to TOR switch 216 using link 230 that extends from port 258 of NVD 212 to the TOR switch 216.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two end-points (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with compute instances in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. The control plane functions include functions used for configuring a network (e.g., setting up routes and route tables, configuring VNICs, etc.) that controls how data is to be forwarded. In certain embodiments, a VCN Control plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the traverse the substrate network. The user's network packets before they encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 2, NVD 210 executes the functionality for VNIC 276 that is associated with compute instance 268 hosted by host machine 202 connected to NVD 210. As another example, NVD 212 executes VNIC 280 that is associated with bare metal compute instance 272 hosted by host machine 206, and executes VNIC 284 that is associated with compute instance 274 hosted by host machine 208. A host machine may host compute instances belonging to different VCNs, which belong to different users, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 2, NVD 210 executes VCN VR 277 corresponding to the VCN to which compute instance 268 belongs. NVD 212 executes one or more VCN VRs 283 corresponding to one or more VCNs to which compute instances hosted by host machines 206 and 208 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 2. For example, NVD 210 comprises packet processing components 286 and NVD 212 comprises packet processing components 288. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 1 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 1 may be executed or hosted by one or more of the physical components depicted in FIG. 2. For example, the compute instances in a VCN may be executed or hosted by one or more host machines depicted in FIG. 2. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a user VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination endpoint of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the user's on-premise network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 2, a packet originating from compute instance 268 may be communicated from host machine 202 to NVD 210 over link 220 (using NIC 232). On NVD 210, VNIC 276 is invoked since it is the VNIC associated with source compute instance 268. VNIC 276 is configured to examine the encapsulated information in the packet, and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 200 and endpoints outside CSPI 200. Endpoints hosted by CSPI 200 may include instances in the same VCN or other VCNs, which may be the user's VCNs, or VCNs not belonging to the user. Communications between endpoints hosted by CSPI 200 may be performed over physical network 218. A compute instance may also communicate with endpoints that are not hosted by CSPI 200, or are outside CSPI 200. Examples of these endpoints include endpoints within a user's on-premise network or data center, or public endpoints accessible over a public network such as the Internet. Communications with endpoints outside CSPI 200 may be performed over public networks (e.g., the Internet) (not shown in FIG. 2) or private networks (not shown in FIG. 2) using various communication protocols.

The architecture of CSPI 200 depicted in FIG. 2 is merely an example and is not intended to be limiting. Variations, alternatives, and modifications are possible in alternative embodiments. For example, in some implementations, CSPI 200 may have more or fewer systems or components than those shown in FIG. 2, may combine two or more systems, or may have a different configuration or arrangement of systems. The systems, subsystems, and other components depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Cloud Bridge and Cloud Migration Service Architectures

A CSPI (e.g., CSPI 101 and 200 described with respect to FIGS. 1 and 2) can be configured to provide a cloud integration service. At least a portion of the cloud integration service is provided using a cloud bridge service (e.g., the Oracle Cloud Bridge (OCB)) for the management and configuration of remote resources that interact with other cloud services provided by the CSPI. The cloud bridge addresses key aspects of this integration including automatic discovery and identity for remote resources, representation of remote resources as assets in the user tenancy, secure network connectivity between remote resources and the CSPI, lifecycle management of agent technology running in remote environments, and assisting with migration of existing user workloads from external environments to the CSPI. The cloud bridge enables users to give remote resources (e.g., databases, compute nodes, etc.) a virtual presence in the CSPI for seamless interaction with other cloud services provided by the CSPI. In order to enable the virtual presence, the cloud bridge provides the remote resources with unique cloud identifiers (CloudIDs, resource principles, etc.) and remote network connectivity for service interaction. This allows for the cloud bridge to be a single location for users to orchestrate and manage CSPI agent functionality on remote resources. For users, the cloud bridge provides a unified, cloud-centric experience across both cloud-native and remote resources with minimal setup in the remote environment. For CSPI service teams, the cloud bridge simplifies environment integration by allowing services to interact with remote resources as they would with cloud resources and by providing a standardized framework for deploying and managing remote agent functionality. This enables CSPI service teams to focus on the core cloud experience without being concerned about remote connectivity or software lifecycle management.

The cloud bridge is managed and configured via a console (e.g., the CSPI console described with respect to FIGS. 1 and 2), application programming interfaces (APIs), and a software development kit (SDK). The management and configuration of the cloud bridge is focused around three basic resource types—environments, agents, and assets. Users create an environment for each location where they desire access to other cloud services provided by the CSPI. The environment serves as a container for assets and defines the scope for managing default policy at that location.

An agent is part of a virtual machine that the user creates from an image provided by the cloud bridge. Agents serve as an extension of the cloud bridge services in the remote environment and are monitored, updated, and operated by the CSPI based on configuration of the associated environment. Agents provide the foundational cloud bridge services, such as remote asset discovery and inventory integration, and include a framework for service-specific plug-ins to execute in the environment. For example, Oracle Cloud Migration service deploys a replication plug-in that creates virtual machine snapshots and uploads them to OCI for migration into OCI compute. The cloud bridge allows users to select from a catalog of agent-based services and automatically deploy the associated functionality into the environments. The cloud bridge will monitor the deployed agents and software versions and provide manually triggered or automated lifecycle management. Multiple agents may exist in the same environment for redundancy and performance reasons.

An asset is a CSPI resource that represents a remote resource discovered by an agent, captures its properties in the remote environment and provides CSPI properties (e.g., CloudID, resource principle, etc.) for use across other cloud services provided by the CSPI. Users can manually add assets or trigger automatic discovery at the environment based on integrations with infrastructure/system management products such as Oracle Enterprise Manager and Microsoft Active Directory. The CSPI applies default access policies based on the asset type. For example, a database asset may default to allow only SSL-encrypted SQLNet connections. Environments and discovered assets can be managed through the asset inventory exposed to the user through the console. A user may choose to perform any action on an asset depending on the asset type and service plugins available for the asset type. For example, virtual machine asset types may support multiple actions: cloud migrate, for example with Oracle Cloud Migrations, as described in detail herein, expose as a VNIC with virtual networking or ship metrics to CSPI with observability. A database asset type may similarly support integration with various database services such as Data Safe and Database Migration services. The cloud bridge may also be integrated with various data management services such as Management Agent Cloud Service (MACS) agents which provide on-guest agent and agent plugin capabilities that gather additional metadata regarding the assets. MACs agents may use the cloud bridge agent framework, so the integration and capabilities are seamless to the user.

Figure 4A:
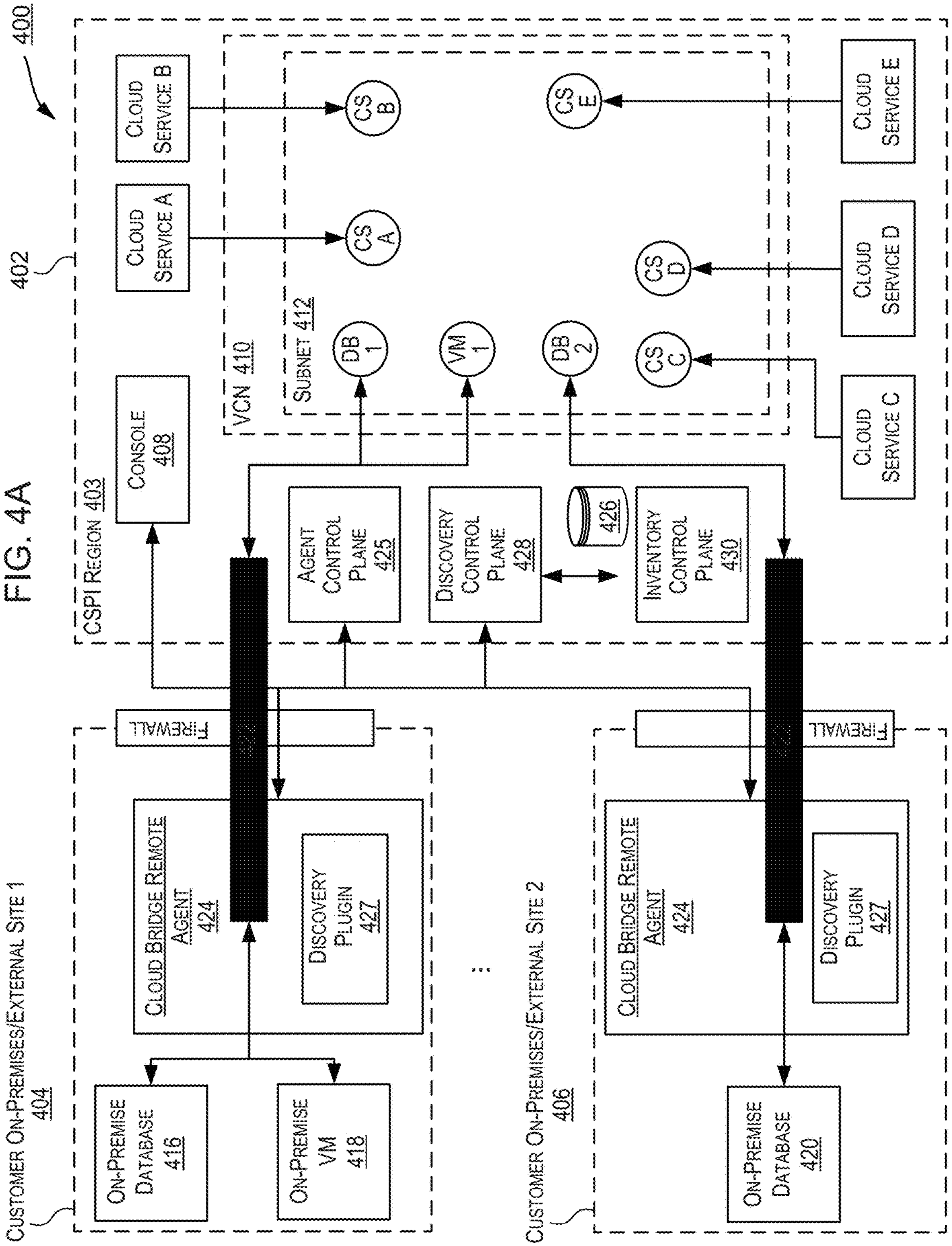
FIG. 4A is a high-level diagram of a distributed environment 400 showing a cloud bridge architecture for the management and configuration of remote resources that interact with cloud services according to various embodiments.

FIG. 4A is a high-level diagram of a distributed environment 400 showing a cloud bridge architecture for the management and configuration of remote resources that interact with cloud services according to certain embodiments. As shown in the example depicted in FIG. 4A, distributed environment 400 comprises a cloud infrastructure 402 (CSPI) that is physically hosted in one or more global regions 403 (i.e., data centers managed by a cloud services provider such as Oracle) and provides high-performance compute capabilities (as physical or virtual hardware instances) and storage capacity in a flexible overlay virtual network that is securely accessible from a user's on-premises network (e.g., on-premises network 404 and/or on-premises network 406). The CSPI 402 comprises a console 408 that enables users and network administrators to configure, access, and manage remote resources and resources deployed in the cloud using CSPI resources. In certain embodiments, the console 408 provides a web-based user interface that can be used to access and manage CSPI 402 and various services functionalities including the cloud bridge and migration services. In some implementations, the console 408 is a web-based application provided by the CSP.

A CSP may provide various services using the CSPI 402. In some instances, users of CSPI 402 may themselves act like service providers and provide services using CSPI 402 resources. The service providers may expose a service endpoint, which is characterized by identification information (e.g., an IP Address, a DNS name and port). A user's resource (e.g., a compute instance, on-premises resource, off-premises resource, etc.) can consume a particular service by accessing a service endpoint exposed by the service for that particular service. These service endpoints are generally endpoints that are publicly accessible by users using public IP addresses associated with the endpoints via a public communication network such as the Internet. In certain embodiments, a service provider may expose a service (e.g., Cloud Service A, Cloud Service B, Cloud Service C, Cloud Service D, Cloud Service E) via an endpoint (sometimes referred to as a service endpoint) (e.g., CSA, CSB, CSC, CSD, CSE) for the service. Users of the service can then use this service endpoint to access the service. In certain implementations, a service endpoint provided for a service can be accessed by multiple users that intend to consume that service. In other implementations, a dedicated service endpoint may be provided for a user such that only that user can access the service using that dedicated service endpoint.

CSPI 402 provides services and resources that users can subscribe to and use to build their VCNs. In certain embodiments, CSPI 402 offers IaaS and iPaaS services to subscribing users. In this example, a user has configured a VCN 410 for the global region 403. The user may deploy various compute instances on VCN 410, where the compute instances may include virtual machines or bare metal instances. Examples of instances include applications, database, load balancers, and the like. Multiple compute instances may be deployed on each subnet. In the embodiment depicted in FIG. 4A, the VCN 410 comprises a single subnet 412; however, it should be understood that the VCN 410 could be configured with any number of subnets. The compute instances in a subnet may be hosted by one or more host machines within CSPI 402. A compute instance participates in a subnet via a VNIC associated with the compute instance as described in detail with respect to FIG. 1.

A compute instance deployed on a subnet such as the subnet 412 of the VCN 410 can communicate with various different endpoints. These endpoints may include endpoints that are hosted by CSPI 402 and endpoints outside CSPI 402. Endpoints that are hosted by CSPI 402 may include: an endpoint on the same subnet as the particular compute instance; an endpoint on a different subnet but within the same VCN; an endpoint in a different VCN in the same region; or an endpoint in a VCN in a different region. A compute instance in a subnet hosted by CSPI 402 may also communicate with endpoints that are not hosted by CSPI 402 (i.e., are outside CSPI 402). These outside endpoints include endpoints in the user's on-premises network (e.g., on-premises network 404 and/or on-premises network 406), endpoints within other remote cloud hosted networks, public endpoints accessible via a public network such as the Internet, and other endpoints.

User on-premises network 404 and/or on-premises network 406 may be a user network or a user data center built using the user's resources. Although the user's external resources are all shown on-premises in FIG. 4A, it should be understood that the resources could also be off-premises such as part of a VCN in a CSPI of a different CSP. Access to on-premises network 404 and/or on-premises network 406 is generally very restricted. For a user that has both a user on-premises network 404 and/or on-premises network 406 and one or more VCNs 410 deployed or hosted in the cloud by CSPI 402, the user may want allow cloud services (e.g., cloud services A-E) to interact with a user's external resources (e.g., on-premises database 416, on-premise virtual machine 418, on-premises database 420, etc.). This enables a user to build an extended hybrid or multi-cloud environment encompassing the user's VCN 104 hosted by CSPI 101 and their external resources. The cloud bridge service enables this interaction. To enable such interaction, a communication channel 422 is set up where one endpoint of the channel is in on-premises network 404 and/or on-premises network 406 and the other endpoint is in CSPI 402 and connected to user VCN 410. Communication channel 422 can be over public communication networks such as the Internet or private communication networks. Various communication protocols may be used such as IPsec VPN technology over a public communication network such as the Internet, Oracle's FastConnect technology that uses a private network instead of a public network, and others. The software or virtual machine in user on-premises network 404 and/or on-premises network 406 that forms one endpoint for communication channel 422 is referred to as the agent 424. On the CSPI 402 side, the endpoint (e.g., DB1, DB2, VM1) may be a host machine executing a gateway such as DRG.

The cloud bridge service is comprised of the following three major functionalities: agents, assets discovery, and asset inventory.

Agent functionality enables the cloud services provided by CSPI 402 to interact with a user's external resources (e.g., on-premises database 416, on-premise virtual machine 418, and on-premises database 420). Agent functionality is implemented using agent 424 and its corresponding cloud bridge control plane 425 (also known as the agent or appliance control plane). The agent 424 is a specialized software component used as a platform for deploying cloud service functionalities to interact with external resources. Each agent 424 has a corresponding agent identifier (e.g., a CSPI identifier used to identify the asset as a CSPI 402 resource) and it is associated with an external site identifier (e.g., externalSiteId) for the external environment (e.g., on-premises network 404 and/or on-premises network 406) in which the agent 424 is deployed. The external site identifier is used to identify the external environment in which external resources and agents are deployed. The agent control plane 425 provides management and orchestration across the cloud bridge architecture such as agent registration and agent life cycle management.

Assets discovery functionality enables learning about a user's resources in external environments (e.g., on-premises network 404 and/or on-premises network 406) and creating/updating assets that represent the resources in a cloud bridge inventory 426. Assets are a CSPI 402 resource that represents the metadata of the resources present in the external environments such as vSphere VMs, EC2 instances, databases, etc. Each asset has an asset type defining the different kinds of assets, an asset identifier (e.g., a CSPI identifier used to identify the asset as a CSPI 402 resource), an associated external site identifier, and a source identifier used to identify a discovery plugin that discovered the resource associate with the asset. Assets discovery functionality is implemented using a discovery plugin 427 integrated with agent 425 and its corresponding discovery control plane 428. The discovery plugin 427 is a software component deployed in an external environment and provides functionalities such as asset-discovery, metadata and metrics collection, and reporting of resources and metadata to the inventory 426. The discovery control plane 428 comprises one or more applications deployed in an overlay, backed by a datastore (e.g., an autonomous transaction processing (ATP) datastore), and is responsible for handling asset-discovery-related requests received from a user facing API and the communication and coordination of tasks for discovery plugins 427.

Asset inventory functionality enables storing the metadata on assets and relationships discovered by assets discovery or imported by a user. Asset inventory also exposes a user's facing API for creating, fetching, searching, and analyzing various assets. Asset inventory is implemented using the inventory 426 and its corresponding inventory control plane 430. The inventory 426 is a region specific CSPI 402 resource (e.g., a data table or database) that supports the standard CRUDL operations. The inventory control plane 430 is applications deployed in an overlay, backed by a datastore (e.g., ATP datastore), and is responsible for handling asset-inventory-related requests received from a user facing API and the communication and coordination of tasks for inventory 426 and assets. In certain embodiments, the asset inventory functionality is restricted to a single inventory per region. Advantageously, this helps to de-duplicate the assets in a tenancy. Avoiding duplicate assets helps downstream services such as migration service and replication service, to avoid copying the same VM data multiple times and avoids creating multiple CSPI 402 resources for the same asset. This will also provide one global view of a user's assets across different external environments (e.g., multi-cloud services).

Figure 4B:
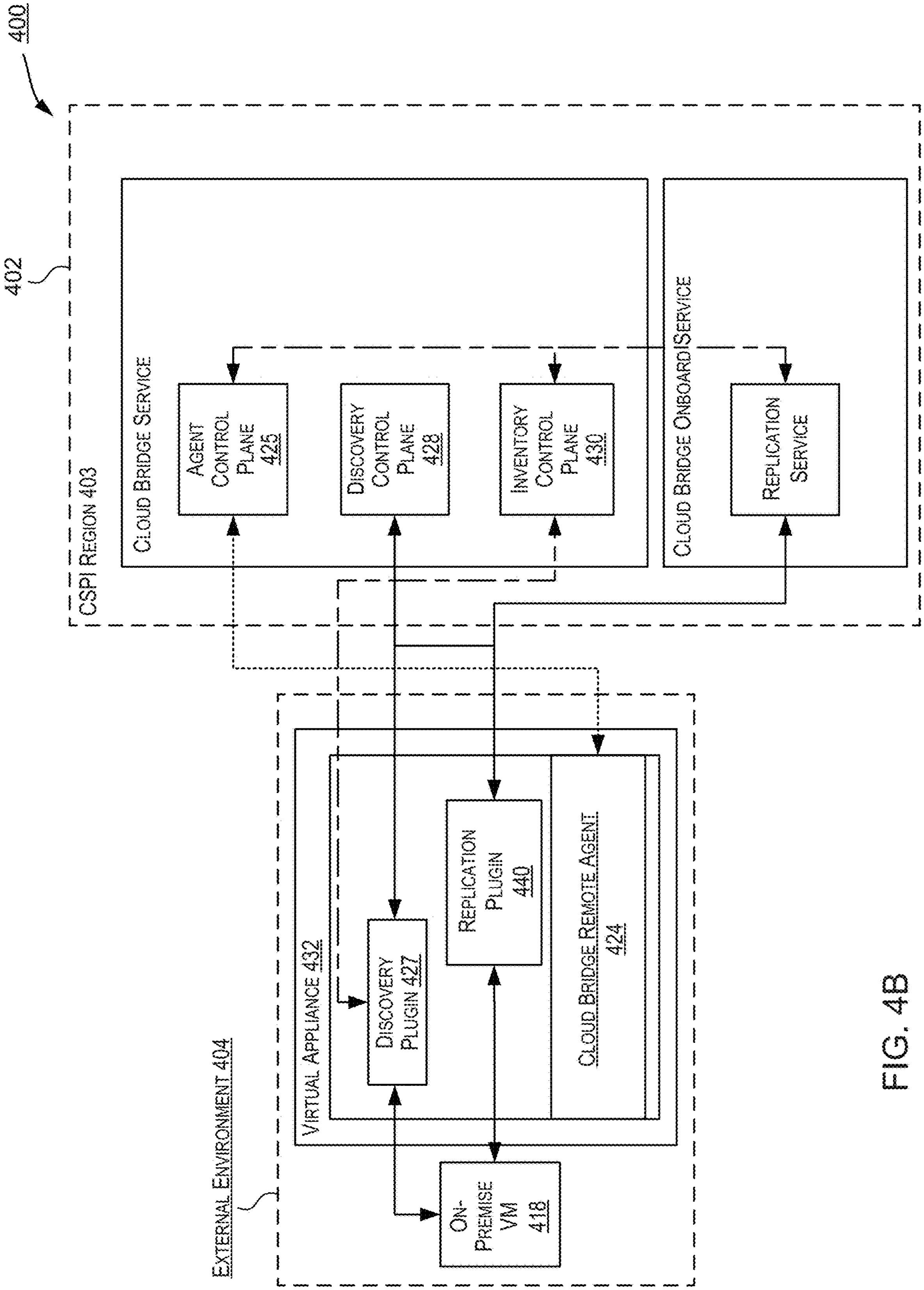
FIGS. 4B and 4C are simplified block diagrams showing an external environment of a user as part of a virtual appliance in accordance with various embodiments.
Figure 4C:
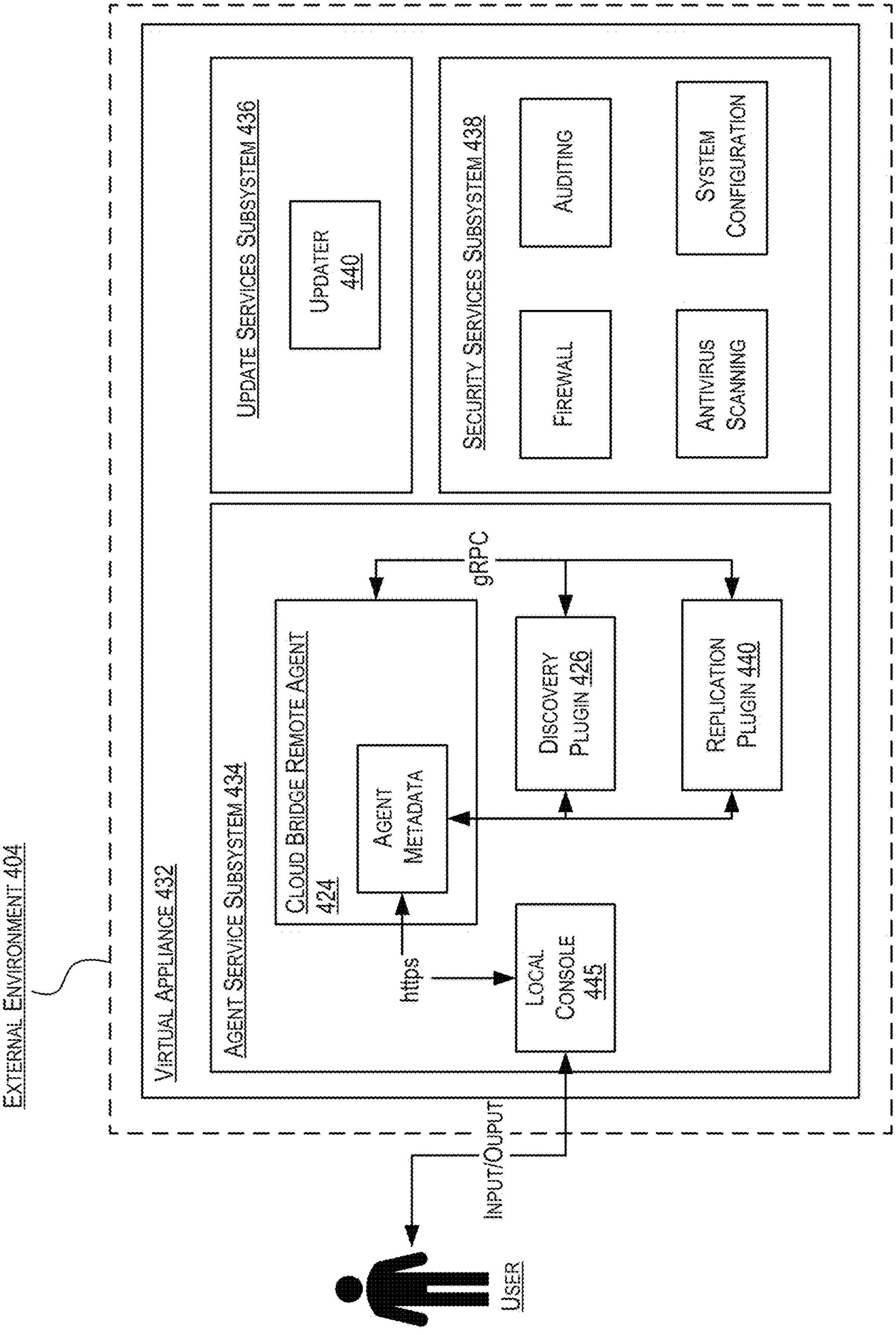

As shown in FIGS. 4B and 4C, the agent 424 is deployed within an external environment of a user (e.g., on-premises network 404 and/or on-premises network 406) as part of a virtual appliance 432. The virtual appliance 432 is a virtual machine pre-configured with the agent software, plugins, and management components. The main components of the virtual appliance 432 are an agent service subsystem 434, an update service subsystem 436, and a security service subsystem 438. The agent service subsystem 434 provides agent core functionality and life cycle management of plugins such as discovery plugin 427 and replication plugin 440. This includes collecting plugin state and reporting back to the agent control plane 425, generating and communicating agent's metrics (e.g., CPU, Memory, etc.) to CSPI monitoring, publishing local logs (e.g., appliance, agent and its plugins) to CSPI logging, and executing the local console application functionality (e.g., local console 445 used for agent registration).

Plugins are self-contained/stand-alone applications that integrate with the agent 424 as part of the virtual appliance 432 that a user creates on external environments from an Open Virtualization Application (OVA) template. The OVA template is a virtual appliance in Open Virtualization Format (OVF) used by virtualization applications such as VMware Workstation and Oracle VM Virtualbox. The OVA template can be used by a user to create multiple virtual machines (e.g., multiple VMs for agent functionality in multiple external environments). In some embodiments, the OVA template is sealed (preventing user remote access) and does not allow a user to execute arbitrary code with the virtual appliance 432. The user may only interact with the OVA template via the local console 445 for registration and all other management operations are orchestrated with the virtual appliance 432 from the CSPI 402. The agent 424 provides environmental/configuration information to plugins (e.g., CSPI 402 region, external site identifier, agent identifier, agent type, etc.) and necessary information for plugins to obtain a resource principal session token(s) to communicate with CSPI 402. The agent 424 also provides monitoring capabilities (metrics and logging) and reports plugin's status back to the agent control plane 425. The agent 424 itself is not publicly reachable from the Internet and the agent 424 and associated plugins initiate connection to CSPI 402 API endpoints (via direct connectivity or corporate proxy).

As described with respect to FIG. 4A, the discovery plugin 427 facilitates learning about a user's resources in external environments (e.g., on-premises network 404 and/or on-premises network 406) and creating/updating assets that represent the resources in a cloud bridge inventory 426. The replication plugin 440 is deployed to the external environment 404, and responsible for replicating data from on-premise VMs to the user's CSPI 402 tenancy (i.e., migration) using an asset replication task. The asset replication task is an atomic unit of work for the replication plugin 440 to import the user's asset into CSPI 402 object storage. This approach lowers the entry bar for migration by not requiring the user to establish on-premises connectivity to CSPI 402 or open ports for communication back to CSPI 402 for every asset source (e.g., vCenter). The replication plugin 440 is published as a binary and then deployed by the CSPI 402 service to corresponding appliances. Although only the discovery plugin 427 and the replication plugin 440 are shown and described herein with respect to virtual appliance 432, it should be understood that other types of plugins may integrate with the agent 424 as part of the virtual appliance 432 to facilitate providing one or more functionalities (e.g., cloud services).

For some functionalities, the agent 424 requires third-party libraries/packages that can't be distributed as part of agent package and require consent and special actions by the user. For example, for cloud migration scope, a Virtual Disk Development Kit (VDDK) is required by the replication plugin 440 to generate snapshots for VMware VM's disks. An agent dependencies process initiated by the user comprises the user downloading a third-party library/package from an associated third-party site, accepting terms of service and uploading the library/package to a preconfigured CSPI 402 object storage bucket. In certain instances, public documentation provided by the CSP provides links and specific instructions to the user on how the downloading/uploading are performed and this may be performed once per dependency version. The user then logs into the console 408, navigates to agent dependencies set-up, creates a new agent dependency for the library/package, which comprises providing the object location in object storage (namespace, bucket, object name, etc.), and selects the type of library/package. This causes the agent control plane 425 to start a dependency signature verification workflow that downloads and calculates a signature (checksum) for the library/package and compares the library/package signature against whitelist signatures in a database to identify and validate the library/package. Once the library/package is identified and validated, the user goes to the console 408, navigates to external sites set-up, and adds the agent dependency identifier to external site identifier. The agent 424 then fetches this information from the agent control plane 425 and locally installs the dependency and makes it available to plugins to consume.

The update service subsystem 436 updates software and parameters of the agent service subsystem 434 and virtual appliance 432. The update service subsystem 436 comprises an updater 440, which is a software component that runs on the virtual appliance 432 and is responsible for keeping the virtual appliance 432 up-to-the-date. Components of the agent 424 are managed by cloud bridge engineers. Release of new code (e.g., new agent security update) results in creation of a new bundle for a given component (e.g., security service subsystem 438) of the agent 424. The updater 440 maintains a list of currently used components, and versions of bundles that each component uses. A bundle is specific realization or instance of the component. A description of the bundle is stored in a database or embeddable key/value store of the agent control plane 425, while the data portion is a BLOB stored in object storage of the agent control plane 425. A BLOB is a binary file containing executables, configuration, and other data needed for the update of the component. The updater 440 is periodically polling the agent control plane 425. When a new bundle is available, the agent control plane 425 replies to the polling with an "update" command, which contains information about the new bundle to install. Upon receiving the update" command, the updater 440 downloads the BLOB, creates a rollback snapshot, prepares a new filesystem (e.g., a subvolume) with the update based on the BLOB, stops the agent 424 processing, and reboots the agent 424 into the new filesystem.

The security service subsystem 438 implements security and compliance controls for the agent service subsystem 434 and virtual appliance 432 using firewalls, antivirus scanning tools, auditing tools, and system configurations.

The following use cases are provided to facilitate an understanding of the cloud bridge architecture; however, it should be understood that these use cases are nonlimiting and other use cases are contemplated and may be implemented by the cloud bridge within a CSPI.

Use Case 1: Private access to remote database for a database security cloud service.

1. A user uses the console 408 to create an external environment: on-premises network 404.
2. The user downloads an OVA template for virtual appliance 432 and deploys the agent 424 in the on-premises network 404.
3. The user accesses a local console 445 of the agent 424 to register the agent 424 with the cloud bridge.
4. The user initiates a discovery from the console 408 to discover resources including on-premises database 416 in on-premises network 404.
5. The agent 424 collects host, database and database object metadata and creates or updates database assets in inventory 426 using discovery plugin 427, discovery control plane 428, and inventory control plane 430.
6. The user views discovered database assets in the inventory 426 via the console 408, identifies the asset associated with the on-premise database 416, and creates a database private endpoint (DB1) in the VCN 410 to enable private network access to the asset associated with the on-premise database 416, which the user would like to use with a database security cloud service (cloud service A) (e.g., Data Safe).
7. The user creates a private endpoint (CSA) in VCN 410 for database security cloud service (cloud service A) and configures it to protect the asset associated with the on-premise database 416 based on the CloudID or IP address, just as the user would protect a cloud native database in their VCN 410.
8. Optionally, the user configures compute instances in VCN 410 to connect to the on-premise database 416 via the private endpoint (DB1) and communication channel 422.

Use Case 2: Private Access to Remote Virtual Machine Hosting a Data Repository.

1. A user uses the console 408 to create an external environment: on-premises network 404.
2. The user downloads an OVA template for virtual appliance 432 and deploys the agent 424 in the on-premises network 404.
3. The user accesses a local console 445 of the agent 424 to register the agent 424 with the cloud bridge.
4. The user initiates a discovery from the console 408 to discover resources including on-premises virtual machine 418 running a self-hosted Bitbucket Server in on-premises network 404.
5. The agent 424 collects host, database and database object metadata and creates or updates database assets in inventory 426 using discovery plugin 427, discovery control plane 428, and inventory control plane 430.
6. The user views discovered VM assets in the inventory 426 via the console 408, identifies the asset associated with the on-premises virtual machine 418, and creates a VM private endpoint (VM1) in the VCN 410 to enable private network access to the asset associated with the on-premises virtual machine 418, which the user would like to use with a VM cloud service (cloud service B) (e.g., CSPI DevOps service).
7. The user creates a private endpoint (CSB) in VCN 410 for CSPI DevOps service (e.g., a self-hosted Bitbucket Server) and selects the newly created VM private endpoint (VM1) to configure the connection URL and adds the authentication credentials.
8. The user configures the CSPI DevOps "Managed Build stage" to use the private endpoint (CSB) and VM private endpoint (VM1) as part of a DevOps CI/CD pipeline.
9. The user executes the pipeline which can access the data repository from the remote self-hosted Bitbucket Server through the private endpoint (CSB), VM private endpoint (VM1), and communication channel 422.

In some embodiments, the cloud integration service facilitates workload migration from external environments to the CSPI (e.g., CSPI 101 and 200 described with respect to FIGS. 1 and 2) or other environments such as other CSPIs. The workload migration service assists users in all aspects of cloud migration: whether migrating a multi-tier application, a particular datacenter, or a specific class of infrastructure. A cloud migration service (e.g., the Oracle Cloud Mogration (OCB)) works with the cloud bridge service (e.g., the Oracle Cloud Bridge (OCB)) for the management and configuration of remote resources that interact with other cloud services provided by the CSPI. The cloud bridge addresses key aspects of this integration including automatic discovery and cloud identity for remote resources, their representation as assets in the user tenancy, secure network connectivity between remote resources and the CSPI, and lifecycle management of agent technology running in the remote environment.

In some embodiments, cloud migration service provides an end-to-end comprehensive self-service experience for migrating existing VMware virtual machine-based workloads from on-premises to the CSPI. The cloud migration service enables a user to identify virtual-machine workloads hosted in an environment external to the CSPI, plan migrations, and automate migration workflows. For example, the following tasks may be provided by the cloud migration service:

- Automatically discover virtual machines external to the CSPI.
- Organize virtual machines for migration.
- Replicate the virtual machine data to the CSPI.
- Plan the redeployment of virtual machines.
- Reconfigure virtual machines to launch successfully as the CSPI compute instances automatically.
- Launch virtual machines as the CSPI compute instances using replicated data.

A successful migration can include the use of a framework to discover and explore the existing assets such as on-premises assets, and then plan migration, replicate data and launch target environments. A top-level container is used as a migration service resource to track all aspects of a migration from discovery through launch. From discovery through migration execution, the cloud migration service will maintain a normalized asset inventory and, regardless of asset type, provide a unified experience to migrate to any appropriate cloud service. For example, a VM instance in cloud migration inventory can be migrated to Virtual Machine Interface (VMI), BareMetal, or VMware on a CSPI. The cloud migration service may provide recommendations and cost estimates to maximize the user benefit, e.g., a CSP may recommend that instead of migrating a database server as a VM, the user should consider migrating their logical databases to DBaaS.

The steps of an exemplary migration are illustrated in FIG. 5. As depicted, an exemplary migration 500 includes managing migration assets 505, analyzing and migrating assets 510, and verifying success of the migration 515. The managing of migration assets 505 includes connecting to a source environment 520, deploying a virtual agent 525, and discovering assets on the source environment 530. A source environment represents an on-premises environment (outside of CSPI), such as an on-premises datacenter within a VMware vCenter deployment. To connect an external source environment 520 to CSPI, the user sets up a source environment using the console (a browser-based interface such as console 408 described with respect to FIGS. 4A-4C), the CSPI command line interface (CLI), or a REST API. For example, a user may open the console navigation menu and select a service such as migration services. Under migration services, the user may select remote connections and then select create source environment. The user may then enter a name for the source environment, choose a compartment (provides a global logical namespace where policies can be enforced, as folders in a file system) created on CSPI to be associated with the source environment, and execute creation of the source environment. Once the source environment is created, the user can now download an appropriate remote agent appliance, for example an OVA file, and install the agent appliance, as described in detail with respect to FIGS. 4A-4C. The agent appliance is then registered and verified for use in the source environment. To enable remote agent appliance operations, agent dependencies may be added to the source environment as third-party library dependencies to the agent appliance. For example, the agent dependencies may be added using the VDDK, as described in detail with respect to FIGS. 4A-4C.

The discovery of assets 530 allows for identification and metadata collection for various assets including VMs from the external environment and representation of the assets and relevant metadata in the inventory assets to facilitate the migration process. The discovery of assets 530 is performed using connectors and includes creating an asset source and discovery work request and launching and executing one or more plugins in the on-premises environment including, for example, a discovery plugin to run external asset discovery. The discovery plugin searches for assets in the source environment using environment-specific connectors and APIs. The discovery plugin is described herein as supporting VMware via cloud bridge-based connectors and agents deployed directly on VMs to be migrated. However, it should be understood that other connectors may be built and used to support other assets, clouds, and environments such as Hyper-V or Enterprise Manager. Users may configure a connector for one-shot use or for on-going monitoring to extract run-time metrics for cloud monitoring and track changes to external assets. An external asset will contain metadata and metrics as well as their history and how they were discovered/imported. Metadata history is tracked so that users can monitor an asset's evolution over the course of their long running migration and so cloud migration services can highlight any changes that may require revisiting the migration plan.

The discovered assets are logged and tracked in an inventory subsystem (e.g., a cloud bridge inventory 426 described with respect to FIGS. 4A-4C). The inventory subsystem retrieves metadata information that tracks the assets including virtual machines' physical and runtime properties, such as operating system, hardware, and resource utilization. The inventory subsystem then stores them in a table or database as a collection of assets and associated metadata (i.e., inventory). The inventory subsystem is used to store information about assets discovered in the on-premises environment that can be migrated. These assets are added to the inventory subsystem by using an API and importing a CSV file, or by running automated discovery via the discovery plugin in the external environment.

After external assets are discovered and the required data is collected, analyzing and migrating assets 510 can be executed to create a migration project 535, create one or more migration plans 540, and/or replicate migration assets 545. More specifically, once a user has discovered their external assets, they can create a migration project 535 which groups inter-related and dependent assets for migration. A project is agnostic as to how it is composed: a user may wish to migrate an application or a particular tier of infrastructure. Users will be able to query their inventory for suggested groupings based on observed run-time dependencies or other extracted metadata from the source environment. Migration assets located in the inventory subsystem can then be added to the migration project. The migration project may be used to replicate all the associated migration assets for migration. Migration assets within a project may be configured to reference a replication policy that describes how the asset is to be moved into the CSPI. A replication policy allows for manual or connector-based replication of full-image or incremental asset snapshots either on-demand or on a user-specified schedule. Users are also able to specify if replicated data over-writes or augments previous snapshots to manage storage costs.

From a project a user can manage their grouped inventory assets. For instance, they may set a default replication policy, or refresh external assets from discovery. Within a project, a user creates launch plans 540. A launch plan is a mapping of source assets to target resource types in the CSPI and the context in which to launch them, including compartment, subnets, and launch dependencies. Users may wish to create multiple launch plans for a single migration project for a variety of reasons. They may wish to create an initial launch with minimally sized compute to simply test functionality post migration, later another plan to performance test, and yet another to dial-in right sizing. Each of these may launch in different environments to ensure isolation.

When a user creates a new launch plan, they can direct cloud migration services to pre-populate the selection of target resources with recommendations based on inventory and metrics metadata. For instance, they may want cloud migration services to use minimal sizes, average utilization, or peak utilization to choose target compute shapes. Users will be able to override any target selection, elide an individual asset from launch, or select an existing CSPI instance for cases where migration has already occurred out-of-band. The plan will provide updated costs and other assessments (such as limits implications) of the CSPI deployment as it is edited and highlight any potential compatibility or capacity issues. Users will be able to launch, re-launch (terminate existing and relaunch with latest), and terminate from a launch plan.

The replication of migration assets 545 includes the creating of assets in the CSPI that replicate assets in the external user environment such as, for example, in the on-premises environment. In some embodiments, this replication is performed, in part by a replication plugin that can manage the replication of external assets snapshots. This includes the management of one or several full-image and/or incremental virtual-machine snapshots. Users control replication indirectly by defining replication policies. Each policy corresponds to a migration project and specifies assets to be replicated into the CSPI and the replications frequency. Several workflows inside the migration and replication control plane monitor replication policies, schedule replication tasks according to existing replication policies, and monitor the progress of each replication. At each replication execution, a snapshot of the asset is taken and imported into the CSPI. Users enable the replication plugin on their cloud bridge appliances by providing required credentials and metadata via the cloud bridge appliance setup. The installation process is handled by the cloud bridge appliance. After the replication plugin is enabled, it registers with the replication service and begins polling for replication tasks, using the replication service API.

A migration can be a long-running process and can include one or several iterations of test launches with various configurations. In some embodiments, these iterations can include the continuous refreshing of source data from a source environment before a final migration and the activation of the migrated systems within the CSPI. For example, in an embodiment in which a user is migrating information from a source environment into a CSPI, and specifically into the user's tenancy in the CSPI, the user may repeatedly discover and/or capture on-premises assets and a migration plan can be generated some or all of the times that on-premises assets are discovered. For example, in embodiments in which the user changes one or several on-premises assets, these changes can be captured and/or discovered by repeated iteration of the discovery of those assets. In such an embodiment, a migration can be planned that can capture each of these versions of the user assets. In some embodiments, only the final version of the assets is migrated, and in some embodiments, the user can have control over which version of the assets are replicated in the CSPI.

In some embodiments, the planning of a migration includes evaluation of the capabilities of the CSPI as compared to the capabilities of the on-premises environment and/or on-premises assets. This evaluation includes the determination of whether and to what extent on-premises capabilities differ and/or exceed CSPI capabilities. Based on this determination, the plan for the migration of assets can be modified.

Specifically, for example, during the planning step, the capabilities of user on-premises VMs are identified, and one or several VM configurations (recommendations) within OCI are presented. This includes identifying attributes of each on-premises VM including, hardware, capabilities, and metrics of actual use. The attributes can include, number of CPUs, average CPU usage, max CPU usage, memory, average memory usage, max memory usage, number of VNICs, number of GPU, and/or network bandwidth.

Based on this information, a number of proposed OCI VM shapes are presented. These VM shapes can be generated and presented based in part on information relating to the user, such as user preference for optimum pricing or optimum performance.

The attributes of the on-premise VMs are compared to identified attributes of the OCI VM shapes, and a difference score is generated characterizing the difference between the attributes OCI VM shapes and the attributes of the on-premise VMs. An incompatibility error is generated when the difference score indicates too large a difference between the OCI VM shapes and the attributes of the on-premise VM.

User selected VM shapes are combined to form a migration plan that can be in a terraform representation of the migration plan.

Once the planning of the migration is complete, the replication step of the migration can be performed. In some embodiments, the replication step is performed once, and in other embodiments, the replication step can be repeatedly performed as the on-premise assets change and/or are modified. In some embodiments, the replication step can include the creation of a snapshot of one or several assets to be replicated and the storage of that snapshot. In some embodiments, that snapshot can be stored in a golden volume group (GVG). A copy of the snapshot stored in the GVG can be created, modified, and then used in the creation of an executable stack such as a terraform stack. In some embodiments, the user can be provided with the executable stack and can modify the executable stack before executing the executable stack to thereby replicate the asset in CSPI, and specifically in the user tenancy in CSPI.

The verifying success of the migration 515 includes the launch of target assets to CSPI instances 550, the validation of instance creation in the CSPI 555, and the marking of the migration project as being completed 560. The launch of target assets to CSPI instances 550 includes the cloud migration services launching compute instances to run hydration agents during the data replication. The he target assets may be launched to CSPI instances using a resource manager such as Oracle Resource Manager (ORM). The hydration agents are pooled together based on the replication location. To load balance the replication process based on the object pool, the hydration agents start automatically. These agents are then automatically terminated after they are idle and no pending replication jobs exist. During the replication workflow, the volume snapshots of the VMs are stored in the object storage. The snapshot data is deleted from object storage after hydration agents write the data to a block volume. During the replication workflow, a temporary VCN is created to provide hydration agents with connectivity to object storage. The VCN is stopped after all hydration agents are no longer active. A set of block volumes exists in the user tenancy for the entire lifespan of a migration asset. A golden volume is created for each boot and data volume that is attached to the source asset such as a VM. The golden volume is kept in synchronization with snapshots created in the source environment. As part of each replication update, a new set of volumes is created and used for launching compute instances to the CSPI. The launch of the compute instances includes the launch of the assets such as VMs, including compartment, subnets, and launch dependencies. The VMs are replicated on OCI instances. The user can then mark the project as complete. This action blocks the migration modules from attempting to discover further changes to the source environment or suggesting new recommendations. After a project is marked complete, cloud migration services decouples the production environment from the migration workflow and archives migrated inventory.

Figure 6:
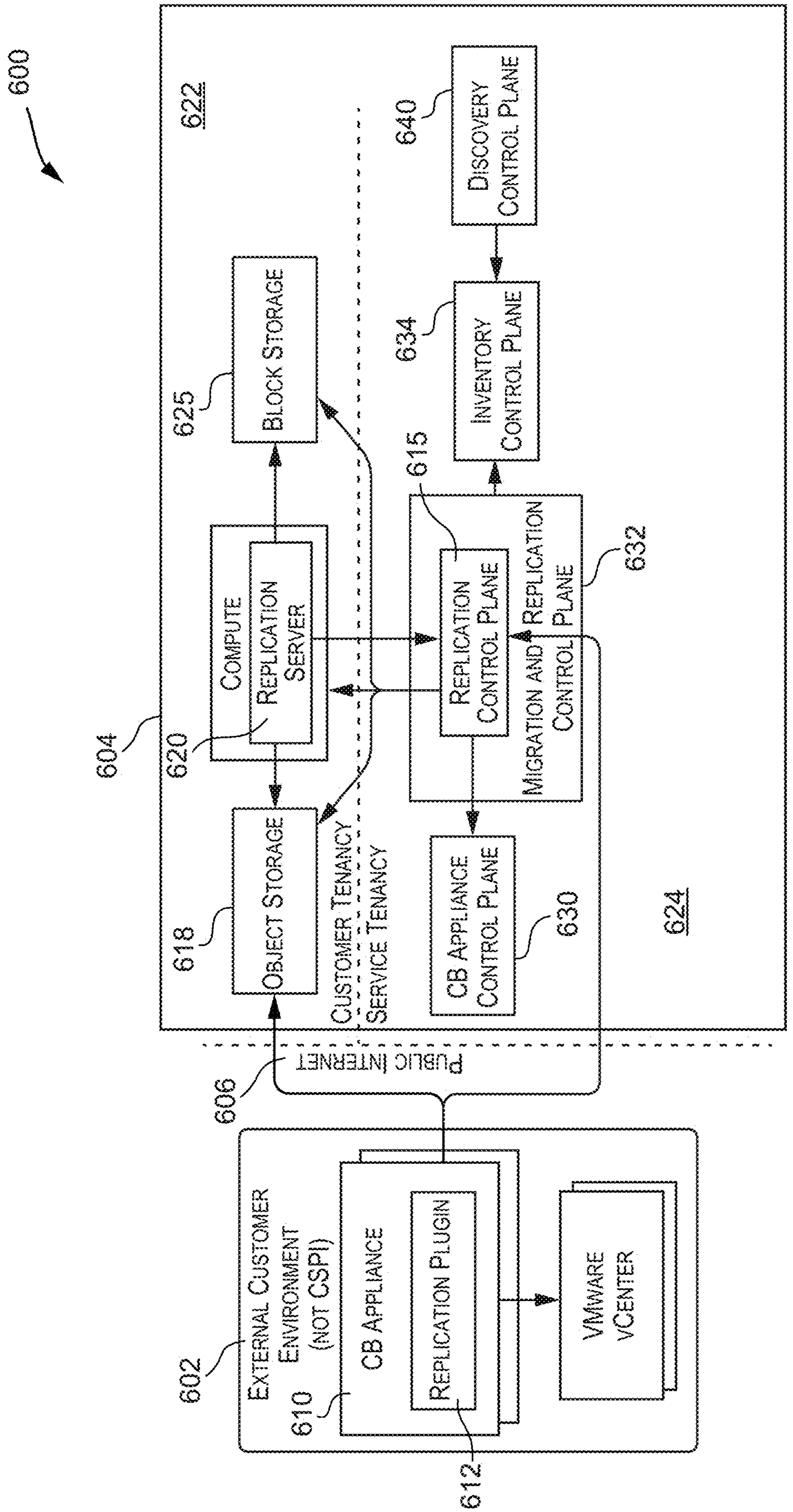
FIG. 6 is a simplified block diagram of an architecture that can be implemented for a cloud migration in accordance with various embodiments.

An exemplary embodiment of an architecture 600 that can be implemented for a migration is depicted in FIG. 6. The architecture 600 includes an external user environment 602 and a CSPI 604. The external user environment 602 includes any environment that is distinct from the CSPI 604. In some embodiments, the external user environment 602 can include an on-premises environment and/or can include a CSPI separate from CSPI 602. The CSPI 604 and the external user environment 602 are communicatively coupled via a public network 606. The public network 606 can be a wired and/or wireless communications network and can include, for example, the public Internet.

The user environment 602 includes the virtual appliance 610 (as described in detail with respect to FIGS. 4A-4C), which can include a replication plugin 612. The replication plugin 608 is an application developed by the cloud migration service and deployed by the cloud bridge service to a user's virtual appliance 610. Replication plugin 612 installation, registration, and lifecycle management may be performed by the cloud bridge service. After a replication plugin 612 starts, it registers with the replication control plane 615 and repeatedly polls the replication control plane 615 for replication tasks. Each task describes a single asset (such as a VMware VM) to be replicated, metadata for the corresponding asset source (such as a vCenter), and a destination in the object storage 618 (e.g., an object storage bucket for uploading disk snapshots). Asset source credentials are retrieved from a CSPI vault or data storage directly by the replication plugin 608 using the metadata; the replication control plane 615 does not access the credentials. The credentials are kept in-memory only and re-fetched upon a replication plugin 608 restart.

During the task execution, the replication plugin 608 periodically updates the task status and progress with the replication plugin 608, which in turn is aggregated and propagated to user interface by the replication workflow. The progress is reported to the user interface as a part of the overall migration iteration progress. Replication task scheduling is performed by the replication control plane 615 according to a replication policy specified by the customer during the migration setup, as discussed with respect to FIG. 5. A policy specifies which customer assets should be migrated, how they are mapped to CSPI assets, and the frequency of migrations. A separate replication task may be created for each asset in a single iteration of a migration. This allows for maximum replication concurrency in cases where multiple cloud bridge appliances are connected to the same asset source and can perform replication tasks for the same migration in parallel.

Given the recurring nature of replications, the replication plugin 608 will perform incremental snapshots whenever possible. Specifically, if the asset source allows the replication plugin 608 to calculate and access asset disk changes since the most recently imported snapshot, only these changes will be imported by the plugin into the CSPI 604, along with corresponding metadata, and subsequently used by the replication server 620 to create the latest Golden Volume Group (a volume group corresponding to the latest imported snapshots of a customer asset's disks as-is). This optimization yields significant performance and cost improvements. It should be noted that the replication plugin 608 is an optional part of the replication components/workflow. In some instances, for data centers where the migration and replication services can have a direct access to the asset (for example, AWS Elastic Block Store direct API) and can import disk snapshots directly into the CSPI 604, there is no need for a replication plugin 608.

The CSPI 604 includes a user tenancy 622 and a service tenancy 624. The user tenancy 622 includes the object storage 618, the replication server 620, and a block storage 625. The object storage 618 is an internet-scale, storage platform that offers reliable and cost-efficient data durability to persist assets during replication. In some instances, the object storage 618 can store large amounts of unstructured data. This unstructured data can be of any content type, including analytic data and rich content, like images and videos. For example, an asset analytic API may be provided to a user to help the user aggregate asset metadata in the object storage 618 to gain insight into user's external environment (e.g., on-premises environment). The replication server 620 is a virtual machine that can, in some embodiments, read one or several asset snapshots and can write those one or several asset snapshot into one or several volumes. In some embodiments, this can, in effect, save the one or several snapshots in one or several desired locations. In some embodiments, the one or several locations to which the one or several assets are written can be volumes corresponding to one or several attributes or all or portions of each of the assets. In some embodiments, and after some modifications, these volumes can then be used to launch one or several assets in the CSPI 604 identical to the source assets. The block storage 625 is structured storage and/or storage for structured data and used to persist migrated assets after replication. In some embodiments, block storage can, for example, store data in one or several equally sized blocks. These blocks can be stored on underlying physical storage in a manner that is optimized for fast access and retrieval.

The service tenancy 624 includes an appliance control plane 630, a migration and replication control plane 632, a replication control plane 615, an inventory control plane 634, and a discovery control plane 640. The appliance control plane 630 comprises a customer facing API, deployed in the overlay, that provides management and orchestration across the cloud bridge architecture such as agent registration and agent life cycle management, as described with respect to FIGS. 4A-4C. The migration and replication control plane 632 is the main endpoint for all tasks, related to migration planning, migration execution, and replication. More specifically, migration and replication control plane 632 comprises a customer facing API, deployed in the overlay, responsible for managing migrations resources, scheduling and triggering asset migrations, and responsible for coordinating asset replications. The replication control plane 615 comprises a customer facing API, deployed in the overlay, responsible for replication of the one or several source assets. The inventory control plane 634 comprises a customer facing API, deployed in the overlay, responsible for managing assets and metadata thereof in the inventory. The discovery control plane 640 comprises a customer facing API, deployed in the overlay, responsible for configuring discovery and coordinating discovery plugins.

Figure 7:
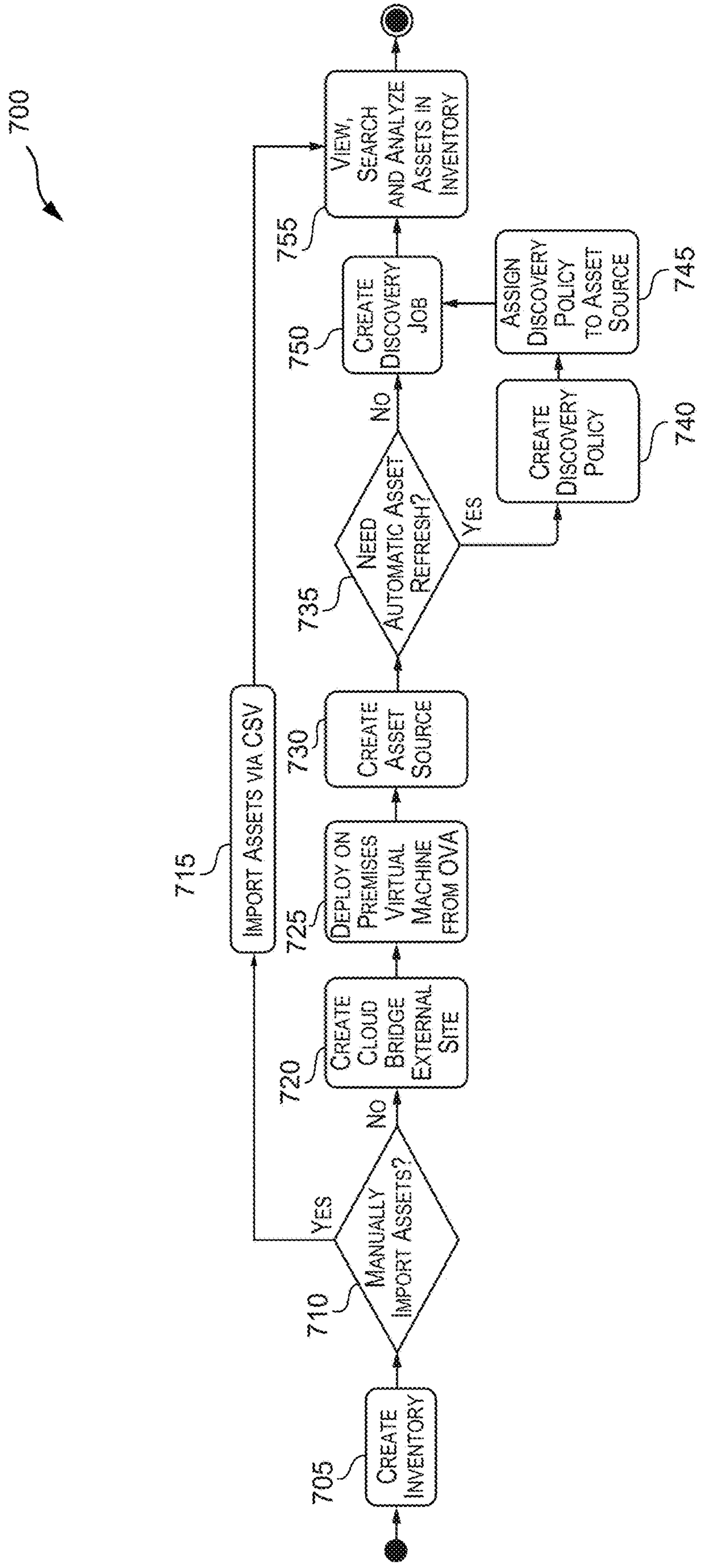
FIG. 7 depicts a generic workflow for using a discovery and inventory service in accordance with various embodiments.

Discovery and Inventory Control for Remote Resource Integration with Cloud Services As shown in FIG. 7, the generic workflow 700 for using the discovery and inventory service comprises the following, which is then described herein in detail. Initially, a user writes Identity and Access Management (IAM) policies to allow all the components of cloud migration services to operate on the customer tenancy. IAM policies are documents with sets of rules that define permissions for an action regardless of the method that the user uses to perform the operation. At block 705, the user initializes an inventory as a means of on-boarding to the inventory service. At block 710, the user can decide to upload assets directly in inventory using CSV (block 715) (or grant permissions to a migration user). At block 720, the user creates a cloud bridge external site, which is a container (pool) of appliances in an external environment. At block 725 the user deploys a remote agent appliance from an OVA, which will act as a discovery host in the external environment. Actions to discover assets will be executed from the deployed virtual appliance. At block 730, the user creates an asset source containing the location of a service used for accessing asset metadata from a source within the external environment along with a reference to the credentials stored in a data store such as KMS—an Oracle Cloud service, used to store customer-provided credentials required for querying an external asset source. At block 735, if the user requires asset information to be retrieved periodically, they create a discovery schedule or policy (block 740) and assigns it to the created asset source (block 745). At block 750, the user creates a discovery job (triggered manually or via a schedule) for the purposes of retrieving asset metadata. Once the discovery job is completed, at block 755 the user can see their discovered assets inside the inventory. The user can then use the inventory to search and analyze all the imported and the discovered assets (e.g., for planning and executing a migration).

Discovery

Discovery involves learning about a user's environment. For example, a user may want to discover their resources or assets such as virtual machines that are part of on-premises VMware environments. In the context of cloud migration services, asset discovery identifies and collects the metadata for the assets from the external environment. Discovery then represents the relevant metadata in the inventory assets to facilitate the migration process. In some instances, the discovery process collects historical metrics to CSPI inventory and real-time metrics to CSPI monitoring. This data may help in providing meaningful suggestions for sizes of migrated assets based on the current usage of assets. The types of metrics collected from the assets may include: (i) historical metrics, which are collected automatically, and (ii) monitoring or real-time metrics, which are more precise when compared to historical metrics and they use the monitoring service.

In order to use discovery, a user creates a source for the assets (i.e., an asset source or source environment). But before the user creates the asset source and runs discovery, the user will need to install the remote agent appliance and register the agent with a migration environment within the CSPI. As described with respect to FIGS. 4A 4C, the agent is a specialized software component used as a platform for deploying cloud service functionalities to interact with external resources. Each agent has a corresponding agent identifier (e.g., a CSPI identifier used to identify the asset as a CSPI 402 resource) and it is associated with an external site identifier (e.g., externalSiteId) for the external environment in which the agent is deployed. The external site identifier is used to identify the external environment in which external resources and agents are deployed.

The installation of the agent may comprise the following exemplary workflow steps. The CSPI console navigation menu may be opened, and remote connections may be selected. From a list of possible environments, the suer selects an environment name link for which the user wants to install the remote agent appliance. In an environment details page, the user may select an option to download the agent VM and download the remote agent appliance OVA file. In the download agent VM information box, an appropriate remote agent appliance may be selected from a list of agents, and the download of a suitable remote agent appliance may be executed. Thereafter, the user may log into a server virtualization client such as vSphere client of the external environment and deploy the remote agent appliance OVA file, which will execute script to create the remote agent appliance VM on the external environment. Once the remote agent appliance VM is created on the external environment, and the appliance can be powered on by selecting the remote agent appliance VM under the object pool. To verify that the remote agent appliance VM is running, a user may select to launch the web console under the VM. A properly running agent displays the usage message and sign-in prompt on the console.

Once installed, the agent may then be registered with the source environment. The registration of the agent may comprise the following exemplary workflow steps. The user may log into a server virtualization client such as vSphere Client of the external environment and select the appliance VM. To identify the IP address of the remote agent appliance, the web console of the server virtualization client may be launched by selecting the virtual machine. The console will then display or provide the IP address of the remote agent appliance to the user. The user may then open the CSPI console navigation menu and a select a cloud service such as migration. Under the cloud service the user selects remote connections, and for a list of possible environments selects the environment name link for which the user wants to register the remote agent appliance. The user then executes registration by selecting a user interface toggle to register the agent. The user is then presented with a registration page for naming the agent and providing information for the agent such as the IP address of the remote agent appliance. Once the name and information are entered, the user may be redirected to their tenancy in the CSPI console and an agent registration confirmation page. The user can then confirm to complete the registration process. The agent details may be visible in the CSPI console. After a short duration, the agent heartbeat displays as Healthy, and the state is Active. The user can now use this source environment to discover assets.

During the registration process, the user is guided via redirections between various components in the cloud infrastructure and the external environment (e.g., between Local (web console of the server virtualization client) and Cloud Infrastructure Consoles (CSPI console)) in order to register the agent in the external environment. It should be understood that there could be multiple workflows for the registration process. For example, a first workflow may start at the Local Appliance Console of the appliance (virtual machine) running an agent and uses a combination of public/private key pairs as an identifier and user authentication with the cloud infrastructure as an intermediate source of trust to register the agent with cloud infrastructure. A second workflow may start at the Cloud Infrastructure Console and uses a combination of public/private key pairs as an identifier and user authentication with the cloud infrastructure as an intermediate source of trust to register the agent with cloud infrastructure. In the registration processes, the agent cannot go directly to the control plane for setup because it does not have identity (e.g., a CloudID such as OCID). Instead, the public/private key pairs are used to provide the agent with identity until a cloud infrastructure identifier from the cloud infrastructure can be obtained. This has the following advantages: no secrets are stored in the control plane of the agent on the cloud infrastructure, no secrets are transferred between the agent deployed in the external environment and the control plane of the agent on the cloud infrastructure, a user does not have to manage/distribute secrets to the virtual machine/appliance running the agent, and the private key associated with the agent does not leave the virtual machine/appliance. Moreover, because the agent does not have identity there is no trust between virtual machine and the agent. Instead, the techniques described herein use the identity of a registering user at the Cloud Infrastructure Console (e.g., authenticated by Identity SOUP) as an intermediate source of trust to register the agent with the cloud infrastructure.

Once the remote agent appliance is active, a user can proceed to create a source for the assets. The asset source resource allows a user to specify where asset metadata should be read from and the credentials for accessing the metadata. The asset source resources also exposes status information for any connections established for reading the user's asset metadata within an external environment. The external environment access credentials, which are required by the discovery service for accessing user asset metadata, may be stored in a data store such as KMS inside the user tenancy. The user may authorize the discovery service to read the created credentials through an IAM policy before the credentials can be used to create an asset source.

The creating of an asset source may comprise the following exemplary workflow steps. A user may open a console navigation menu and select a service such as migration. Under migration, the user may select discovery, and then select create an asset source. In the creation interface, the user may be prompted to enter information about the asset source such as name, vCenter Endpoint, compartment, and target compartment, and information about remote connections such as source environment. The user may then enter discovery credentials to perform one of the following actions: To read metadata of assets from the source environment, the user may select an existing secret and choose a vault and secret containing login credentials of a server virtualization client such as vSphere client; and/or to create a secret and enter the username and password for a server virtualization client such as vSphere client login credentials. In some instances, the user may use their replication credentials to perform one of the following actions: select discovery credentials to continue with chosen discovery credentials; select use of existing secret and choose a vault for discovery credentials, and/or create a secret and enter the username and password for discovery credentials.

In the creation interface, the user may be further prompted to select one of the following to perform/schedule the discovery job: to perform an on-demand or manual asset discovery, select no discovery schedule, to use an existing discovery schedule, select existing schedule, and or to create a discovery schedule, select create schedule. The user can keep asset information up to date by using the discovery scheduling mechanism, as a recurring task. After creating a discovery schedule, the user can attach or detach it from an existing asset source to begin or stop scheduling discovery jobs for external asset discovery and metadata collection. Under the metrics section of the interface, both options for collecting the historical metrics and real-time metrics are enabled, by default, but may be toggled on and off by the user. The user may then execute creation of the asset source based on the input and information provide in the creation interface of the console. Under the connections portion of the console navigation menu, the user can view each connector to the source environment. These connectors are automatically instantiated using the discovery plugin in the external environment. The connectors change their state to active after they have verified their connection and credentials with a centralized management utility such as the vCenter server (shown for example in FIG. 6). The user may now proceed to create a discovery job or work request for the asset source. In some instances, the user may return to the console navigation menu in order to move the source asset to another compartment, delete the source asset, or edit the source asset including the asset source information, discovery credentials, replication credentials, discovery schedule, metrics information, and save the changes.

The creating of a discovery work request may comprise the following exemplary workflow steps. A user may open a console navigation menu and select a service such as migration. Under migration, the user may select discovery, and then select create an asset source for discovery. In the creation interface, the user may be prompted to select an active asset source from a list of asset sources. The asset source details page within the browser may then open and the user can view the active connectors that connect the discovery plugin with the source environment. The user may then select run discovery to create and run a discovery job using a selected active asset source. Under resources within the creation interface, the user may then select work requests and find the discovery job. The user may then wait for the status of a work request to change to succeeded. Additionally, under resources within the creation interface, the user may select assets to view a mapping between the assets such as VMs in the source environment and the discovered assets.

Figure 8:
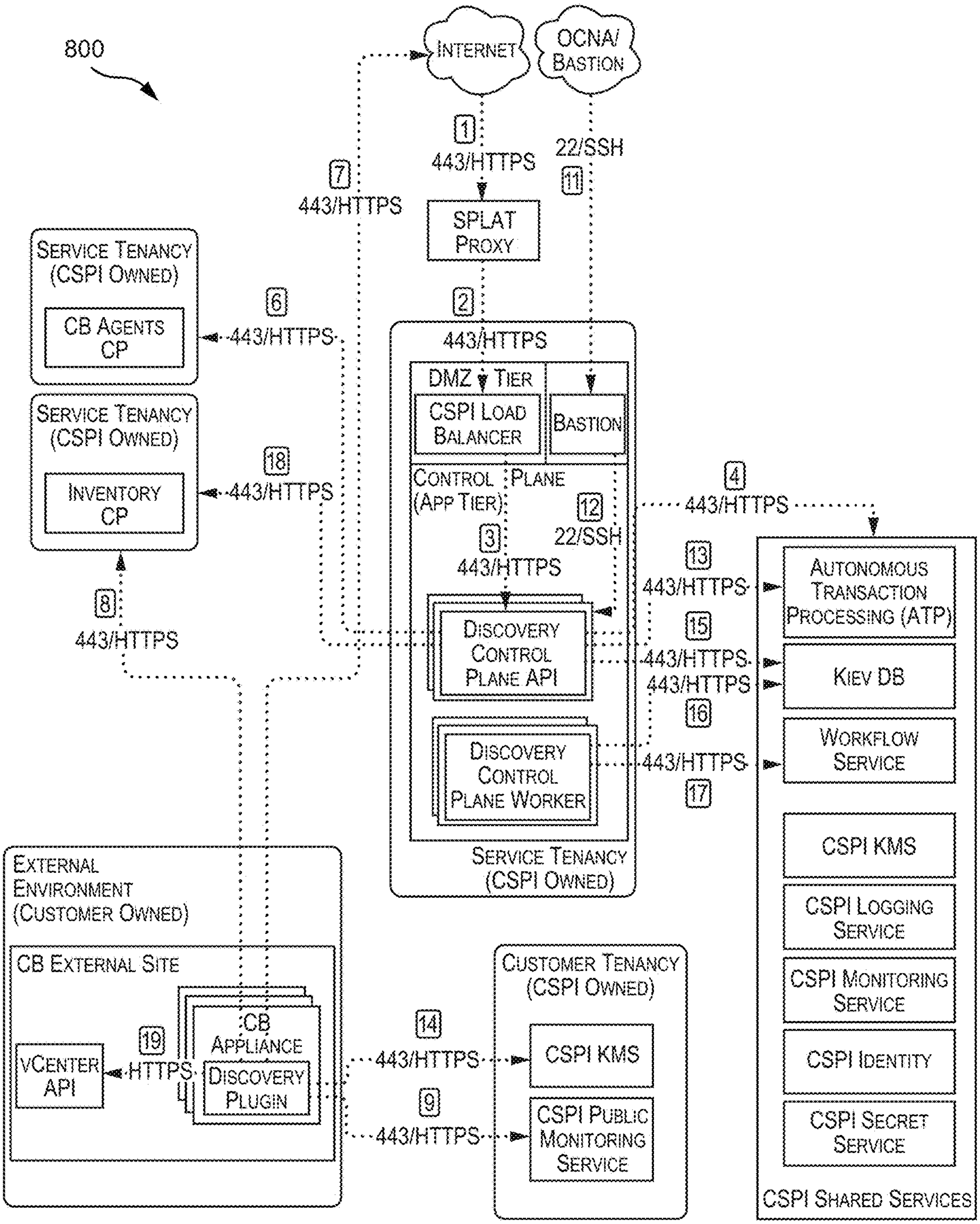
FIG. 8 is a high-level simplified block diagram for the overall discovery architecture in accordance with various embodiments.

FIG. 8 shows a high-level diagram for the overall discovery architecture 800 in accordance with various embodiments. Table 1 provides a brief description of the components and terms used with reference to the high-level diagram, which are also described in detail herein.

TABLE 1

| Component | Description/Usage |
|---|---|
| Discovery Control Plane | Applications for handling asset-discovery-related customer requests. |
| Inventory Control Plane | Application for handling Asset-storage-related operations. |
| Discovery Plugin | Application for retrieving assets from a customer's external environment. |
| Cloud Bridge Control Plane | Cloud service, used to control access to the customer's external environment. |
| Public Monitoring Service | Cloud service, used to store metrics generated by the external resources of a customer linked to an asset in the customer inventory (opt-in). |
| KMS | Cloud service, used to store customer-provided credentials required for querying an external asset source. |
| Logging Service | Cloud service, used for storage of log data, incoming from Control Plane instances. |
| Identity | Cloud service, which provides Authentication/Authorization features. |
| Secret Service | Cloud service for storing service specific secrets/certificates used by Discovery and Inventory Control Planes. |
| SPLAT Proxy | Cloud service, which provides domain name to Discovery and Inventory Control Planes, as well as integration with mandatory Platform Bar services. |
| Load Balancer | Cloud service, used to balance incoming request load between instances in the Control Plane fleet. |
| Bastion | Cloud service, used by Discovery and Inventory service teams to access instances in the Control Plane fleet. |
| vSphere VMware vSphere | vSphere is a server virtualization software application from VMware, sometimes referred to as a virtualized datacenter. |
| Virtual Appliance | A virtual machine running on a vSphere hypervisor. In OCI, we would call this a compute virtual machine instance. |
| CB | Cloud Bridge |
| CB External Site CB Remote Site | The logical container of CB appliances in customer's data center/on-premise network as described by CB |
| CB Appliance or Ambassador Gateway | Virtual Appliance that runs the CB plugin harness inside the customer's external site. |
| Discovery Plugin Discovery CB Plugin | A software component implemented by cloud migration services that is being deployed onto a CB Appliance and provides migration functionalities like source refresh, metadata and metrics collection. |
| Asset Source | Customer defined connectivity information (such as URL, references to username, password, etc.) for an external source of information about customer assets. There could be multiple types of sources based on target system to collect metadata from e.g., VMware vSphere (MVP case), AWS, Oracle Enterprise Manager, Azure, etc. |
| Connection | Actual connection to the physical asset source established via a Discovery CB Plugin using connectivity information provided in an asset source resource. |
| Discovery Job | Definition of work items or process to be triggered. Is split into tasks according to request and Discovery Job type. Can be canceled. |
| Task | Atomic unit for the Discovery Plugin of work which has a clear scope and execution status. |
| Source Refresh | Source refresh is a process of synchronizing complete inventory state (including new and deleted Assets) with actual asset source state on request or based on user-defined Discovery Schedules. |
| Discovery Schedule | Resource maintained in Discovery Service for launching Discovery Jobs for an asset source. |
| Asset | A CSPI resource that represents the metadata of external resources such as VMs, DBs, Volumes discovered in the external environment. |
| External Resource | The actual customer resource such as VMs, DBs, Volumes residing in the external environment. |
| Relation | A CSPI resource that represents the associations between Assets such as application asset runs on virtual machine asset, virtual machine asset depends on volume asset. |
| ATP | Autonomous Transaction Processing Database - used as control plane data storage. |

The following is a list of exemplary data flows for the discovery service. Each part of a flow potentially references a connection channel in the overall discovery architecture 800 in FIG. 8 by number in parenthetical.

Discovery CP Typical Request Data Flow:

1. Customer sends HTTPS request to SPLAT (1)
2. SPLAT preforms Authentication/Authorization (Not shown, this is owned by another team and is standard)
3. SPLAT forwards request to Load Balancer via HTTPS (2)
4. Load Balancer Forwards request to one of the Discovery Control Plane Hosts via HTTPS (3)
5. Request reads/updates the Discovery Control Plane in/from ATP via HTTPS (4)
6. Success/Failure is returned to the client (1)

Discovery CP Typical Synchronous Request Data Flow:

1. User sends HTTPS request to SPLAT (1)
2. SPLAT preforms Authentication/Authorization (Not shown, this is owned by another team and is standard)
3. SPLAT forwards request to Load Balancer via HTTPS (2)
4. Load Balancer Forwards request to one of the Discovery Control Plane Hosts via HTTPS (3)
5. Discovery Control Plane API validates request and resources (specific to each request)
6. Discovery Control Plane API creates/reads/updates/deletes/listst corresponding resources and/or data in/from ATP via HTTPS (13)
7. Success/Failure along with response data is returned to the client (1)

Discovery CP Typical Asynchronous Request Data Flow:

1. User sends HTTPS request to SPLAT (1)
2. SPLAT preforms Authentication/Authorization (Not shown, this is owned by another team and is standard)
3. SPLAT forwards request to Load Balancer via HTTPS (2)
4. Load Balancer Forwards request to one of the Discovery Control Plane Hosts via HTTPS (3)
5. Discovery Control Plane API validates request and resources (specific to each request)
6. Discovery Control Plane API registers new Work Request in Workflow Kiev DB via HTTPS (15)
7. Created work request id is returned to the client (1)
8. Workflow is executed in worker in the background:
    1. Discovery Control Plane Worker picks up Workflow from Workflow Service via HTTPS (17)
    2. Discovery Control Plane Worker deque workflow parameters from Kiev DB via HTTPS (16)
    3. Discovery Control Plane Worker reports workflow step execution state to Workflow Service via HTTPS (17)
    4. Discovery Control Plane Worker updates work request lifecycle state in Kiev DB via HTTPS (16)

Discovery CP Asset Source Create Data Flow:

1. ref: Discovery CP typical synchronous request data flow
    1. User-provided External Site CloudID is validated against the OCB CP (6)
    2. User-provided Inventory CloudID is validated against the Inventory Service in the User Enclave (18)

Discovery CP Asset Source Read Data Flow:

1. ref: Discovery CP typical synchronous request data flow
    1. Asset source CloudID is validated to exist and in the right state in ATP via HTTPS (13)

Discovery CP Asset Source Update Data Flow:

1. ref: Discovery CP typical synchronous request data flow

Discovery CP Asset Source Delete Data Flow:

1. ref: Discovery CP typical asynchronous request data flow
    1. Asset source CloudID is validated to exist and in the right state in ATP via HTTPS (13)

Discovery CP Asset Source List Data Flow:

1. ref: Discovery CP typical synchronous request data flow

Asset Source Refresh Data Flow:

1. ref: Discovery CP typical asynchronous request data flow
    1. Asset source CloudID is validated to exist and in the right state in ATP via HTTPS (13)

Asset Source Attach Discovery Schedule Data Flow:

1. ref: Discovery CP typical asynchronous request data flow
    1. Asset source CloudID is validated to exist and in the right state in ATP via HTTPS (13)
    2. Asset source is validated not to have discovery schedule attached in ATP via HTTPS (13)

Asset Source Detach Discovery Schedule Data Flow:

1. ref: Discovery CP typical asynchronous request data flow
    1. Asset source CloudID is validated to exist and in the right state in ATP via HTTPS (13)
    2. Asset source is validated to have discovery schedule attached in ATP via HTTPS (13)

Discovery CP Discovery Schedule Create Data Flow:

1. ref: Discovery CP typical synchronous request data flow are performed

Discovery CP Discovery Schedule Read Data Flow:

1. ref: Discovery CP typical synchronous request data flow are performed

Discovery CP Discovery Schedule Update Data Flow:

1. ref: Discovery CP typical synchronous request data flow are performed
    1. Discovery schedule CloudID is validated to exist and in the right state in ATP via HTTPS (13)
    2. (discovery schedules changes are applied on timely basis in the background tasks)

Discovery CP Discovery Schedule Delete Data Flow:

1. ref: Discovery CP typical synchronous request data flow are performed
    1. Discovery schedule CloudID is validated to exist and in the right state in ATP via HTTPS (13)
    2. Schedule detached from all sources in ATP via HTTPS (13)

Discovery CP Discovery Schedule List Data Flow:

1. ref: Discovery CP typical synchronous request data flow are performed

Plugin Polls Tasks and Configuration from Discovery CP Typical Data Flow:

1. Plugin makes request to Discovery CP to get tasks or configuration
    1. ref: Discovery CP typical synchronous request data flow
2. If new or updated source configuration received, steps bellow are executed once per new or updated credentials
    1. Plugin requests user-provided credentials from KMS Service in User Enclave (14)
    2. Credentials returned to the plugin and stored in memory (This happens in the plugin running as process in CB Appliance, no network)

Plugin Discovers Asset and Pushes Data into Inventory Service Data Flow:

1. Plugin gets task and configuration
   1. ref: Plugin polls Tasks and Configuration from Discovery CP typical data flow
2. Plugin fetches asset metadata from vCenter in User External Environment via HTTPS connection (10, Network completely controlled by User)
3. Metadata converted into appropriate format (This happens in the plugin, no network)
4. Plugin sends HTTPS requests with tracking information to the Discovery Service
   1. ref: Discovery CP typical synchronous request data flow
5. Plugin sends HTTPS request with metadata to Inventory Service (8)
6. Plugin performs task status update request authenticated by Resource Principal supplied by Cloud Bridge to Discovery CP
   1. ref: Discovery CP typical request data flow
7. Task and overall Job status is updated in Discovery CP (13)

Plugin Collects Real-Time Metrics and Pushes them into Monitoring Service Data Flow:

1. Plugin gets configuration
   1. ref: Plugin polls Tasks and Configuration from Discovery CP typical data flow
2. Plugin fetches asset metrics from vCenter in User External Environment via HTTPS connection (10, Network completely controlled by User)
3. Metrics converted into appropriate format (This happens in the plugin, no network)
4. Plugin sends HTTPS request with metrics to Monitoring Service (9)

Plugin Collects Historical Metrics and Pushes them into Monitoring Service Data Flow:

1. Plugin gets configuration
   1. ref: Plugin polls Tasks and Configuration from Discovery CP typical data flow
2. Plugin fetches asset metrics from vCenter in User External Environment via HTTPS connection (10, Network completely controlled by User)
3. Metrics converted into appropriate format (This happens in the plugin, no network)
4. Historical metrics are pushed into Inventory Service and stored as part of metadata (8)

Service Operator Troubleshooting Flow (Overlay):

1. Service Engineer Logs in to SecEdge Overlay Bastion.
2. SSH connection is established to a Bastion host (11)
3. Bastion Host forwards connection to service host (12)

Inventory

An inventory contains a collection of assets and associated metadata. This data is collected during external asset discovery and a user can browse the discovered assets and start planning services such as a migration process. In order to use the inventory for such services, a user has to access the inventory for importing, viewing, and searching assets. But before the user can access the inventory importing, viewing, and searching assets, the user will need to create the inventory, install the remote agent appliance, register the agent with a migration environment within the CSPI, and run a discovery job to populate the inventory with assets.

The creation of the inventory may comprise the following exemplary workflow steps. A user may open a console navigation menu and select a service such as migration. Under migration, the user may select inventory, and then select create an inventory. The inventory may then be created by the system automatically. A tenant can have only one inventory in one region that is created during the inventory initialization process. The inventory resource is a standard CSPI resource, but a restriction that is added that there can be at most one at a given time. There are two main reasons for limiting the inventory to one resource per tenant: (i) This helps to de-duplicate the assets in a tenancy. Avoiding duplicate assets helps the downstream services, migration service, and replication service, to avoid copying the same VM data multiple times and avoid creating multiple CSPI resources for the same asset. (ii) This will provide one global view of a user's assets across different external environments in the future (multi-cloud services). However, it should be understood that this approach also gives flexibility for multiple inventories if ever needed. Inventory resource supports the standard CSPI CRUDL operations which means that the user can delete their inventory. The deletion process removes all the user's data and schema present in a database such as ATP. The user can then re-create the inventory that generates a new inventory Cloud ID.

In general, an asset can have the following states: (i) ACTIVE—The Asset is discovered in the external environment. (ii) DELETED—The external asset was deleted in the external environment. Assets will be deleted by the discovery service after it has been determined that the external resource it represents has been deleted. In some instances, the user may only be allowed to delete an asset if it is manually imported (e.g., using CSV) or there is no asset source associated with the asset (if there is an asset source, it would likely be re-created by the discovery service). In other instances, as long as users have the permissions as discovery plugin, they can still delete the assets from UI/SDK/CLI. But if the asset still exists in the on-premises environment, the same asset with a different Cloud ID would be recreated by the discovery plugin. Assets are deleted by sync delete asset API, then it would be marked as DELETED state. State in inventory is eventually consistent with the state of the actual asset; however, a stale state can be present due to assets being unreachable due to networking issues. Users can check a discovery's asset source state for identifying stale assets. The CSPI may also track the last updated property of an asset, so it potentially identifies stale assets. Deleted assets may be initially left as tombstones and removed after a predetermined period of time.

Viewing the inventory may comprise the following exemplary workflow steps. A user may open a console navigation menu and select a service such as migration. Under migration, the user may select inventory, and then select inventory assets. The inventory assets page lists all the assets discovered by the asset discovery from the external environment. The listed assets contain metadata that the discovery plugin collects from the external environment assets. To view the metadata of an asset, a user may select an interface toggle such as down arrow for an active asset and expand the information about the asset. From the actions menu of the asset, a user may choose to view details to see more information about the asset. Under resources, a user may select to view real time metrics for CPU utilization, memory utilization, and the like. The remote agent appliance collects this metrics information. Under resources, a user may select historical metrics to view the metrics collected by a centralized management utility such as the VMware vCenter.

In cloud migration services, a user can choose to import assets from CSV files instead of setting up a source environment. In such a scenario, the user can't take advantage of the automated discovery and replication modules. The manual importing of assets to the inventory may comprise the following exemplary workflow steps. A user may open a console navigation menu and select a service such as migration. Under migration, the user may select inventory, and then select inventory assets. The use may select import assets and optionally download a CSV template. The user may then use the import interface to edit a CSV template to add asset information for an asset the user wants to import into the inventory and save the CSV template as a CSV file. The user may then execute/upload the CSV file to import the asset into the inventory. The importing of assets may take some time, e.g., a few minutes, and the user can find the asset status change to active under a status column within the inventory assets page. The user may also navigate under inventory, select work requests, and see the new import job and status thereof. In order for a user to modify the entries for an inventory asset, the user may update the CSV file and upload the CSV file again.

Each asset imported into the inventory (manually or automatically through discovery) will have a constraint that the tuple of external identifier and source identifier must be unique across an inventory (deduping constraint). However, assets with the same external identifier may have multiple representations as identified by different sources. For example, the user can choose to manually import an asset from a CSV source which was also discovered from the VMware source leading to the creation of two different assets. Consuming the assets may be when the logical dedupe occurs for such an instance. For example, both the assets may be presented to the user and the suer chooses one. Alternatively, the dedupe logic can handle more complex scenarios both for actual de-duping, but also for handling different possible sources of asset info for the same asset.

The assets in the inventory are considered CSPI resources with CloudIDs and thus they inherit standard CSPI properties like permissions, compartments, and tags. Users write policies to control access to create, update, and other operations. Discovery plugin uses Resource Principal (RP) belonging to the customer for creating, updating, reading an asset, and thus the user will have to provide manage permissions to the plugin's dynamic group. The following are examples of such permissions (each of the permissions may have CB_INVENTORY_as the prefix):

Inspect—ASSET_INSPECT

Read—ASSET_READ, ASSET_METRICS_READ, +all of the above

Use—ASSET_UPDATE, ASSET_MOVE+ASSET_IMPORT+all of the above

Manage—ASSET_CREATE, ASSET_DISCOVERY UPDATE+ASSET_METRICS_CREATE+all of the above This restriction helps to avoid any conflict that may happen with the plugin's update call for the same asset. In the above metaverb mapping, the users with ASSET_UPDATE_TAGS permission can call the update asset API to only update the tags whereas the plugins with ASSET_UPDATE permission will be able to call the update API to update the full metadata of an asset.

One of the core features of inventory is the ability to explore and analyze the asset metadata. It is expected that users may have more than 10,000 assets per data center, and thus the need for search functionality is important. In some instances, the inventory may provide one or more APIs for searching of assets and analysis of the metadata. The searching of the inventory assets may comprise the following exemplary workflow steps. A user may open a console navigation menu and select a service such as migration. Under migration, the user may select inventory, and then select inventory assets. The inventory assets page lists all the assets discovered by the asset discovery from the external environment. The listed assets contain metadata that the discovery plugin collects from the assets on the external environment. A user interface may be used to call a query service such as the RQS service to list assets for the users to support free text syntax search from the inventory. For example, a search box may be provided in the inventory assets interface such as a freeform query text field that use the query service and syntax to list assets for customers. In some instances, a compartment or compartments and the type of resource may be selected in the search box. In certain instances, to extract a list of all assets based on a compartment ID, a user may select the search feature from the interface.

The user may then provide a query for searching all assets of a compartment by using a quick start query option. In the quick start query option, the user chooses the required <fieldName> to query with (the query filed name may be displayed under custom filters) and then the user chooses a <value> to complete the query condition. Alternatively, the user may provide a query for searching all assets of a compartment by using an editor mode option. In the editor mode option, the user specifies the required conditions of the search in the search box. For example, a where clause may be used to apply conditions that filter the results returned by search. A user can specify one or more condition statements. In a query, conditions are comprised of the following: <fieldName>; <operation>; and <value>. The <fieldName> keyword is the resource attribute against which the <operation> and chosen <value> of that attribute are evaluated. Each field is associated with a field type. The field type tells the user the expected format for any value in that field. What kind of <operation> a user can use in a conditions statement depends on the field type. In query conditions, an <operation> is a comparison operator that applies to the <value> in the statement. The <value> keyword refers to the value of the <fieldName> the user specified. Search evaluates whether the specified attribute of the chosen resource type matches or does not match the <value>, according to the <operation>. Once the query is executed via the quick start query option or the editor mode option, the user can then view and save the list of assets based on the query that was set. To populate a list of discovered assets instantly, a user may select a saved search and choose a query from previously saved queries. In some instances, inventory will also integrate with other query systems and/or query languages such as SQL and RQS to support searching for assets and relations via those systems and query languages.

The analyzing of the inventory assets may comprise basic viewing, sorting, filtering, and saving operations. Apart from this basic functionality, an aggregation API may also be implemented to apply aggregation operators such as max, min, count, and groupby on the asset metadata that helps users to analyze their inventory. For example, users can run queries to find the total primary memory allocated for all the VMs combined or the total number of CPU or GPU cores used per asset type, or the number of different types of OS used. This type of analysis will help the users to make optimal decisions regarding how to go about the service such as migration planning and execution.

Figure 9:
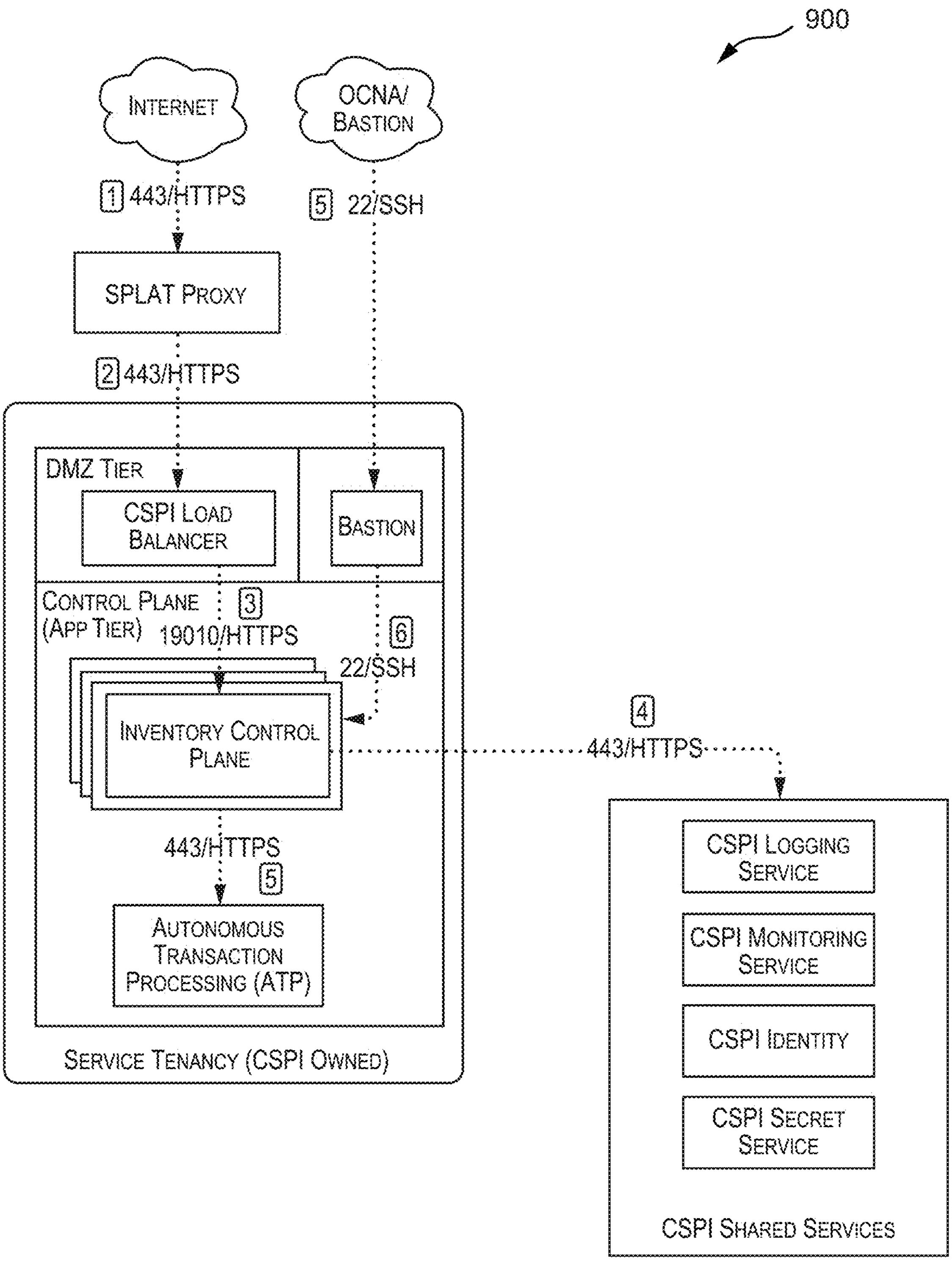
FIG. 9 is a high-level simplified block diagram for the overall inventory architecture in accordance with various embodiments.

FIG. 9 shows a high-level diagram for the overall inventory architecture 900 in accordance with various embodiments. Table 1 provides a brief description of the components and terms used with reference to the high-level diagram, which are also described in detail herein. The inventory service is a control plane service and may be available in the overlay. The control plane may use a database such as an ATP Database for a persistent list of imported assets and their metadata. In some instances, there are two types of databases used in inventory and both may be regional: (i) Tenant database: This database is used to store user metadata such as assets, metrics. A single schema may be used per tenant, created during the user's onboarding process, that stores all the tenant's metadata. Apart from the metadata, the schema also contains Property View Graph (PG View) tables (Vertices and Edges). PG View allows users to model data as a graph over a given database. It allows data entities (such as assets) as vertices and relationships between them as edges in the graph. The graph information is stored in metadata tables in the database. The graph can be queried using a query language such as PGQL graph queries and the queries on a property graph view get translated into the queries that run in the database. (ii) Service database: This database is used to store the tenant pluggable databases (PDBs) configs, for ex: JDBC URL, schema name, etc. All the instances may cache the service ATP config locally to avoid any extra database call. The inventory service exposes an API layer (e.g., Inventory Service API) for creating, fetching, searching, and analyzing assets on both types of databases. Some operations such as onboarding (creating) and inventory, as well as CSV import and export are async operations that use standard work requests with respect to the databases.

The following is a list of exemplary data flows for the inventory service. Each part of a flow potentially references a connection channel in the overall discovery architecture 900 in FIG. 9 by number in parenthetical.

Inventory Asset Creation Flow

1. The Customer sends the request to SPLAT (1)
2. SPLAT preforms Authentication/Authorization/Audit/Tagging/Metric/Throttling (Not shown)
3. SPLAT forwards the request to Load Balancer via HTTPS (2).
4. The Load Balancer forwards the request to one of the Inventory API servers (3).
5. The request is processed, and the data is read/written to/from ATP DB via HTTPS (5).

Inventory Asset Read/Update/Delete Flow

1. The Customer sends the request to SPLAT (1)
2. SPLAT preforms Authentication/Authorization/Audit/Tagging/Metric/Throttling (Not shown)
3. SPLAT forwards the request to Load Balancer via HTTPS (2).
4. The Load Balancer forwards the request to one of the Inventory API servers (3).
5. The request is processed, and the data is read/written to/from ATP DB via HTTPS (5).

Discovery and Inventory Techniques

Figure 10:
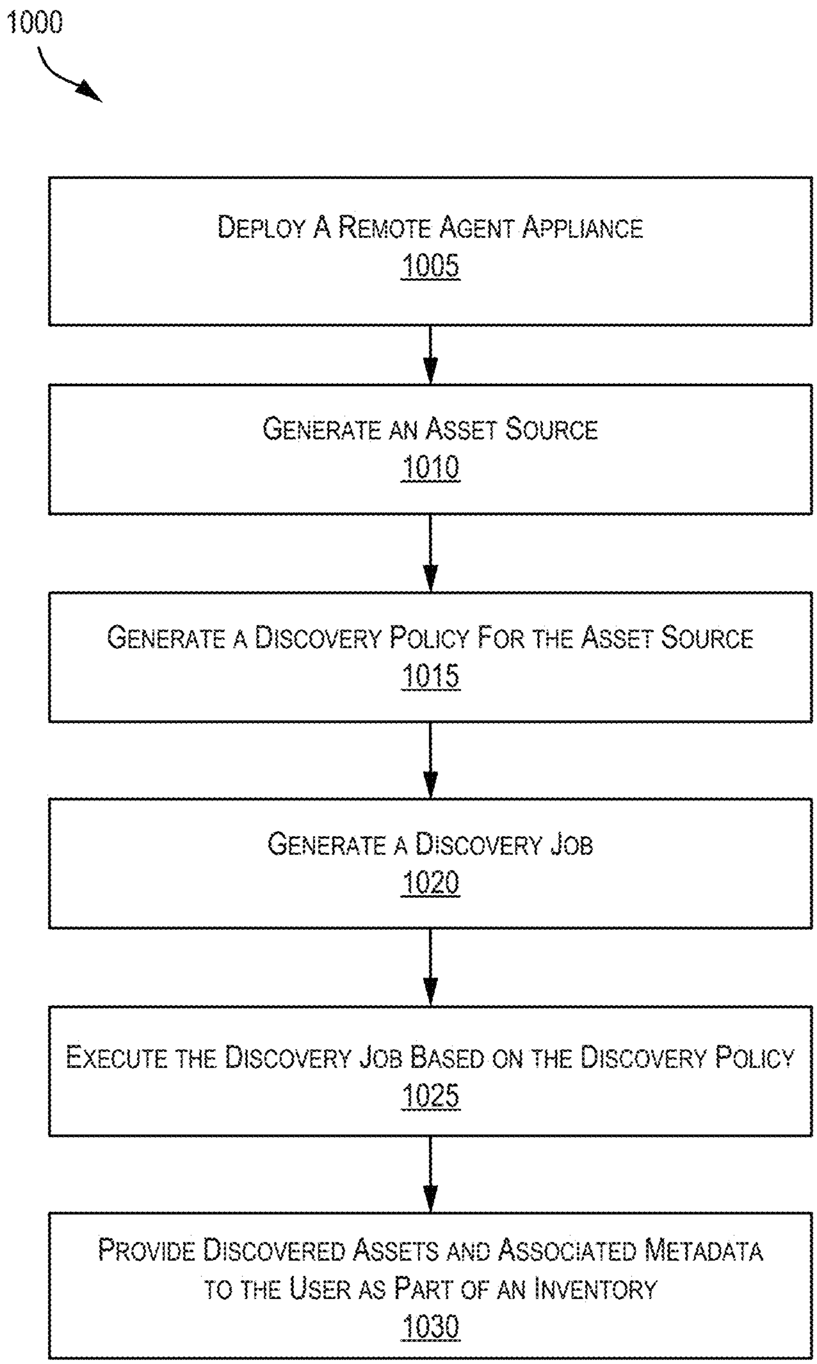
FIG. 10 depicts a flowchart illustrating discovery and inventory control for remote resource integration with cloud services according to various embodiments.

FIG. 10 depicts a simplified flowchart 1000 depicting techniques for discovery and inventory control for remote resource integration with cloud services according to various embodiments. The processing depicted in FIG. 10 may be implemented in software (e.g., code, instructions, program) executed by one or more processing units (e.g., processors, cores) of the respective systems, hardware, or combinations thereof. The software may be stored on a non-transitory storage medium (e.g., on a memory device). The technique presented in FIG. 10 and described below is intended to be illustrative and non-limiting. Although FIG. 10 depicts the various processing steps occurring in a particular sequence or order, this is not intended to be limiting. In certain alternative embodiments, the steps may be performed in some different order or some steps may also be performed in parallel.

At block 1005, a remote agent appliance is deployed in an external environment of a user. The remote agent appliance comprises a discovery plugin.

At block 1010, an asset source is created that specifies a location of the external environment from which external assets and associated asset metadata should be discovered along with a reference to credentials stored in a data store.

In some instances, in response to creating the asset source, connectors are generated between the discovery plugin and the location of the external environment. The asset metadata is retrieved for the external assets using the connectors. In certain instances, the use of the connectors comprises use of APIs to retrieve the asset metadata for the external assets.

At block 1015, a discovery policy is created for discovering the external assets within the asset source. In some instances, the discovery policy is a schedule that identifies a time for when the computing system is to execute the discovery job.

At block 1020, a discovery job is generated for the purpose of retrieving the asset metadata for the external assets discovered within the asset source.

At block 1025, the discovery job is executed to discover the external assets within the asset source based on the discovery policy. The executing the discovery job comprises retrieving the asset metadata for the external assets discovered within the asset source and populating an inventory with the asset metadata. The inventory contains a collection of assets that includes the asset metadata for the external assets.

In some instances, the inventory is generated on a cloud infrastructure, The cloud infrastructure is in communication with the remote agent appliance.

At block 1030, the collection of assets and the associated asset metadata within the inventory are provided to the user.

In some instances, the providing the collection of assets and the associated asset metadata within the inventory to the user comprises displaying the collection of assets and the associated asset metadata to the user in a graphical user interface. In some instances, an asset analytic API is also provided to the user to help the user aggregate the asset metadata to gain insight into user's external environment (e.g., on-premises environment).

In some instances, once the collection of assets and the associated asset metadata are at least part of the inventory, a query may be received from the user regarding the asset metadata, the query may be executed on the inventory, and the results of the query can be provided to the user based on the executing of the query.

In some instances, once the collection of assets and the associated asset metadata are at least part of the inventory, a migration project may be generated based on one or more assets within the collection of assets and the associated asset metadata within the inventory, and a migration of the one or more assets to the cloud infrastructure can be executed based on the migration project.

Illustrative Systems

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS users may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Users can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the user may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 11:
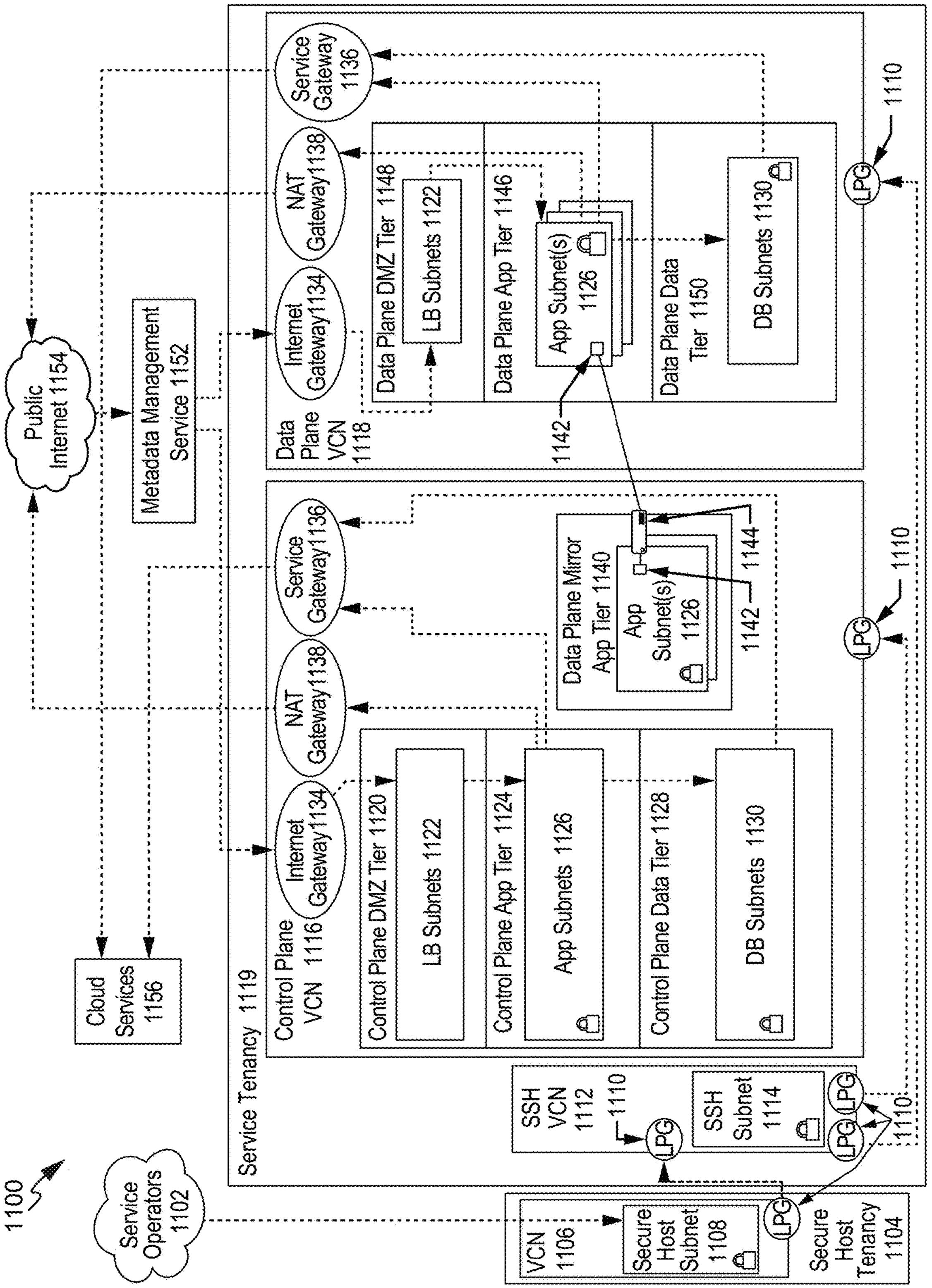
FIG. 11 is a block diagram illustrating one pattern for implementing a cloud infrastructure as a service system, according to at least one embodiment.

FIG. 11 is a block diagram 1100 illustrating an example pattern of an IaaS architecture, according to at least one embodiment. Service operators 1102 can be communicatively coupled to a secure host tenancy 1104 that can include a virtual cloud network (VCN) 1106 and a secure host subnet 1108. In some examples, the service operators 1102 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1106 and/or the Internet.

The VCN 1106 can include a local peering gateway (LPG) 1110 that can be communicatively coupled to a secure shell (SSH) VCN 1112 via an LPG 1110 contained in the SSH VCN 1112. The SSH VCN 1112 can include an SSH subnet 1114, and the SSH VCN 1112 can be communicatively coupled to a control plane VCN 1116 via the LPG 1110 contained in the control plane VCN 1116. Also, the SSH VCN 1112 can be communicatively coupled to a data plane VCN 1118 via an LPG 1110. The control plane VCN 1116 and the data plane VCN 1118 can be contained in a service tenancy 1119 that can be owned and/or operated by the IaaS provider.

The control plane VCN 1116 can include a control plane demilitarized zone (DMZ) tier 1120 that acts as a perimeter network (e.g., portions of a corporate network between the corporate intranet and external networks). The DMZ-based servers may have restricted responsibilities and help keep breaches contained. Additionally, the DMZ tier 1120 can include one or more load balancer (LB) subnet(s) 1122, a control plane app tier 1124 that can include app subnet(s) 1126, a control plane data tier 1128 that can include database (DB) subnet(s) 1130 (e.g., frontend DB subnet(s) and/or backend DB subnet(s)). The LB subnet(s) 1122 contained in the control plane DMZ tier 1120 can be communicatively coupled to the app subnet(s) 1126 contained in the control plane app tier 1124 and an Internet gateway 1134 that can be contained in the control plane VCN 1116, and the app subnet(s) 1126 can be communicatively coupled to the DB subnet(s) 1130 contained in the control plane data tier 1128 and a service gateway 1136 and a network address translation (NAT) gateway 1138. The control plane VCN 1116 can include the service gateway 1136 and the NAT gateway 1138.

The control plane VCN 1116 can include a data plane mirror app tier 1140 that can include app subnet(s) 1126. The app subnet(s) 1126 contained in the data plane mirror app tier 1140 can include a virtual network interface controller (VNIC) 1142 that can execute a compute instance 1144. The compute instance 1144 can communicatively couple the app subnet(s) 1126 of the data plane mirror app tier 1140 to app subnet(s) 1126 that can be contained in a data plane app tier 1146.

The data plane VCN 1118 can include the data plane app tier 1146, a data plane DMZ tier 1148, and a data plane data tier 1150. The data plane DMZ tier 1148 can include LB subnet(s) 1122 that can be communicatively coupled to the app subnet(s) 1126 of the data plane app tier 1146 and the Internet gateway 1134 of the data plane VCN 1118. The app subnet(s) 1126 can be communicatively coupled to the service gateway 1136 of the data plane VCN 1118 and the NAT gateway 1138 of the data plane VCN 1118. The data plane data tier 1150 can also include the DB subnet(s) 1130 that can be communicatively coupled to the app subnet(s) 1126 of the data plane app tier 1146.

The Internet gateway 1134 of the control plane VCN 1116 and of the data plane VCN 1118 can be communicatively coupled to a metadata management service 1152 that can be communicatively coupled to public Internet 1154. Public Internet 1154 can be communicatively coupled to the NAT gateway 1138 of the control plane VCN 1116 and of the data plane VCN 1118. The service gateway 1136 of the control plane VCN 1116 and of the data plane VCN 1118 can be communicatively couple to cloud services 1156.

In some examples, the service gateway 1136 of the control plane VCN 1116 or of the data plane VCN 1118 can make application programming interface (API) calls to cloud services 1156 without going through public Internet 1154. The API calls to cloud services 1156 from the service gateway 1136 can be one-way: the service gateway 1136 can make API calls to cloud services 1156, and cloud services 1156 can send requested data to the service gateway 1136. But, cloud services 1156 may not initiate API calls to the service gateway 1136.

In some examples, the secure host tenancy 1104 can be directly connected to the service tenancy 1119, which may be otherwise isolated. The secure host subnet 1108 can communicate with the SSH subnet 1114 through an LPG 1110 that may enable two-way communication over an otherwise isolated system. Connecting the secure host subnet 1108 to the SSH subnet 1114 may give the secure host subnet 1108 access to other entities within the service tenancy 1119.

The control plane VCN 1116 may allow users of the service tenancy 1119 to set up or otherwise provision desired resources. Desired resources provisioned in the control plane VCN 1116 may be deployed or otherwise used in the data plane VCN 1118. In some examples, the control plane VCN 1116 can be isolated from the data plane VCN 1118, and the data plane mirror app tier 1140 of the control plane VCN 1116 can communicate with the data plane app tier 1146 of the data plane VCN 1118 via VNICs 1142 that can be contained in the data plane mirror app tier 1140 and the data plane app tier 1146.

In some examples, users of the system, or users, can make requests, for example create, read, update, or delete (CRUD) operations, through public Internet 1154 that can communicate the requests to the metadata management service 1152. The metadata management service 1152 can communicate the request to the control plane VCN 1116 through the Internet gateway 1134. The request can be received by the LB subnet(s) 1122 contained in the control plane DMZ tier 1120. The LB subnet(s) 1122 may determine that the request is valid, and in response to this determination, the LB subnet(s) 1122 can transmit the request to app subnet(s) 1126 contained in the control plane app tier 1124. If the request is validated and requires a call to public Internet 1154, the call to public Internet 1154 may be transmitted to the NAT gateway 1138 that can make the call to public Internet 1154. Metadata that may be desired to be stored by the request can be stored in the DB subnet(s) 1130.

In some examples, the data plane mirror app tier 1140 can facilitate direct communication between the control plane VCN 1116 and the data plane VCN 1118. For example, changes, updates, or other suitable modifications to configuration may be desired to be applied to the resources contained in the data plane VCN 1118. Via a VNIC 1142, the control plane VCN 1116 can directly communicate with, and can thereby execute the changes, updates, or other suitable modifications to configuration to, resources contained in the data plane VCN 1118.

In some embodiments, the control plane VCN 1116 and the data plane VCN 1118 can be contained in the service tenancy 1119. In this case, the user, or the user, of the system may not own or operate either the control plane VCN 1116 or the data plane VCN 1118. Instead, the IaaS provider may own or operate the control plane VCN 1116 and the data plane VCN 1118, both of which may be contained in the service tenancy 1119. This embodiment can enable isolation of networks that may prevent users or users from interacting with other users', or other users', resources. Also, this embodiment may allow users or users of the system to store databases privately without needing to rely on public Internet 1154, which may not have a desired level of threat prevention, for storage.

In other embodiments, the LB subnet(s) 1122 contained in the control plane VCN 1116 can be configured to receive a signal from the service gateway 1136. In this embodiment, the control plane VCN 1116 and the data plane VCN 1118 may be configured to be called by a user of the IaaS provider without calling public Internet 1154. Users of the IaaS provider may desire this embodiment since database(s) that the users use may be controlled by the IaaS provider and may be stored on the service tenancy 1119, which may be isolated from public Internet 1154.

Figure 12:
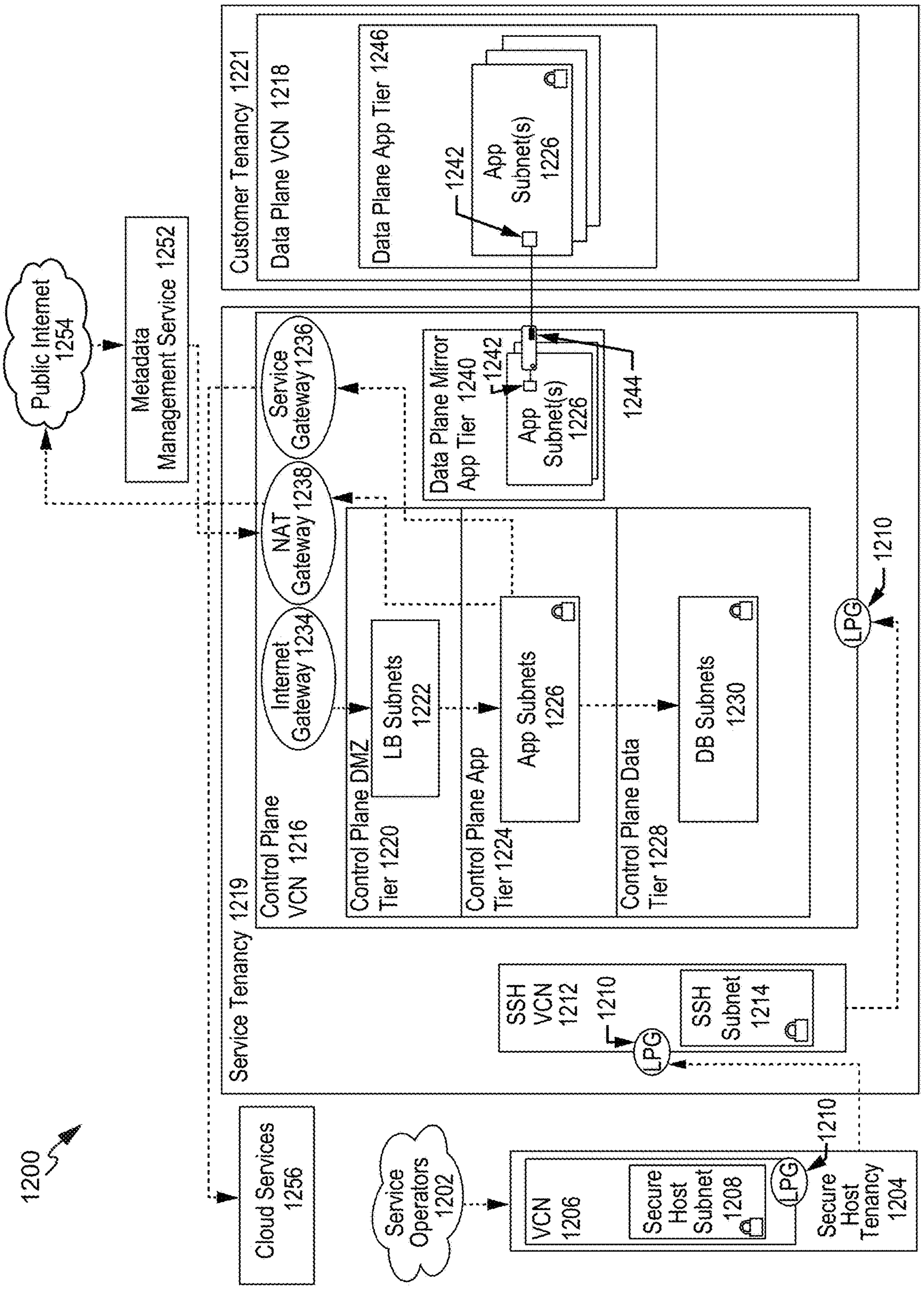
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g., service operators 1102 of FIG. 11) can be communicatively coupled to a secure host tenancy 1204 (e.g., the secure host tenancy 1104 of FIG. 11) that can include a virtual cloud network (VCN) 1206 (e.g., the VCN 1106 of FIG. 11) and a secure host subnet 1208 (e.g., the secure host subnet 1108 of FIG. 11). The VCN 1206 can include a local peering gateway (LPG) 1210 (e.g., the LPG 1110 of FIG. 11) that can be communicatively coupled to a secure shell (SSH) VCN 1212 (e.g., the SSH VCN 1112 of FIG. 11) via an LPG 1110 contained in the SSH VCN 1212. The SSH VCN 1212 can include an SSH subnet 1214 (e.g., the SSH subnet 1114 of FIG. 11), and the SSH VCN 1212 can be communicatively coupled to a control plane VCN 1216 (e.g., the control plane VCN 1116 of FIG. 11) via an LPG 1210 contained in the control plane VCN 1216. The control plane VCN 1216 can be contained in a service tenancy 1219 (e.g., the service tenancy 1119 of FIG. 11), and the data plane VCN 1218 (e.g., the data plane VCN 1118 of FIG. 11) can be contained in a user tenancy 1221 that may be owned or operated by users, or users, of the system.

The control plane VCN 1216 can include a control plane DMZ tier 1220 (e.g., the control plane DMZ tier 1120 of FIG. 11) that can include LB subnet(s) 1222 (e.g., LB subnet(s) 1122 of FIG. 11), a control plane app tier 1224 (e.g., the control plane app tier 1124 of FIG. 11) that can include app subnet(s) 1226 (e.g., app subnet(s) 1126 of FIG. 11), a control plane data tier 1228 (e.g., the control plane data tier 1128 of FIG. 11) that can include database (DB) subnet(s) 1230 (e.g., similar to DB subnet(s) 1130 of FIG. 11). The LB subnet(s) 1222 contained in the control plane DMZ tier 1220 can be communicatively coupled to the app subnet(s) 1226 contained in the control plane app tier 1224 and an Internet gateway 1234 (e.g., the Internet gateway 1134 of FIG. 11) that can be contained in the control plane VCN 1216, and the app subnet(s) 1226 can be communicatively coupled to the DB subnet(s) 1230 contained in the control plane data tier 1228 and a service gateway 1236 (e.g., the service gateway 1136 of FIG. 11) and a network address translation (NAT) gateway 1238 (e.g., the NAT gateway 1138 of FIG. 11). The control plane VCN 1216 can include the service gateway 1236 and the NAT gateway 1238.

The control plane VCN 1216 can include a data plane mirror app tier 1240 (e.g., the data plane mirror app tier 1140 of FIG. 11) that can include app subnet(s) 1226. The app subnet(s) 1226 contained in the data plane mirror app tier 1240 can include a virtual network interface controller (VNIC) 1242 (e.g., the VNIC of 1142) that can execute a compute instance 1244 (e.g., similar to the compute instance 1144 of FIG. 11). The compute instance 1244 can facilitate communication between the app subnet(s) 1226 of the data plane mirror app tier 1240 and the app subnet(s) 1226 that can be contained in a data plane app tier 1246 (e.g., the data plane app tier 1146 of FIG. 11) via the VNIC 1242 contained in the data plane mirror app tier 1240 and the VNIC 1242 contained in the data plane app tier 1246.

The Internet gateway 1234 contained in the control plane VCN 1216 can be communicatively coupled to a metadata management service 1252 (e.g., the metadata management service 1152 of FIG. 11) that can be communicatively coupled to public Internet 1254 (e.g., public Internet 1154 of FIG. 11). Public Internet 1254 can be communicatively coupled to the NAT gateway 1238 contained in the control plane VCN 1216. The service gateway 1236 contained in the control plane VCN 1216 can be communicatively couple to cloud services 1256 (e.g., cloud services 1156 of FIG. 11).

In some examples, the data plane VCN 1218 can be contained in the user tenancy 1221. In this case, the IaaS provider may provide the control plane VCN 1216 for each user, and the IaaS provider may, for each user, set up a unique compute instance 1244 that is contained in the service tenancy 1219. Each compute instance 1244 may allow communication between the control plane VCN 1216, contained in the service tenancy 1219, and the data plane VCN 1218 that is contained in the user tenancy 1221. The compute instance 1244 may allow resources, that are provisioned in the control plane VCN 1216 that is contained in the service tenancy 1219, to be deployed or otherwise used in the data plane VCN 1218 that is contained in the user tenancy 1221.

In other examples, the user of the IaaS provider may have databases that live in the user tenancy 1221. In this example, the control plane VCN 1216 can include the data plane mirror app tier 1240 that can include app subnet(s) 1226. The data plane mirror app tier 1240 can reside in the data plane VCN 1218, but the data plane mirror app tier 1240 may not live in the data plane VCN 1218. That is, the data plane mirror app tier 1240 may have access to the user tenancy 1221, but the data plane mirror app tier 1240 may not exist in the data plane VCN 1218 or be owned or operated by the user of the IaaS provider. The data plane mirror app tier 1240 may be configured to make calls to the data plane VCN 1218 but may not be configured to make calls to any entity contained in the control plane VCN 1216. The user may desire to deploy or otherwise use resources in the data plane VCN 1218 that are provisioned in the control plane VCN 1216, and the data plane mirror app tier 1240 can facilitate the desired deployment, or other usage of resources, of the user.

In some embodiments, the user of the IaaS provider can apply filters to the data plane VCN 1218. In this embodiment, the user can determine what the data plane VCN 1218 can access, and the user may restrict access to public Internet 1254 from the data plane VCN 1218. The IaaS provider may not be able to apply filters or otherwise control access of the data plane VCN 1218 to any outside networks or databases. Applying filters and controls by the user onto the data plane VCN 1218, contained in the user tenancy 1221, can help isolate the data plane VCN 1218 from other users and from public Internet 1254.

In some embodiments, cloud services 1256 can be called by the service gateway 1236 to access services that may not exist on public Internet 1254, on the control plane VCN 1216, or on the data plane VCN 1218. The connection between cloud services 1256 and the control plane VCN 1216 or the data plane VCN 1218 may not be live or continuous. Cloud services 1256 may exist on a different network owned or operated by the IaaS provider. Cloud services 1256 may be configured to receive calls from the service gateway 1236 and may be configured to not receive calls from public Internet 1254. Some cloud services 1256 may be isolated from other cloud services 1256, and the control plane VCN 1216 may be isolated from cloud services 1256 that may not be in the same region as the control plane VCN 1216. For example, the control plane VCN 1216 may be located in "Region 1," and cloud service "Deployment 11," may be located in Region 1 and in "Region 2." If a call to Deployment 11 is made by the service gateway 1236 contained in the control plane VCN 1216 located in Region 1, the call may be transmitted to Deployment 11 in Region 1. In this example, the control plane VCN 1216, or Deployment 11 in Region 1, may not be communicatively coupled to, or otherwise in communication with, Deployment 11 in Region 2.

Figure 13:
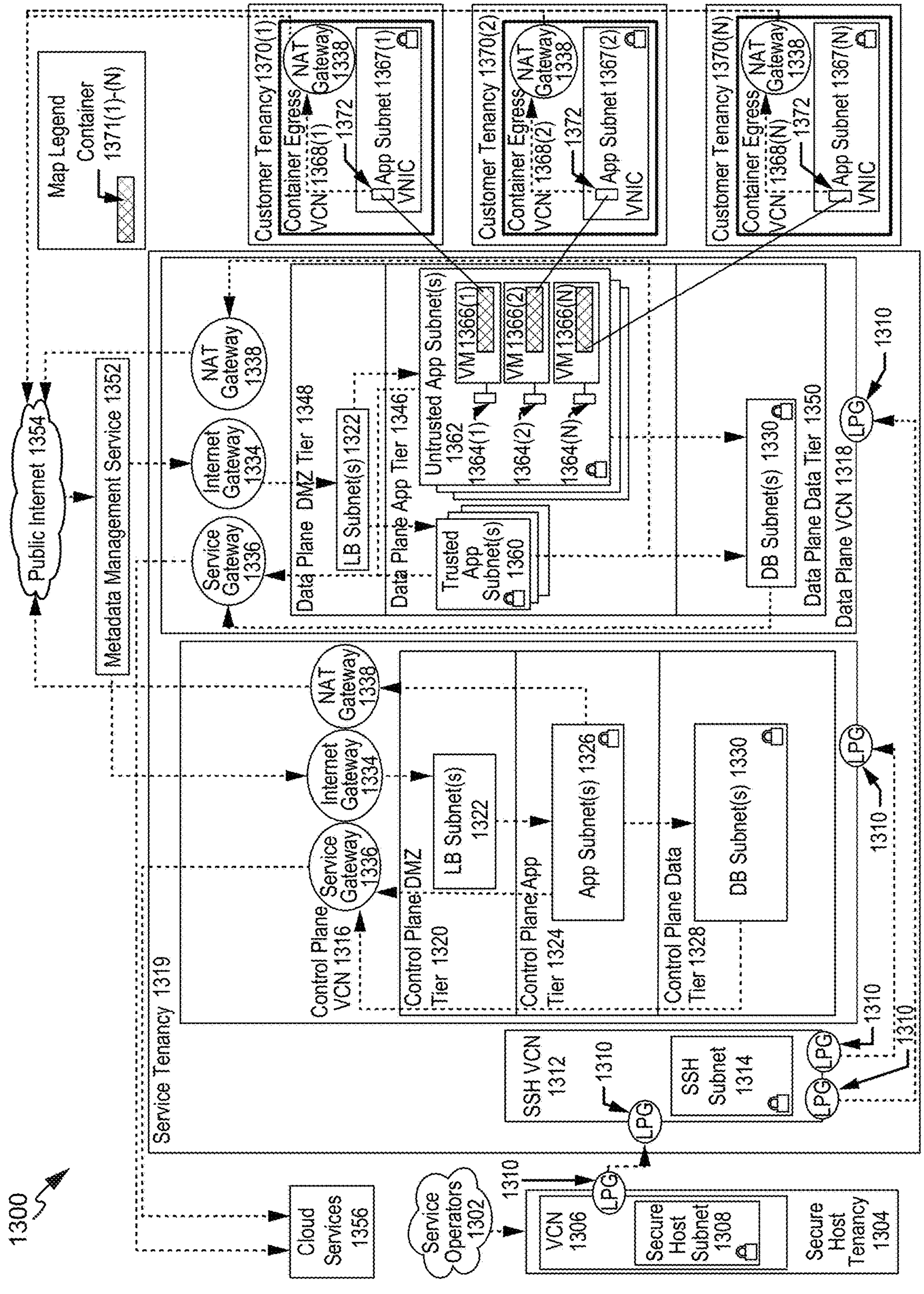
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g., service operators 1102 of FIG. 11) can be communicatively coupled to a secure host tenancy 1304 (e.g., the secure host tenancy 1104 of FIG. 11) that can include a virtual cloud network (VCN) 1306 (e.g., the VCN 1106 of FIG. 11) and a secure host subnet 1308 (e.g., the secure host subnet 1108 of FIG. 11). The VCN 1306 can include an LPG 1310 (e.g., the LPG 1110 of FIG. 11) that can be communicatively coupled to an SSH VCN 1312 (e.g., the SSH VCN 1112 of FIG. 11) via an LPG 1310 contained in the SSH VCN 1312. The SSH VCN 1312 can include an SSH subnet 1314 (e.g., the SSH subnet 1114 of FIG. 11), and the SSH VCN 1312 can be communicatively coupled to a control plane VCN 1316 (e.g., the control plane VCN 1116 of FIG. 11) via an LPG 1310 contained in the control plane VCN 1316 and to a data plane VCN 1318 (e.g., the data plane 1118 of FIG. 11) via an LPG 1310 contained in the data plane VCN 1318. The control plane VCN 1316 and the data plane VCN 1318 can be contained in a service tenancy 1319 (e.g., the service tenancy 1119 of FIG. 11).

The control plane VCN 1316 can include a control plane DMZ tier 1320 (e.g., the control plane DMZ tier 1120 of FIG. 11) that can include load balancer (LB) subnet(s) 1322 (e.g., LB subnet(s) 1122 of FIG. 11), a control plane app tier 1324 (e.g., the control plane app tier 1124 of FIG. 11) that can include app subnet(s) 1326 (e.g., similar to app subnet(s) 1126 of FIG. 11), a control plane data tier 1328 (e.g., the control plane data tier 1128 of FIG. 11) that can include DB subnet(s) 1330. The LB subnet(s) 1322 contained in the control plane DMZ tier 1320 can be communicatively coupled to the app subnet(s) 1326 contained in the control plane app tier 1324 and to an Internet gateway 1334 (e.g., the Internet gateway 1134 of FIG. 11) that can be contained in the control plane VCN 1316, and the app subnet(s) 1326 can be communicatively coupled to the DB subnet(s) 1330 contained in the control plane data tier 1328 and to a service gateway 1336 (e.g., the service gateway of FIG. 11) and a network address translation (NAT) gateway 1338 (e.g., the NAT gateway 1138 of FIG. 11). The control plane VCN 1316 can include the service gateway 1336 and the NAT gateway 1338.

The data plane VCN 1318 can include a data plane app tier 1346 (e.g., the data plane app tier 1146 of FIG. 11), a data plane DMZ tier 1348 (e.g., the data plane DMZ tier 1148 of FIG. 11), and a data plane data tier 1350 (e.g., the data plane data tier 1150 of FIG. 11). The data plane DMZ tier 1348 can include LB subnet(s) 1322 that can be communicatively coupled to trusted app subnet(s) 1360 and untrusted app subnet(s) 1362 of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include one or more primary VNICs 1364(1)-(N) that can be communicatively coupled to tenant virtual machines (VMs) 1366(1)-(N). Each tenant VM 1366(1)-(N) can be communicatively coupled to a respective app subnet 1367(1)-(N) that can be contained in respective container egress VCNs 1368(1)-(N) that can be contained in respective user tenancies 1370(1)-(N). Respective secondary VNICs 1372(1)-(N) can facilitate communication between the untrusted app subnet(s) 1362 contained in the data plane VCN 1318 and the app subnet contained in the container egress VCNs 1368(1)-(N). Each container egress VCNs 1368(1)-(N) can include a NAT gateway 1338 that can be communicatively coupled to public Internet 1354 (e.g., public Internet 1154 of FIG. 11).

The Internet gateway 1334 contained in the control plane VCN 1316 and contained in the data plane VCN 1318 can be communicatively coupled to a metadata management service 1352 (e.g., the metadata management system 1152 of FIG. 11) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some embodiments, the data plane VCN 1318 can be integrated with user tenancies 1370. This integration can be useful or desirable for users of the IaaS provider in some cases such as a case that may desire support when executing code. The user may provide code to run that may be destructive, may communicate with other user resources, or may otherwise cause undesirable effects. In response to this, the IaaS provider may determine whether to run code given to the IaaS provider by the user.

In some examples, the user of the IaaS provider may grant temporary network access to the IaaS provider and request a function to be attached to the data plane app tier 1346. Code to run the function may be executed in the VMs 1366(1)-(N), and the code may not be configured to run anywhere else on the data plane VCN 1318. Each VM 1366(1)-(N) may be connected to one user tenancy 1370. Respective containers 1371(1)-(N) contained in the VMs 1366(1)-(N) may be configured to run the code. In this case, there can be a dual isolation (e.g., the containers 1371(1)-(N) running code, where the containers 1371(1)-(N) may be contained in at least the VM 1366(1)-(N) that are contained in the untrusted app subnet(s) 1362), which may help prevent incorrect or otherwise undesirable code from damaging the network of the IaaS provider or from damaging a network of a different user. The containers 1371(1)-(N) may be communicatively coupled to the user tenancy 1370 and may be configured to transmit or receive data from the user tenancy 1370. The containers 1371(1)-(N) may not be configured to transmit or receive data from any other entity in the data plane VCN 1318. Upon completion of running the code, the IaaS provider may kill or otherwise dispose of the containers 1371(1)-(N).

In some embodiments, the trusted app subnet(s) 1360 may run code that may be owned or operated by the IaaS provider. In this embodiment, the trusted app subnet(s) 1360 may be communicatively coupled to the DB subnet(s) 1330 and be configured to execute CRUD operations in the DB subnet(s) 1330. The untrusted app subnet(s) 1362 may be communicatively coupled to the DB subnet(s) 1330, but in this embodiment, the untrusted app subnet(s) may be configured to execute read operations in the DB subnet(s) 1330. The containers 1371(1)-(N) that can be contained in the VM 1366(1)-(N) of each user and that may run code from the user may not be communicatively coupled with the DB subnet(s) 1330.

In other embodiments, the control plane VCN 1316 and the data plane VCN 1318 may not be directly communicatively coupled. In this embodiment, there may be no direct communication between the control plane VCN 1316 and the data plane VCN 1318. However, communication can occur indirectly through at least one method. An LPG 1310 may be established by the IaaS provider that can facilitate communication between the control plane VCN 1316 and the data plane VCN 1318. In another example, the control plane VCN 1316 or the data plane VCN 1318 can make a call to cloud services 1356 via the service gateway 1336. For example, a call to cloud services 1356 from the control plane VCN 1316 can include a request for a service that can communicate with the data plane VCN 1318.

Figure 14:
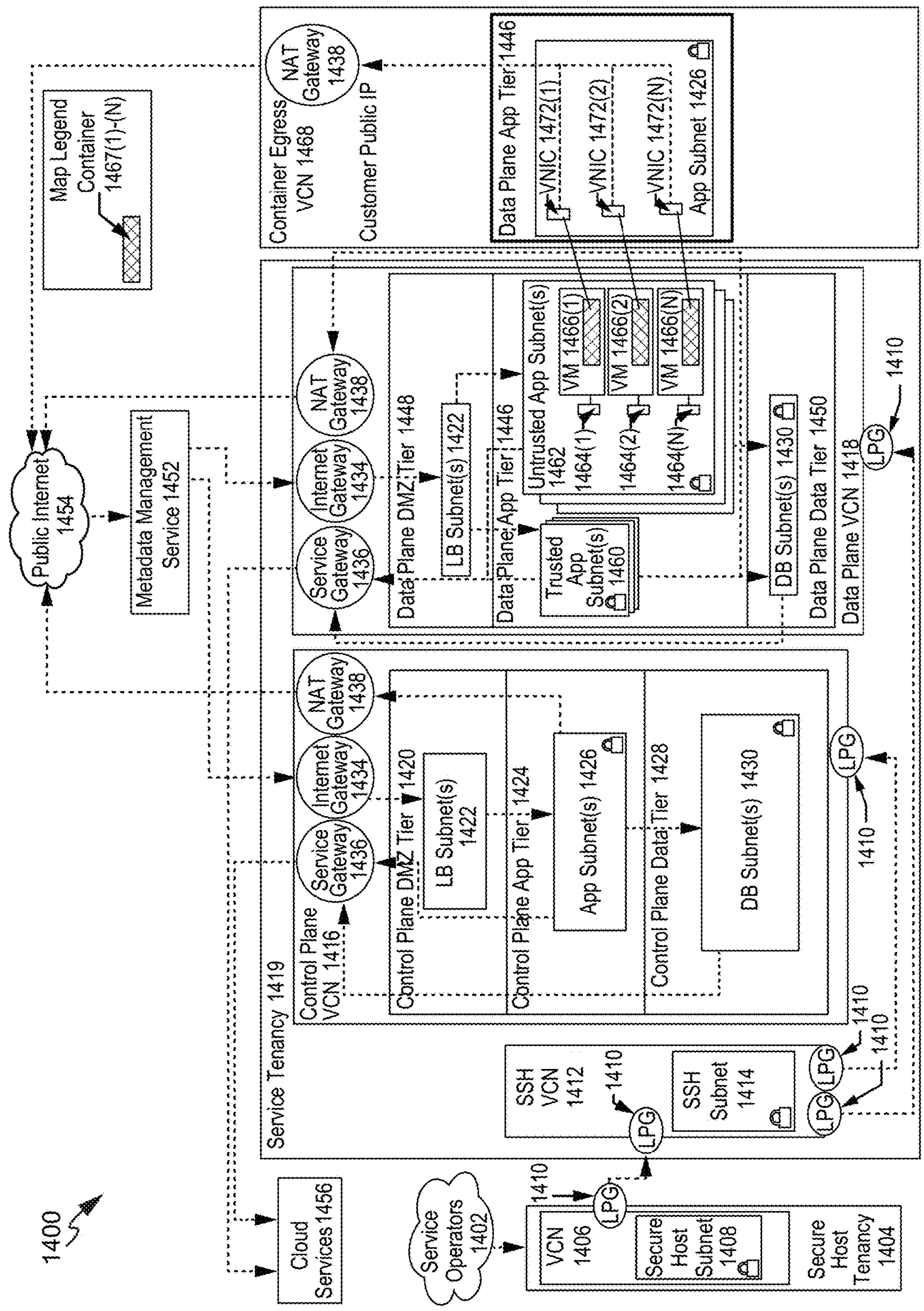
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g., service operators 1102 of FIG. 11) can be communicatively coupled to a secure host tenancy 1404 (e.g., the secure host tenancy 1104 of FIG. 11) that can include a virtual cloud network (VCN) 1406 (e.g., the VCN 1106 of FIG. 11) and a secure host subnet 1408 (e.g., the secure host subnet 1108 of FIG. 11). The VCN 1406 can include an LPG 1410 (e.g., the LPG 1110 of FIG. 11) that can be communicatively coupled to an SSH VCN 1412 (e.g., the SSH VCN 1112 of FIG. 11) via an LPG 1410 contained in the SSH VCN 1412. The SSH VCN 1412 can include an SSH subnet 1414 (e.g., the SSH subnet 1114 of FIG. 11), and the SSH VCN 1412 can be communicatively coupled to a control plane VCN 1416 (e.g., the control plane VCN 1116 of FIG. 11) via an LPG 1410 contained in the control plane VCN 1416 and to a data plane VCN 1418 (e.g., the data plane 1118 of FIG. 11) via an LPG 1410 contained in the data plane VCN 1418. The control plane VCN 1416 and the data plane VCN 1418 can be contained in a service tenancy 1419 (e.g., the service tenancy 1119 of FIG. 11).

The control plane VCN 1416 can include a control plane DMZ tier 1420 (e.g., the control plane DMZ tier 1120 of FIG. 11) that can include LB subnet(s) 1422 (e.g., LB subnet(s) 1122 of FIG. 11), a control plane app tier 1424 (e.g., the control plane app tier 1124 of FIG. 11) that can include app subnet(s) 1426 (e.g., app subnet(s) 1126 of FIG. 11), a control plane data tier 1428 (e.g., the control plane data tier 1128 of FIG. 11) that can include DB subnet(s) 1430 (e.g., DB subnet(s) 1330 of FIG. 13). The LB subnet(s) 1422 contained in the control plane DMZ tier 1420 can be communicatively coupled to the app subnet(s) 1426 contained in the control plane app tier 1424 and to an Internet gateway 1434 (e.g., the Internet gateway 1134 of FIG. 11) that can be contained in the control plane VCN 1416, and the app subnet(s) 1426 can be communicatively coupled to the DB subnet(s) 1430 contained in the control plane data tier 1428 and to a service gateway 1436 (e.g., the service gateway of FIG. 11) and a network address translation (NAT) gateway 1438 (e.g., the NAT gateway 1138 of FIG. 11). The control plane VCN 1416 can include the service gateway 1436 and the NAT gateway 1438.

The data plane VCN 1418 can include a data plane app tier 1446 (e.g., the data plane app tier 1146 of FIG. 11), a data plane DMZ tier 1448 (e.g., the data plane DMZ tier 1148 of FIG. 11), and a data plane data tier 1450 (e.g., the data plane data tier 1150 of FIG. 11). The data plane DMZ tier 1448 can include LB subnet(s) 1422 that can be communicatively coupled to trusted app subnet(s) 1460 (e.g., trusted app subnet(s) 1360 of FIG. 13) and untrusted app subnet(s) 1462 (e.g., untrusted app subnet(s) 1362 of FIG. 13) of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include primary VNICs 1464(1)-(N) that can be communicatively coupled to tenant virtual machines (VMs) 1466(1)-(N) residing within the untrusted app subnet(s) 1462. Each tenant VM 1466(1)-(N) can run code in a respective container 1467(1)-(N), and be communicatively coupled to an app subnet 1426 that can be contained in a data plane app tier 1446 that can be contained in a container egress VCN 1468. Respective secondary VNICs 1472(1)-(N) can facilitate communication between the untrusted app subnet(s) 1462 contained in the data plane VCN 1418 and the app subnet contained in the container egress VCN 1468. The container egress VCN can include a NAT gateway 1438 that can be communicatively coupled to public Internet 1454 (e.g., public Internet 1154 of FIG. 11).

The Internet gateway 1434 contained in the control plane VCN 1416 and contained in the data plane VCN 1418 can be communicatively coupled to a metadata management service 1452 (e.g., the metadata management system 1152 of FIG. 11) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some examples, the pattern illustrated by the architecture of block diagram 1400 of FIG. 14 may be considered an exception to the pattern illustrated by the architecture of block diagram 1300 of FIG. 13 and may be desirable for a user of the IaaS provider if the IaaS provider cannot directly communicate with the user (e.g., a disconnected region). The respective containers 1467(1)-(N) that are contained in the VMs 1466(1)-(N) for each user can be accessed in real-time by the user. The containers 1467(1)-(N) may be configured to make calls to respective secondary VNICs 1472(1)-(N) contained in app subnet(s) 1426 of the data plane app tier 1446 that can be contained in the container egress VCN 1468. The secondary VNICs 1472(1)-(N) can transmit the calls to the NAT gateway 1438 that may transmit the calls to public Internet 1454. In this example, the containers 1467(1)-(N) that can be accessed in real-time by the user can be isolated from the control plane VCN 1416 and can be isolated from other entities contained in the data plane VCN 1418. The containers 1467(1)-(N) may also be isolated from resources from other users.

In other examples, the user can use the containers 1467(1)-(N) to call cloud services 1456. In this example, the user may run code in the containers 1467(1)-(N) that requests a service from cloud services 1456. The containers 1467(1)-(N) can transmit this request to the secondary VNICs 1472(1)-(N) that can transmit the request to the NAT gateway that can transmit the request to public Internet 1454. Public Internet 1454 can transmit the request to LB subnet(s) 1422 contained in the control plane VCN 1416 via the Internet gateway 1434. In response to determining the request is valid, the LB subnet(s) can transmit the request to app subnet(s) 1426 that can transmit the request to cloud services 1456 via the service gateway 1436.

It should be appreciated that IaaS architectures 1100, 1200, 1300, 1400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a user in a self-service, subscription-based, elastically scalable, reliable, highly available, and secure manner. An example of such an IaaS system is the Oracle Cloud Infrastructure (OCI) provided by the present assignee.

Figure 15:
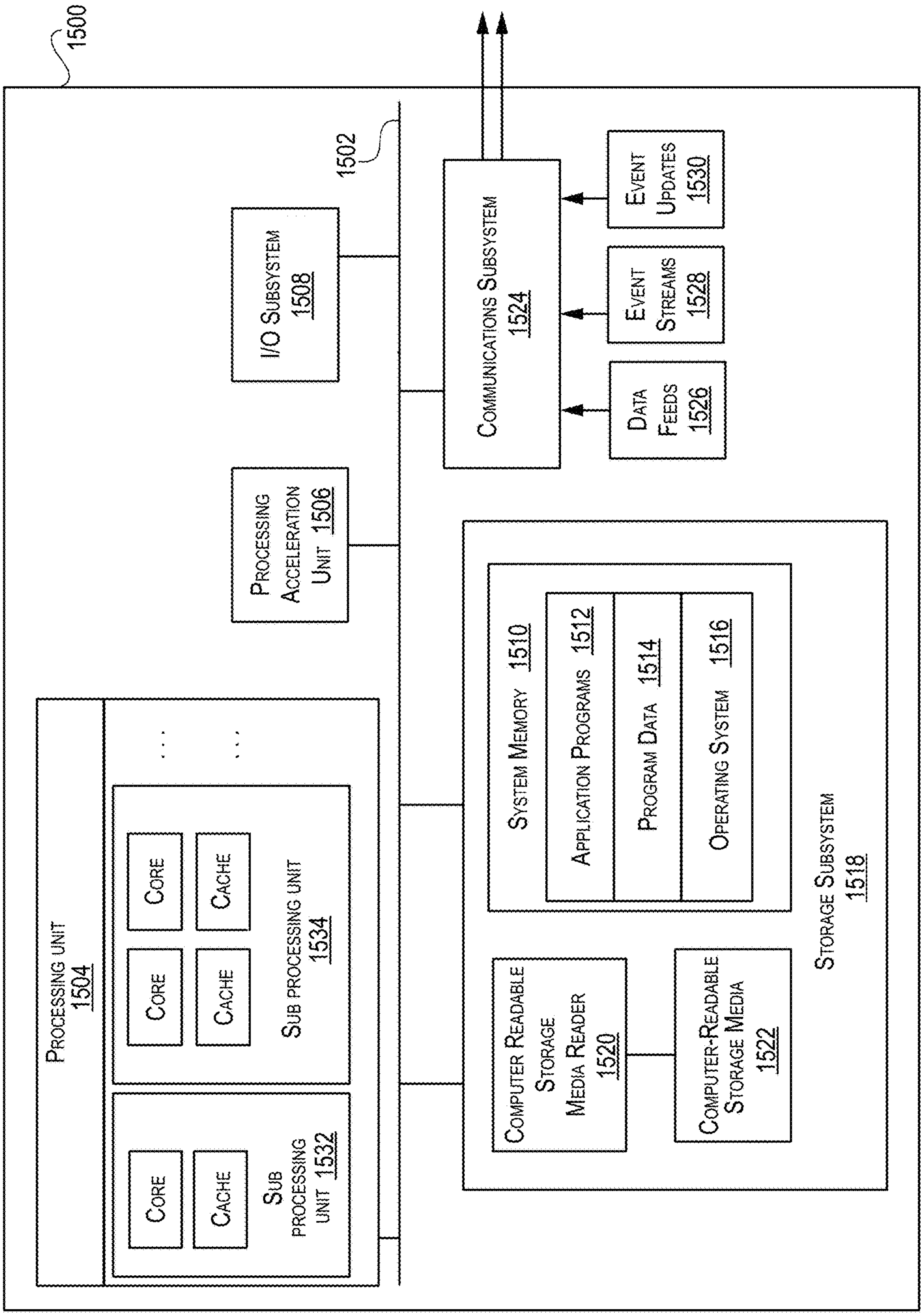
FIG. 15 is a block diagram illustrating an example computer system, according to at least one embodiment.

FIG. 15 illustrates an example computer system 1500, in which various embodiments may be implemented. The system 1500 may be used to implement any of the computer systems described above. As shown in the figure, computer system 1500 includes a processing unit 1504 that communicates with a number of peripheral subsystems via a bus subsystem 1502. These peripheral subsystems may include a processing acceleration unit 1506, an I/O subsystem 1508, a storage subsystem 1518 and a communications subsystem 1524. Storage subsystem 1518 includes tangible computer-readable storage media 1522 and a system memory 1510.

Bus subsystem 1502 provides a mechanism for letting the various components and subsystems of computer system 1500 communicate with each other as intended. Although bus subsystem 1502 is shown schematically as a single bus, alternative embodiments of the bus subsystem may utilize multiple buses. Bus subsystem 1502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1504, which can be implemented as one or more integrated circuits (e.g., a conventional microprocessor or microcontroller), controls the operation of computer system 1500. One or more processors may be included in processing unit 1504. These processors may include single core or multicore processors. In certain embodiments, processing unit 1504 may be implemented as one or more independent processing units 1532 and/or 1534 with single or multicore processors included in each processing unit. In other embodiments, processing unit 1504 may also be implemented as a quad-core processing unit formed by integrating two dual-core processors into a single chip.

In various embodiments, processing unit 1504 can execute a variety of programs in response to program code and can maintain multiple concurrently executing programs or processes. At any given time, some or all of the program code to be executed can be resident in processor(s) 1504 and/or in storage subsystem 1518. Through suitable programming, processor(s) 1504 can provide various functionalities described above. Computer system 1500 may additionally include a processing acceleration unit 1506, which can include a digital signal processor (DSP), a special-purpose processor, and/or the like.

I/O subsystem 1508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1500 may comprise a storage subsystem 1518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1504 provide the functionality described above. Storage subsystem 1518 may also provide a repository for storing data used in accordance with the present disclosure.

As depicted in the example in FIG. 15, storage subsystem 1518 can include various components including a system memory 1510, computer-readable storage media 1522, and a computer readable storage media reader 1520. System memory 1510 may store program instructions that are loadable and executable by processing unit 1504. System memory 1510 may also store data that is used during the execution of the instructions and/or data that is generated during the execution of the program instructions. Various different kinds of programs may be loaded into system memory 1510 including but not limited to client applications, Web browsers, mid-tier applications, relational database management systems (RDBMS), virtual machines, containers, etc.

System memory 1510 may also store an operating system 1516. Examples of operating system 1516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1500 executes one or more virtual machines, the virtual machines along with their guest operating systems (GOSs) may be loaded into system memory 1510 and executed by one or more processors or cores of processing unit 1504.

System memory 1510 can come in different configurations depending upon the type of computer system 1500. For example, system memory 1510 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1510 may include a basic input/output system (BIOS) containing basic routines that help to transfer information between elements within computer system 1500, such as during start-up.

Computer-readable storage media 1522 may represent remote, local, fixed, and/or removable storage devices plus storage media for temporarily and/or more permanently containing, storing, computer-readable information for use by computer system 1500 including instructions executable by processing unit 1504 of computer system 1500.

Computer-readable storage media 1522 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1500.

Machine-readable instructions executable by one or more processors or cores of processing unit 1504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to connect to one or more devices via the Internet. In some embodiments communications subsystem 1524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1524 can provide wired network connectivity (e.g., Ethernet) in addition to or instead of a wireless interface.

In some embodiments, communications subsystem 1524 may also receive input communication in the form of structured and/or unstructured data feeds 1526, event streams 1528, event updates 1530, and the like on behalf of one or more users who may use computer system 1500.

By way of example, communications subsystem 1524 may be configured to receive data feeds 1526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1524 may also be configured to receive data in the form of continuous data streams, which may include event streams 1528 of real-time events and/or event updates 1530, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1524 may also be configured to output the structured and/or unstructured data feeds 1526, event streams 1528, event updates 1530, and the like to one or more databases that may be in communication with one or more streaming data source computers coupled to computer system 1500.

Computer system 1500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:

deploying, by a computing system, a remote agent appliance comprising a discovery plugin in an external environment of a user, wherein the remote agent appliance comprises a virtual appliance that is sealed to prevent a remote access of the user and prohibit execution of arbitrary code by the user, so that the user is capable of interacting with the remote agent appliance via a local console for registration, with all other management operations of the remote agent appliance being orchestrated by a cloud infrastructure;

creating, by the computing system, an asset source specifying a location of the external environment from which external assets and associated asset metadata should be discovered, wherein the asset source references credentials stored in a secure data store of the cloud infrastructure, with credential access for discovery operations being orchestrated by the cloud infrastructure;

creating, by the computing system, a discovery policy for discovering the external assets within the asset source;

generating, by the computing system, a discovery job for retrieving the asset metadata for the external assets discovered within the asset source;

executing, by the computing system using the discovery plugin, the discovery job to discover the external assets within the asset source based on the discovery policy, wherein the executing the discovery job comprises retrieving the asset metadata for the external assets discovered within the asset source and populating an inventory with the asset metadata, and wherein the inventory contains a collection of assets that includes the asset metadata for the external assets and comprises a single global view of assets across multiple external environments, wherein each asset is uniquely identified by a tuple of external identifier and source identifier, and de-duplication logic is employed to ensure that assets discovered from different sources or environments are presented as a single representation to the user; and providing, by the computing system, the collection of assets and the associated asset metadata within the inventory to the user.

2. The computer-implemented method of claim 1, further comprising generating, by the computing system, the inventory on the cloud infrastructure, wherein the cloud infrastructure is in communication with the remote agent appliance.

3. The computer-implemented method of claim 1, wherein the discovery policy is a schedule that identifies a time for when the computing system is to execute the discovery job.

4. The computer-implemented method of claim 1, further comprising:

receiving, by the computing system, a query from the user regarding the asset metadata;

executing, by the computing system, the query on the inventory; and providing, by the computing system, results of the query to the user based on the executing.

5. The computer-implemented method of claim 1, further comprising in response to generating the asset source, generating, by the computing system, connectors between the discovery plugin and the location of the external environment, wherein the asset metadata is retrieved for the external assets using the connectors.

6. The computer-implemented method of claim 1, further comprising:

generating, by the computing system, a migration project based on one or more assets within the collection of assets and the associated asset metadata within the inventory; and executing, by the computing system, a migration of the one or more assets to the cloud infrastructure based on the migration project.

7. The computer-implemented method of claim 1, wherein the providing the collection of assets and the associated asset metadata within the inventory to the user comprises displaying the collection of assets and the associated asset metadata to the user in a graphical user interface.

8. A system comprising:

one or more processors; and one or more non-transitory computer-readable media storing instructions which, when executed by the one or more processors, cause the one or more processors to perform operations including:

deploying a remote agent appliance comprising a discovery plugin in an external environment of a user, wherein the remote agent appliance comprises a virtual appliance that is sealed to prevent a remote access of the user and prohibit execution of arbitrary code by the user, so that the user is capable of interacting with the remote agent appliance via a local console for registration, with all other management operations of the remote agent appliance being orchestrated by a cloud infrastructure;

creating an asset source specifying a location of the external environment from which external assets and associated asset metadata should be discovered, wherein the asset source references credentials stored in a secure data store of the cloud infrastructure, with credential access for discovery operations being orchestrated by the cloud infrastructure;

creating a discovery policy for discovering the external assets within the asset source;

generating a discovery job for retrieving the asset metadata for the external assets discovered within the asset source;

executing, by the discovery plugin, the discovery job to discover the external assets within the asset source based on the discovery policy, wherein the executing the discovery job includes retrieving the asset metadata for the external assets discovered within the asset source and populating an inventory with the asset metadata, and wherein the inventory contains a collection of assets that includes the asset metadata for the external assets; and comprises a single global view of assets across multiple external environments, wherein each asset is uniquely identified by a tuple of external identifier and source identifier, and de-duplication logic is employed to ensure that assets discovered from different sources or environments are presented as a single representation to the user; and providing the collection of assets and the associated asset metadata within the inventory to the user.

9. The system of claim 8, wherein the operations further include generating the inventory on the cloud infrastructure, and wherein the cloud infrastructure is in communication with the remote agent appliance.

10. The system of claim 8, wherein the discovery policy is a schedule that identifies a time for when the one or more processors are to execute the discovery job.

11. The system of claim 8, wherein the operations further include:

receiving a query from the user regarding the asset metadata;

executing the query on the inventory; and providing results of the query to the user based on the executing.

12. The system of claim 8, wherein the operations further include:

in response to generating the asset source, generating connectors between the discovery plugin and the location of the external environment, and wherein the asset metadata is retrieved for the external assets using the connectors.

13. The system of claim 8, wherein the operations further include:

generating a migration project based on one or more assets within the collection of assets and the associated asset metadata within the inventory; and executing a migration of the one or more assets to the cloud infrastructure based on the migration project.

14. The system of claim 8, wherein the providing the collection of assets and the associated asset metadata within the inventory to the user includes displaying the collection of assets and the associated asset metadata to the user in a graphical user interface.

15. A computer-program product tangibly embodied in one or more non-transitory machine-readable media, including instructions that, when executed by one or more data processors, cause the one or more data processors to perform operations including:

deploying a remote agent appliance comprising a discovery plugin in an external environment of a user, wherein the remote agent appliance comprises a virtual appliance that is sealed to prevent a remote access of the user and prohibit execution of arbitrary code by the user, so that the user is capable of interacting with the remote agent appliance via a local console for registration, with all other management operations of the remote agent appliance being orchestrated by a cloud infrastructure;

creating an asset source specifying a location of the external environment from which external assets and associated asset metadata should be discovered, wherein the asset source references credentials stored in a secure data store of the cloud infrastructure, with credential access for discovery operations being orchestrated by the cloud infrastructure;

creating a discovery policy for discovering the external assets within the asset source;

generating a discovery job for retrieving the asset metadata for the external assets discovered within the asset source;

executing, by the discovery plugin, the discovery job to discover the external assets within the asset source based on the discovery policy, wherein the executing the discovery job includes retrieving the asset metadata for the external assets discovered within the asset source and populating an inventory with the asset metadata, and wherein the inventory contains a collection of assets that includes the asset metadata for the external assets and comprises a single global view of assets across multiple external environments, wherein each asset is uniquely identified by a tuple of external identifier and source identifier, and de-duplication logic is employed to ensure that assets discovered from different sources or environments are presented as a single representation to the user; and providing the collection of assets and the associated asset metadata within the inventory to the user.

16. The computer-program product of claim 15, wherein the operations further include generating the inventory on the cloud infrastructure, and wherein the cloud infrastructure is in communication with the remote agent appliance.

17. The computer-program product of claim 15, wherein the discovery policy is a schedule that identifies a time for when the one or more data processors are to execute the discovery job.

18. The computer-program product of claim 15, wherein the operations further include:

receiving a query from the user regarding the asset metadata;

executing the query on the inventory; and providing results of the query to the user based on the executing.

19. The computer-program product of claim 15, wherein the operations further include:

in response to generating the asset source, generating connectors between the discovery plugin and the location of the external environment, and wherein the asset metadata is retrieved for the external assets using the connectors.

20. The computer-program product of claim 15, wherein the operations further include:

generating a migration project based on one or more assets within the collection of assets and the associated asset metadata within the inventory; and executing a migration of the one or more assets to the cloud infrastructure based on the migration project.

* * * * *